US007885360B2

(12) United States Patent
Tanabe et al.

(10) Patent No.: US 7,885,360 B2
(45) Date of Patent: Feb. 8, 2011

(54) WIRELESS COMMUNICATION APPARATUS AND RECEIVING METHOD

(75) Inventors: Yasuhiko Tanabe, Kawasaki (JP); Yoshimasa Egashira, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 652 days.

(21) Appl. No.: 11/961,269

(22) Filed: Dec. 20, 2007

(65) Prior Publication Data

US 2008/0159442 A1    Jul. 3, 2008

(30) Foreign Application Priority Data

Dec. 27, 2006    (JP)    ............................. 2006-353149

(51) Int. Cl.
*H04L 27/00* (2006.01)

(52) U.S. Cl. .................. 375/324; 327/238; 327/254; 329/304; 370/203; 370/206; 370/208; 370/210; 708/322

(58) Field of Classification Search .................. None
See application file for complete search history.

(56) References Cited

FOREIGN PATENT DOCUMENTS

JP    2001-119364    4/2001

OTHER PUBLICATIONS

"Joint Proposal: High throughput extension to the 802.11 Standard; PHY" IEEE 802.11-05/1102r4, Jan. 2006, pp. 1-82.
"Joint Proposal: High throughput extension to the 802.11 Standard; MAC" IEEE 802.11-05/1095r4, Jan. 2006, pp. 1-103.

*Primary Examiner*—David C Payne
*Assistant Examiner*—Adolf Dsouza
(74) *Attorney, Agent, or Firm*—Oblon, Spivak, McClelland, Maier & Neustadt, L.L.P.

(57) ABSTRACT

A wireless communication apparatus receives an quadrature modulated signal, generate a local signal having a frequency different from a center frequency of the quadrature modulated signal, performs quadrature demodulation on the quadrature modulated signal by using the local signal, to obtain an I channel signal and a Q channel signal, performs Fourier transform on the I channel signal and the Q channel signal, to obtain signals in a frequency domain, and calculates a first correction coefficient for correcting phase distortion and amplitude distortion caused by the quadrature demodulation by using pairs of signals among the signals, each of the pairs are located at symmetrical frequency positions with respect to the frequency of the local signal.

24 Claims, 15 Drawing Sheets

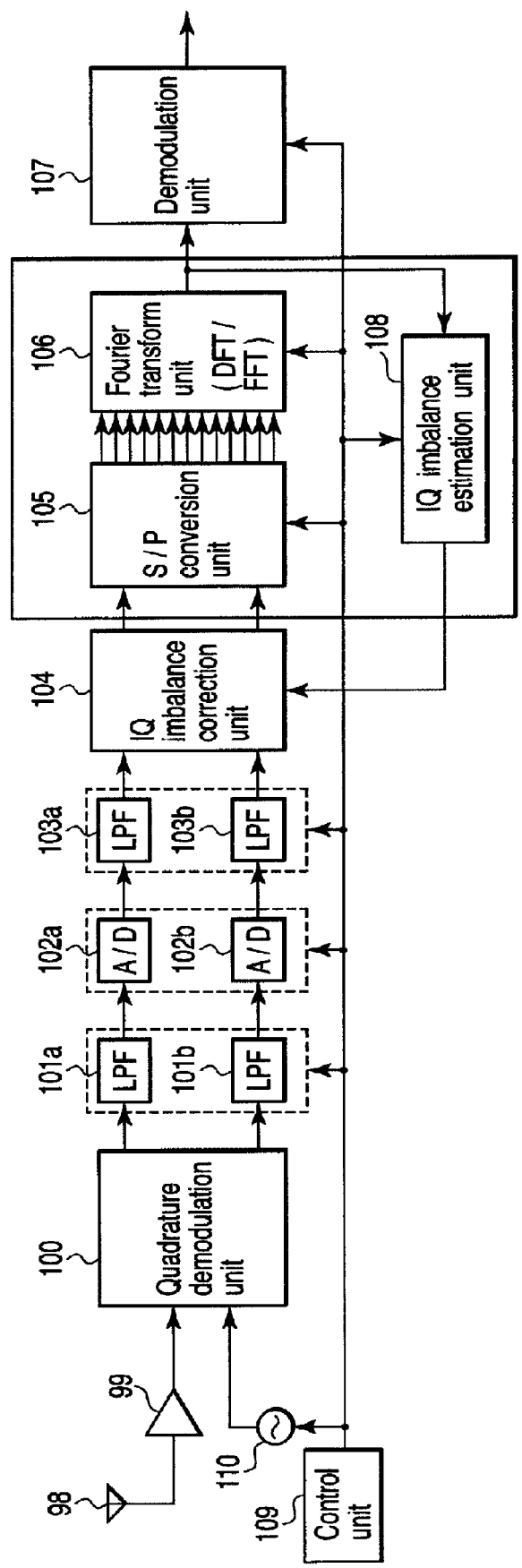
F I G. 1

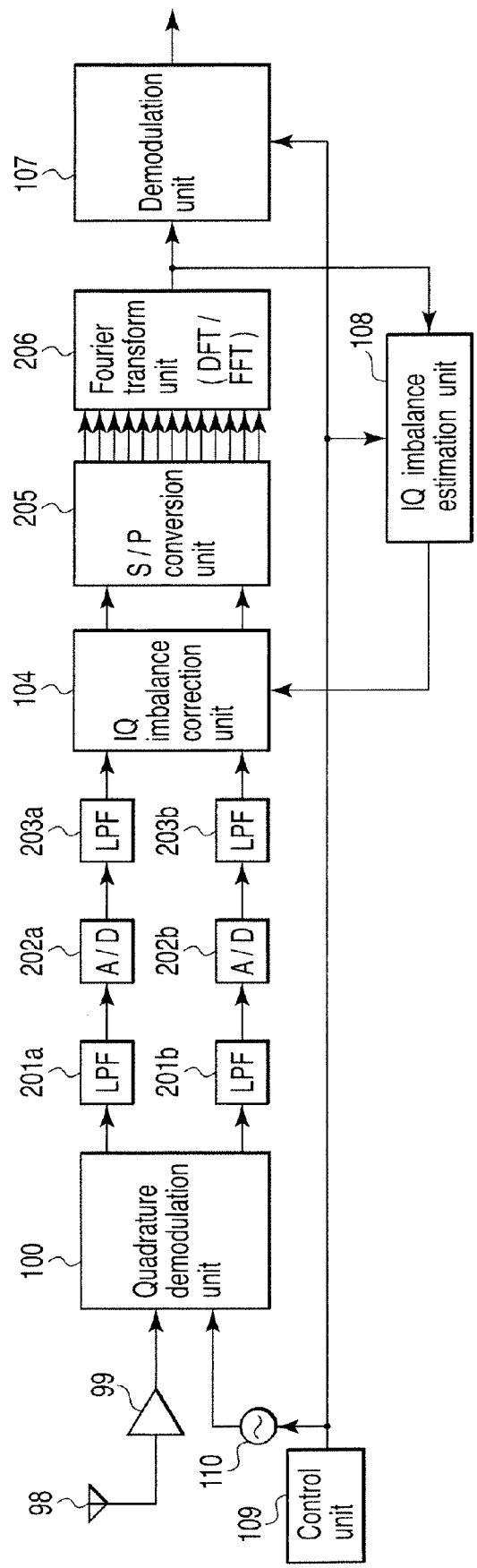
F I G. 2

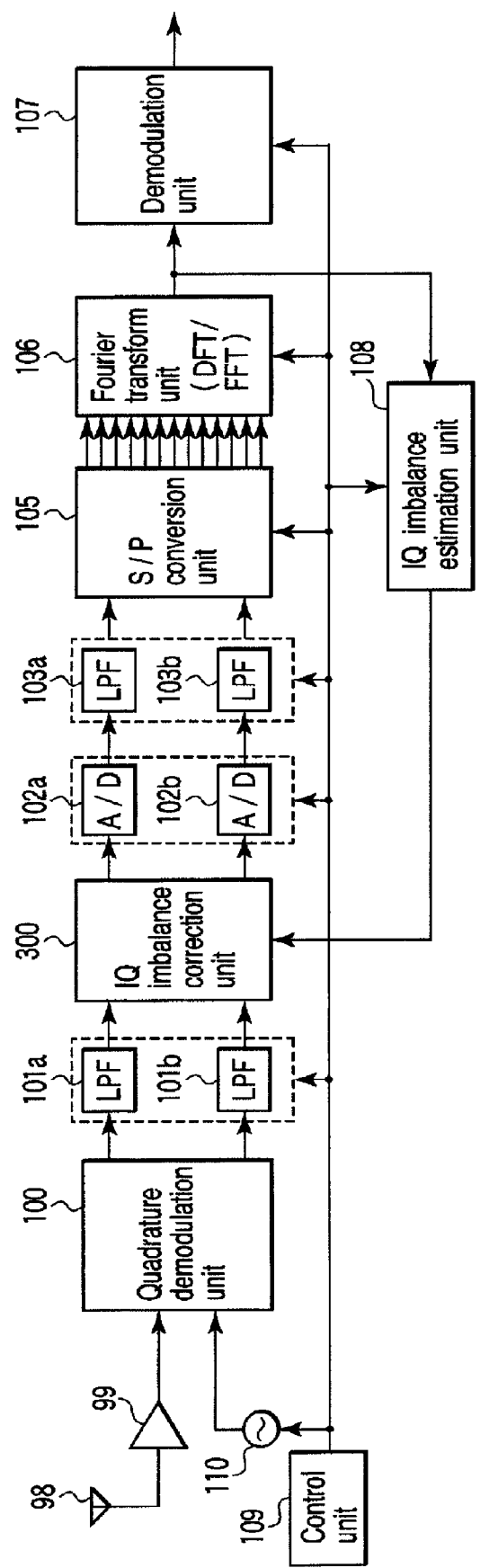
F I G. 3

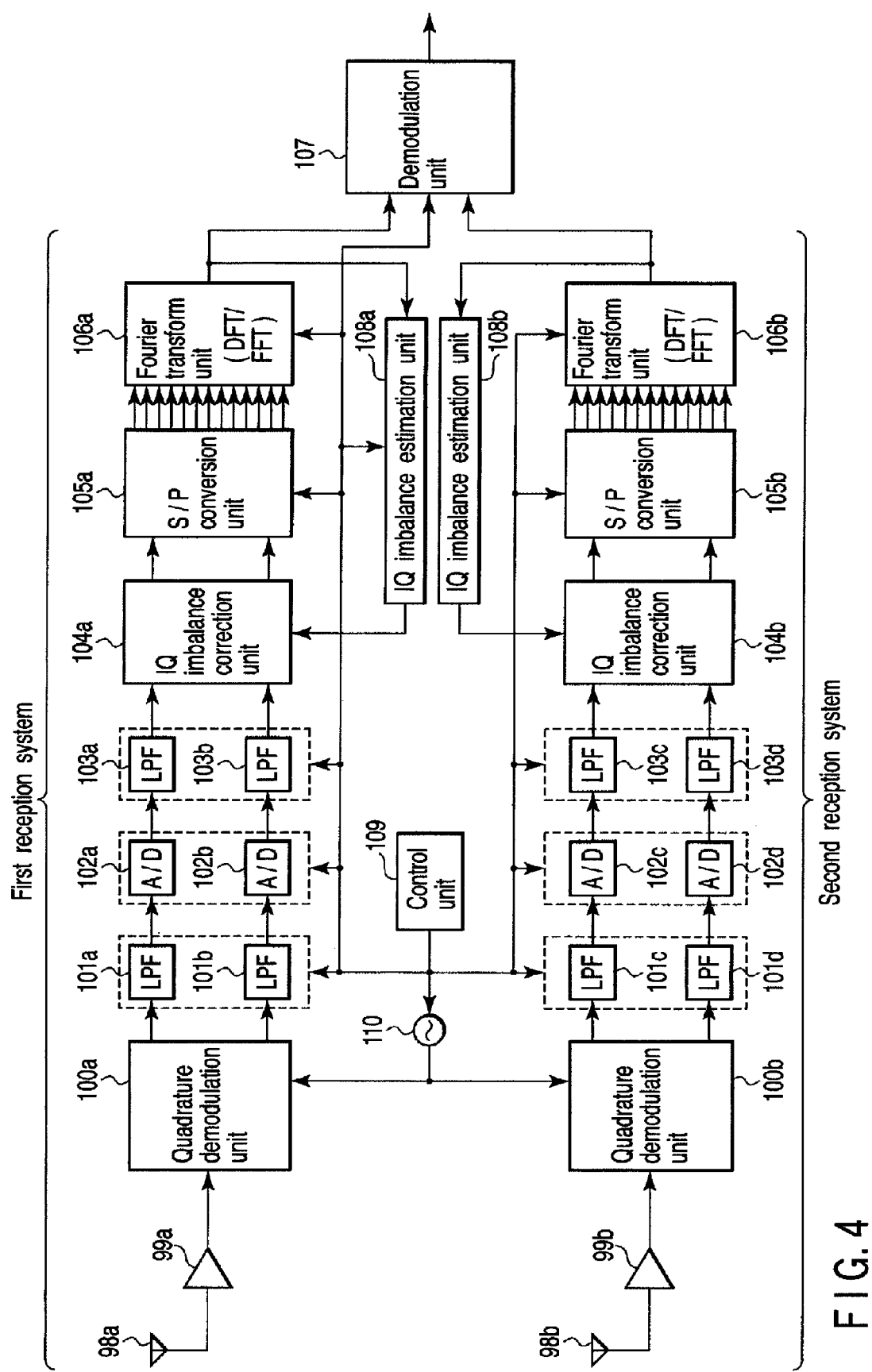
F I G. 4

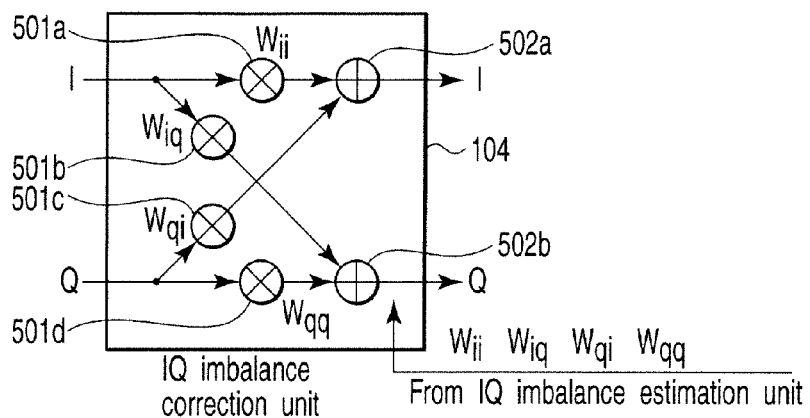
F I G. 5
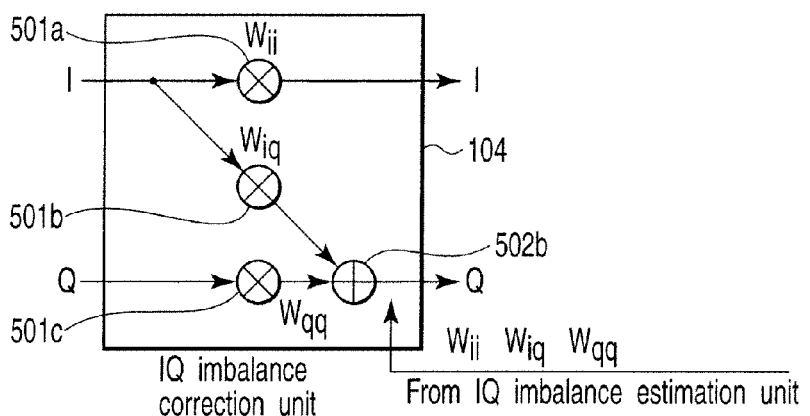
F I G. 6
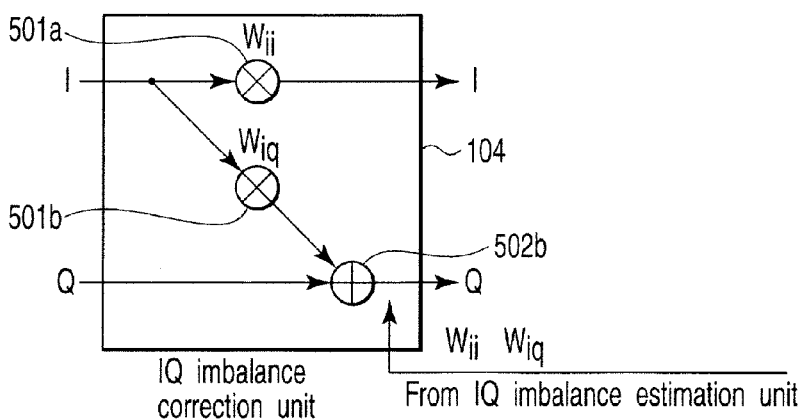
F I G. 7

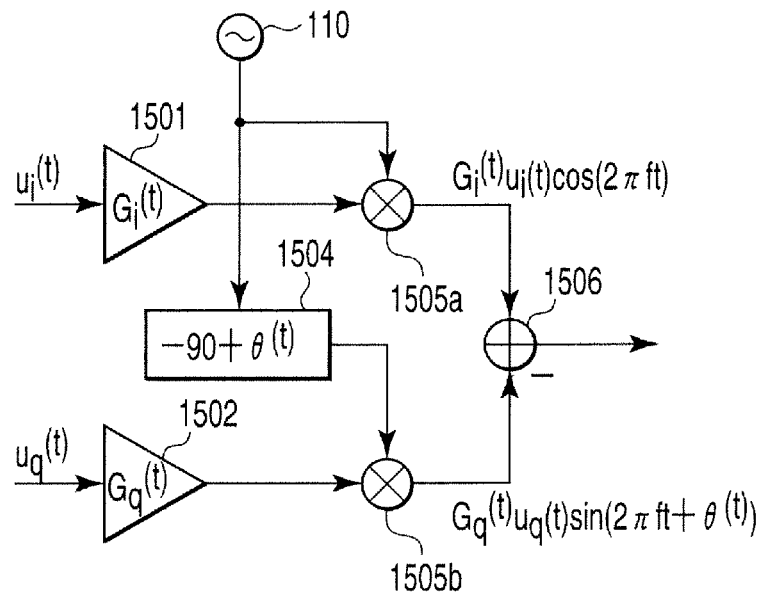
F I G. 1 5
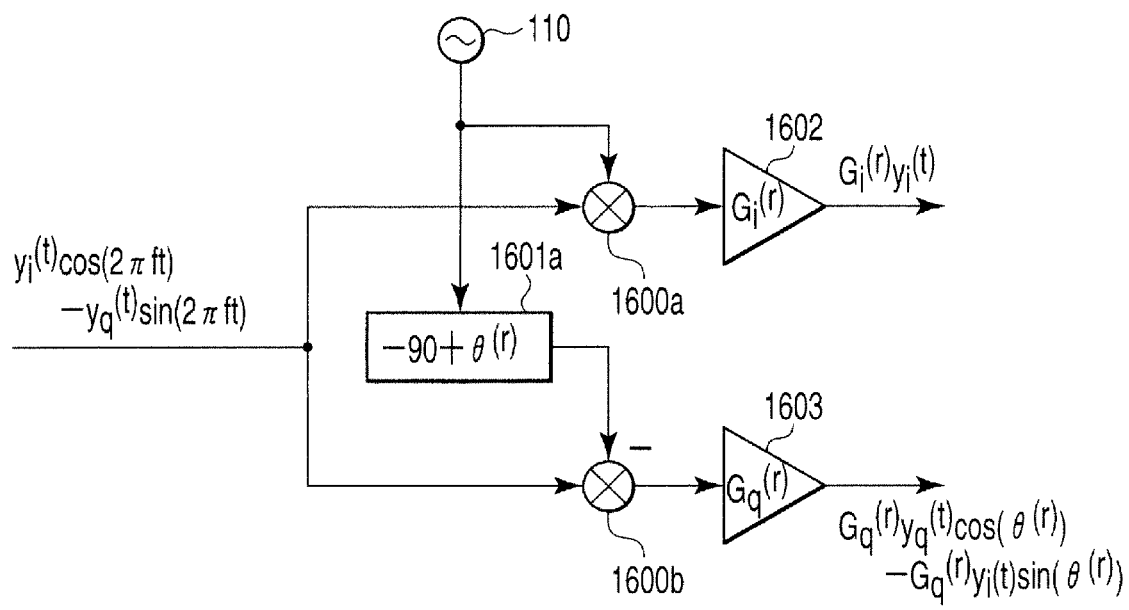
F I G. 1 6

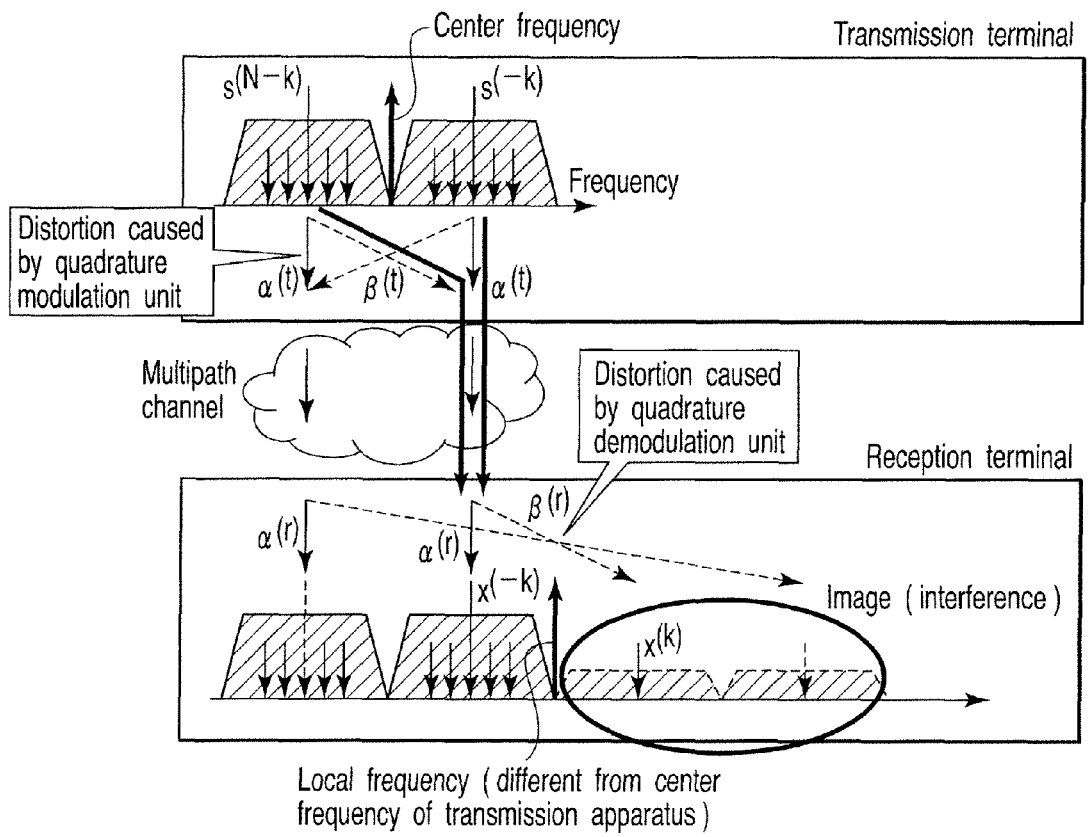
F I G. 17
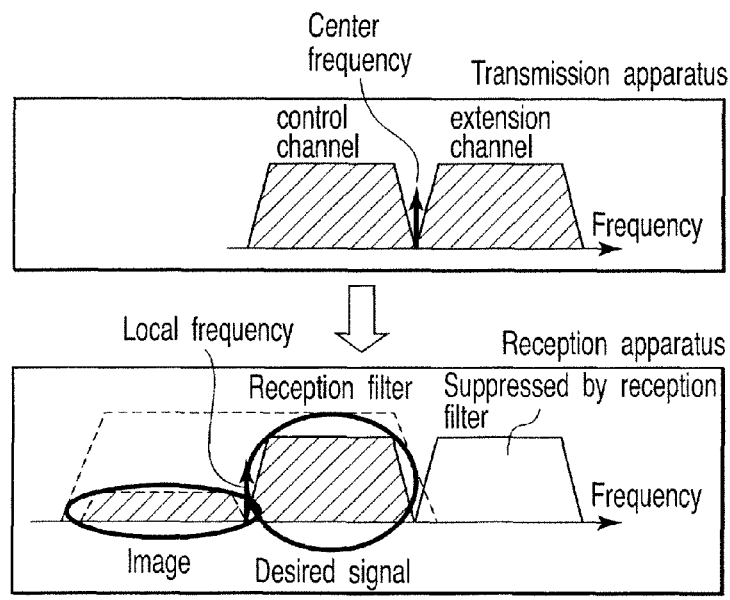
F I G. 18

WIRELESS COMMUNICATION APPARATUS AND RECEIVING METHOD

CROSS-REFERENCE TO RELATED APPLICATIONS

This application is based upon and claims the benefit of priority from prior Japanese Patent Application No. 2006-353149, filed Dec. 27, 2006, the entire contents of which are incorporated herein by reference.

BACKGROUND OF THE INVENTION

1. Field of the Invention

The present invention relates to a wireless communication apparatus and a receiving method.

2. Description of the Related Art

With an increase in frequency bandwidth used for communication to speed up wireless communication, it is difficult to neglect the propagation delay time differences between multipath channels. In an environment in which signals with different propagation delay times arrive, waveform distortion due to intersymbol interference is a large factor causing a deterioration in communication quality. In such an environment, an orthogonal frequency division multiplexing (to be referred to as OFDM hereinafter) scheme is known as a scheme which can compensate for waveform distortion due to intersymbol interference even if signals with different propagation delay times are received.

The OFDM transmission scheme uses complex signals, and hence needs to use a quadrature modulator and a quadrature demodulator for a transmitter and a receiver, respectively. In order to accurately generate an in-phase signal and a quadrature signal at the time of transmission, it is necessary to generate 90° out-of-phase signals. In order to accurately extract an in-phase component and a quadrature component at the time of reception, it is necessary to generate 90° out-of-phase local signals and multiply the reception signals by them. When gains are to be applied to an in-phase signal and a quadrature signal by using a filter or an amplifier, it is necessary to apply equal gains to the in-phase signal and the quadrature signal. In addition, when an in-phase signal and a quadrature signal are to be converted into digital signals by using A/D converters, any different delays must not be produced. In general, however, an in-phase component and a quadrature phase differ in amplitude, a phase error occurs in a 90° phase shifter, and a delay time difference occurs between the A/D converters which convert the in-phase component signal and the quadrature component signal into digital signals. Such imperfection in analog circuits is called IQ imbalance.

Assume that IQ imbalance has occurred. In this case, signals of two subcarriers, of a plurality of subcarriers of an OFDM signal, which are located at symmetrical positions with respect to the center frequency on the frequency axis (of the two subcarriers, the subcarrier in a frequency band higher than the center frequency and the subcarrier in a frequency band lower than the center frequency will sometime be called an "upper sideband subcarrier" and a "lower sideband subcarrier", respectively) interfere with each other, and hence the transmission performance is greatly limited. There has been proposed a technique for estimating the amount of interference between upper and lower subcarriers in such an environment, and determining a signal by using two signals received with the upper and lower subcarriers (see, for example, reference 1: JP-A 2001-119364 (KOKAI)).

According to the prior art (reference 1) described above, it is also necessary to estimate the channel responses of interference signals with respect to symmetrical subcarriers caused by IQ imbalance and to transmit a channel estimation known signal having a length twice that generally required. In addition, as a channel estimation known signal, a signal sequence which can separate a desired signal from an interference component from symmetrical subcarriers must be transmitted, and hence this technique cannot be applied to an arbitrary system. Furthermore, since the prior art estimates a state including a channel response instead of distortion itself due to IQ imbalance, it is necessary to estimate a distortion component for each frame when signals must be received from an indefinite number of terminals or channel variations cannot be neglected.

In addition, although the prior art can correct IQ imbalance in a reception unit, it cannot correct distortion in a transmission unit.

The present invention has therefore been made in consideration of the above problems, and has as its object to provide a wireless communication apparatus including a reception unit which can accurately and easily estimate and correct phase distortion and amplitude distortion caused by quadrature demodulation.

It is another object of the present invention to provide a wireless communication apparatus including a reception unit which can accurately and easily estimate and correct phase distortion and amplitude distortion caused by quadrature demodulation and a transmission unit which can accurately and easily estimate and correct phase distortion and amplitude distortion caused by quadrature modulation.

BRIEF SUMMARY OF THE INVENTION

A wireless communication apparatus receives an quadrature modulated signal; generate a local signal having a frequency different from a center frequency of the quadrature modulated signal; performs quadrature demodulation on the quadrature modulated signal by using the local signal, to obtain an I channel signal and a Q channel signal; performs Fourier transform on the I channel signal and the Q channel signal, to obtain signals in a frequency domain; and calculates a first correction coefficient for correcting phase distortion and amplitude distortion caused by the quadrature demodulation by using pairs of signals among the signals, each of the pairs are located at symmetrical frequency positions with respect to the frequency of the local signal.

BRIEF DESCRIPTION OF THE SEVERAL VIEWS OF THE DRAWING

FIG. 1 is a block diagram showing an example of the arrangement of the reception unit of a wireless communication apparatus according to the first to fifth embodiments;

FIG. 2 is a block diagram showing an example of the arrangement of the reception unit of a wireless communication apparatus according to the sixth embodiment;

FIG. 3 is a block diagram showing an example of the arrangement of the reception unit of a wireless communication apparatus according to the 10th embodiment;

FIG. 4 is a block diagram showing an example of the arrangement of the reception unit of a wireless communication apparatus according to the 11th and 12th embodiments;

FIG. 5 is a view showing an example of the arrangement of an IQ imbalance correction unit;

FIG. 6 is a view showing another example of the arrangement of the IQ imbalance correction unit;

FIG. 7 is a view showing still another example of the arrangement of the IQ imbalance correction unit;

FIG. 15 is a circuit diagram for explaining IQ imbalance in the transmission unit;

FIG. 16 is a circuit diagram for explaining IQ imbalance in the reception unit;

FIG. 17 is a graph for explaining the principle of a method of estimating IQ imbalance correction coefficients for the reception unit;

FIG. 18 is a graph for explaining the principle of another method of estimating IQ imbalance correction coefficients for the reception unit;

DETAILED DESCRIPTION OF THE INVENTION

First Embodiment

Figure 8:
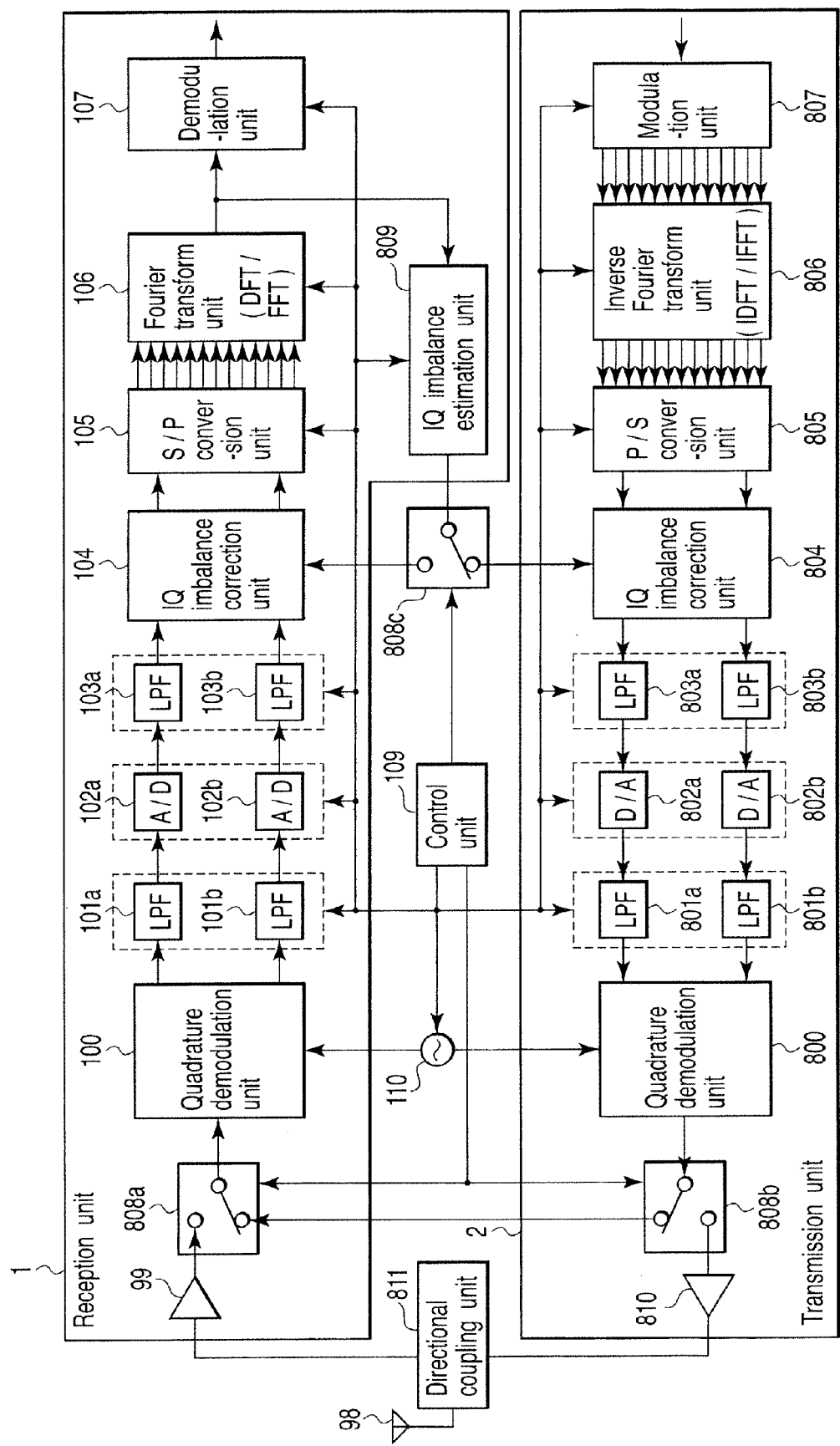
FIG. 8 is a block diagram showing an example of the arrangement of a wireless communication apparatus according to the 13th embodiment.

The arrangement of a wireless communication apparatus according to the first embodiment will be described with reference to FIGS. 1 and 5.

The wireless communication apparatus in FIG. 1 includes an antenna 98, an amplifier 99, an quadrature demodulation unit 100, analog low-pass filters 101a and 101b, A/D conversion units 102a and 102b, digital low-pass filters 103a and 103b, the IQ imbalance correction unit 104, a serial/parallel conversion unit 105, a Fourier transform unit 106, a demodulation unit 107 which demodulates a predetermined modulated signal such as an OFDM signal, an IQ imbalance estimation unit 108 which estimates IQ imbalance in the reception unit, a control unit 109, and a transmitter 110.

The amplifier 99 amplifies the quadrature modulated signal received by the antenna 98 and corrects the reception level and the like. The amplifier 99 then outputs the signal to the quadrature demodulation unit 100. The antenna 98 and the amplifier 99 are irrelevant to the gist of the present invention, and hence a detailed description thereof will be omitted. Although not shown in FIG. 1, a received signal may be frequency-converted from an RF (Radio Frequency) signal into an IF (Intermediate Frequency) signal.

The quadrature demodulation unit 100 quadrature demodulates a reception signal (quadrature modulated signal) by using a local signal supplied from the transmitter 110, and extracts an I (In-Phase) channel signal and a Q (Quadrature) channel signal.

The quadrature demodulation unit 100 performs general quadrature demodulation. However, this is irrelevant to the gist of the present invention, and hence a detailed description thereof will be omitted. The transmitter 110 has a function of switching the frequency of a local signal to be output under the control of the control unit 109. As the transmitter 110, any type of transmitter can be used as long as it has this function and a function of generating a signal with a desired frequency.

Since the signals quadrature demodulated by the quadrature demodulation unit 100 contain high-frequency components, the analog low-pass filters 101a and 101b are applied to the I channel and Q channel signals to suppress the high-frequency components. The analog low-pass filters 101a and 101b have functions of switching signal bandwidths to be passed under the control of the control unit 109. The reason why the bandwidths of the filters are switched will be described later. The low-pass filters 101a and 101b may have any arrangements. Since this is irrelevant to the gist of the present invention, a detailed description thereof will be omitted.

The A/D conversion units 102a and 102b respectively convert the I channel and Q channel signals, whose high-frequency components are suppressed by the low-pass filters 101a and 101b, into digital signals. At this time, the A/D conversion units 102a and 102b sample signals at a sampling rate twice or more the signal bandwidth. The reason why a sampling rate twice or more the signal bandwidth is required will be described at the time of description of the operation of estimating IQ imbalance.

Since each A/D conversion unit may have any arrangement and is irrelevant to the gist of the present invention, a detailed description thereof will be omitted.

The digital low-pass filters 103a and 103b are respectively applied to the I channel and Q channel signals converted into the digital signals by the A/D conversion units 102a and 102b. As the low-pass filters 103a and 103b, filters which can switch bandwidths under the control of the control unit 109 can be used. When a digital filter is to be used, such a function can be easily implemented by switching the tap coefficients of the filter. The reason why the bandwidths of the filters are switched will be described later. As the low-pass filters 103a and 103b, any types of filters can be used. FIR (Finite Impulse Response) filters or IIR (Infinite Impulse Response) filters may be used.

The IQ imbalance correction unit 104 corrects IQ imbalance caused in the reception unit with respect to the above signals. As shown in FIG. 5, the IQ imbalance correction unit 104 comprises multiplication units 501a, 501b, 501c, and 501d and addition units 502a and 502b. The IQ imbalance correction unit 104 weights/adds the I channel and Q channel signals and outputs the resultant signals. The IQ imbalance estimation unit 108 estimates weighting/adding coefficients.

The estimated values are used as coefficients to be multiplied by the multiplication units 501*a*, 501*b*, 501*c*, and 501*d*. A method of estimating these coefficients will be described in detail at the time of description of IQ imbalance estimating operation.

Referring to FIG. 1, the low-pass filters 103*a* and 103*b* are applied to the signals converted into the digital signals by the A/D conversion units 102*a* and 102*b*, and the IQ imbalance correction unit 104 performs IQ imbalance correction for the signals passing through the filters. However, the low-pass filters may be applied to the signals after the IQ imbalance correction unit 104 corrects IQ imbalance. Note that if high-frequency components have been sufficiently suppressed by the analog low-pass filters 101*a* and 101*b*, there is no need to use the digital low-pass filters 103*a* and 103*b*.

When an OFDM (Orthogonal Frequency Division Multiplexing) signal is to be received, the following operation is generally performed: measuring reception power for the application of AGC (Auto Gain Control), detecting the head of a frame, performing timing synchronization to obtain a position where FFT (Fast Fourier Transform) for the demodulation of the OFDM signal is to be performed, AFC (Auto Frequency Control) for the correction of the difference in local frequency between a transmission terminal and a reception terminal, downsampling, removal of a guard interval inserted to prevent intersymbol interference due to multipath delays at the time of transmission, and the like. In this case, these processes generally used to receive an OFDM signal are irrelevant to the gist of the present invention. Therefore, the processes are not shown in FIG. 1, and a detailed description thereof will be omitted.

The serial/parallel conversion unit (S/P conversion unit) 105 converts the I channel and Q channel signals, which are obtained as the result of correcting IQ imbalance by the IQ imbalance correction unit 104, into parallel signals. The serial/parallel conversion unit 105 has a function of serial/parallel-converting a signal with a sampling rate equal to the signal bandwidth and a function of serial/parallel-converting a signal with a sampling rate twice the signal bandwidth, and switches the two functions under the control of the control unit 109. The serial/parallel conversion unit 105 converts a signal with a sampling rate equal to the signal bandwidth into parallel signals equal in number to the total number of subcarriers of the transmitted OFDM signal, and converts a signal with a sampling rate twice the signal bandwidth into parallel signals twice the total number of subcarriers.

The reason why the serial/parallel conversion unit 105 switches the above two functions and S/P-converts signals with the two sampling rates under the control of the control unit 109 will be described later.

The Fourier transform unit 106 applies discrete Fourier transform or FFT (Fast Fourier Transform) to the parallel signals output from the serial/parallel conversion unit 105 to convert the signals in the time domain into those in the frequency domain. In OFDM transmission, signals are transmitted by using a plurality of subcarriers, and applying DFT or FFT can extract signals transmitted with the respective subcarriers.

It suffices if the Fourier transform unit 106 performs computation by using either DFT or FFT.

The Fourier transform unit 106 has a function of applying DFT or FFT to sampled signals equal in number to the total number of subcarriers of a transmitted OFDM signal and a function of applying DFT or FFT to sampled signals twice the total number of subcarriers, and switches the functions under the control of the control unit 109. The Fourier transform unit 106 will be described in detail later.

The demodulation unit 107 demodulates a signal converted into a signal in the frequency domain for each subcarrier. In general, in OFDM transmission, an environment in which multipath delayed waves cannot be neglected, and channel responses differ for the respective subcarriers. In order to demodulate an OFDM signal by using synchronous detection, therefore, it is necessary to estimate a channel response for each subcarrier. Note that channel estimation is irrelevant to the gist of the present invention, and any technique can be used. A description of this operation will therefore be omitted (not shown).

In OFDM transmission, in general, in order to, for example, follow up channel variations, correct a frequency offset, and correct a clock offset, the receiving communication apparatus transmits a known pilot signal by using some subcarriers instead of transmitting data with all the subcarriers. The receiving communication apparatus corrects a channel variation, a frequency offset, and a clock offset by using this pilot signal, and then performs demodulation. Since these corrections are irrelevant to the gist of the present invention, a detailed description thereof will be omitted.

Although not shown in FIG. 1, a channel estimation unit, the above correction unit, and the like may be added to the apparatus.

The demodulation unit 107 outputs one or both of a hard decision value on a reception signal, and a soft decision likelihood value on a reception signal.

The operation of the demodulation unit 107 differs depending on the signal to be transmitted and the decoding scheme to be applied after demodulation in the process of reception. If, for example, channel coding has not been applied or the decoding unit on the subsequent stage is a hard decision decoding unit, hard decision output operation is performed. If channel coding has been applied and a soft decision decoding unit is mounted, soft decision output operation is performed. Since hard decision output operation or soft decision output operation is irrelevant to the gist of the present invention, a detailed description thereof will be omitted. In addition, the demodulation unit 107 may use any means for demodulating operation as long as demodulation can be applied to subcarriers by which data is transmitted.

Operation to be performed to estimate IQ imbalance and operation to be performed to correct IQ imbalance in the reception apparatus having the above arrangement will be described next with reference to FIGS. 15, 16, 17, and 21.

The influences of IQ imbalance in the transmission apparatus and the reception apparatus on reception signals in OFDM transmission will be described first.

The D/A (Digital to Analog) conversion unit converts an OFDM signal transmitted from the transmission apparatus from a digital signal to an analog signal. The analog signal is then quadrature modulated to be converted into a radio frequency signal, and is transmitted. At this time, the gains of the I channel and Q channel signals after quadrature modulation are ideally kept equal, but it is difficult to realize this because of the imperfection of the analog circuits. The occurrence of an individual difference between the D/A conversion unit for an I channel signal and the D/A conversion unit for a Q channel signal is equivalent to adding different gains to the I channel and Q channel signals. In addition, it is ideal to accurately generate a phase difference of 90° when the quadrature modulation unit generates I channel and Q channel signals. However, this operation is difficult to carry out. As a result, in outputs from the quadrature modulation unit, the I channel and Q channel signals differ in amplitude and their phase difference deviates from 90°.

The above phenomenon can be modeled as shown in FIG. 15. Referring to FIG. 15, $u_i(t)$ and $u_q(t)$ respectively represent baseband signals transmitted by I channel and Q channel signals. Multiplication units 1505a and 1505b respectively multiply these baseband signals by carrier signals. Referring to FIG. 15, the gain difference between the I channel and Q channel signals which includes the individual difference between the D/A conversion units is expressed by respectively multiplying the I channel signal and the Q channel signal by different gains $G_i(t)$ and $G_q(t)$. In addition, referring to FIG. 15, the above phenomenon in which the phase difference between the I channel signal and the Q channel signal is not 90° is expressed by multiplying the Q channel by a sine wave with a phase shift of $\theta^{(t)}$.

As a result, an output from the wireless communication apparatus is expressed by expression (1) given below.

$$G_i^{(t)}u_i(t)\cos(2\pi ft) - G_q^{(t)}u_q(t)\sin(2\pi ft + \theta^{(t)}) = (G_i^{(t)}u_i(t) - G_q^{(t)}\sin(\theta^{(t)})u_q(t))\cos(2\pi ft) - (G_q^{(t)}\cos(\theta^{(t)})u_q(t))\sin(2\pi ft) \quad (1)$$

where f represents the carrier frequency. The above signal can be expressed in matrix notation by an equivalent low-pass system as follows:

$$\begin{bmatrix} m_i(t) \\ m_q(t) \end{bmatrix} = \begin{bmatrix} G_i^{(t)} & -G_q^{(t)}\sin\theta^{(t)} \\ 0 & G_q^{(t)}\cos\theta^{(t)} \end{bmatrix} \begin{bmatrix} u_i(t) \\ u_q(t) \end{bmatrix} \quad (2)$$

$$= \frac{1}{2}\begin{bmatrix} G_i^{(t)} + G_q^{(t)}\cos\theta^{(t)} & -G_q^{(t)}\sin\theta^{(t)} \\ G_q^{(t)}\sin\theta^{(t)} & G_i^{(t)} + G_q^{(t)}\cos\theta^{(t)} \end{bmatrix} \begin{bmatrix} u_i(t) \\ u_q(t) \end{bmatrix} +$$

$$\frac{1}{2}\begin{bmatrix} G_i^{(t)} - G_q^{(t)}\cos\theta^{(t)} & G_q^{(t)}\sin\theta^{(t)} \\ -G_q^{(t)}\sin\theta^{(t)} & G_i^{(t)} - G_q^{(t)}\cos\theta^{(t)} \end{bmatrix} \begin{bmatrix} u_i(t) \\ -u_q(t) \end{bmatrix}$$

where $m_i(t)$ and $m_q(t)$ respectively represent the I channel and Q channel transmission signals, and a complex transmission signal $$m(t) = mi(t) + jmq(t) (\text{for } j^2 = -1)$$

in the equivalent low-pass system based on the consideration of the influence of IQ imbalance can be expressed by expressions (3), (4), (5), and (6) given below.

$$m(t) = \alpha^{(t)} \cdot u(t) + \beta^{(t)} \cdot u*(t) \quad (3)$$

where $$u(t) = u_i(t) + ju_q(t) \quad (4)$$

$$\alpha^{(t)} = \frac{1}{2}\left(G_i^{(t)} + G_q^{(t)} \cdot e^{j\theta^{(t)}}\right) \quad (5)$$

$$\beta^{(t)} = \frac{1}{2}\left(G_i^{(t)} - G_q^{(t)} \cdot e^{j\theta^{(t)}}\right) \quad (6)$$

In this manner, using a complex conjugate $u*(t)$ of a transmission signal $u(t)$ makes it possible to express a signal in complex notation even in an environment in which the orthogonality deteriorates due to the influence of IQ imbalance. As is obvious from expression (3), distortion represented by $\alpha^{(t)}$ occurs in a transmission signal due to the influence of IQ imbalance, and unwanted radiation of a complex conjugate signal $u*(t)$ occurs. As will be described later, this complex conjugate signal causes interference and limits the performance of OFDM transmission (for example, expressions (19) to (21)).

Consider IQ imbalance in the reception apparatus. The reception apparatus multiplies reception signals by two 90° out-of-phase sine waves by using the quadrature demodulation unit 100 and the transmitter 110, and applies the low-pass filters 101a and 101b to the signals, thereby obtaining an I channel signal and a Q channel signal.

As in the case of the transmission apparatus, it is ideal to accurately generate a phase difference of 90°, but it is actually difficult to realize this. In addition, in general, an I channel signal and a Q channel signal differ in gain due to the gains of filters and the individual difference between the A/D (Analog to Digital) converters. FIG. 16 shows an arrangement obtained by modeling IQ imbalance caused as a result of the above operation on the basis of the imperfection of the quadrature demodulation unit 100.

Referring to FIG. 16, if a band signal is expressed by $y_i(t)\cos(2\pi ft) - y_q(t)\sin(2\pi ft)$ then, an I channel signal $r_i(t)$ and a Q channel signal $r_q(t)$ output from the quadrature demodulation unit 100 can be expressed by $$\begin{bmatrix} r_i(t) \\ r_q(t) \end{bmatrix} = \begin{bmatrix} G_i^{(r)} & 0 \\ -G_q^{(r)}\sin(\theta^{(r)}) & G_q^{(r)}\cos(\theta^{(r)}) \end{bmatrix} \begin{bmatrix} y_i(t) \\ y_q(t) \end{bmatrix} \quad (7)$$

$$= \frac{1}{2}\begin{bmatrix} G_i^{(r)} + G_q^{(r)}\cos\theta^{(r)} & G_q^{(r)}\sin\theta^{(r)} \\ -G_q^{(r)}\sin\theta^{(r)} & G_i^{(r)} + G_q^{(r)}\cos\theta^{(r)} \end{bmatrix} \begin{bmatrix} y_i(t) \\ y_q(t) \end{bmatrix} +$$

$$\frac{1}{2}\begin{bmatrix} G_i^{(r)} - G_q^{(r)}\cos\theta^{(r)} & G_q^{(r)}\sin\theta^{(r)} \\ -G_q^{(r)}\sin\theta^{(r)} & G_i^{(r)} - G_q^{(r)}\cos\theta^{(r)} \end{bmatrix} \begin{bmatrix} y_i(t) \\ -y_q(t) \end{bmatrix}$$

Therefore, a reception signal $$r(t) = r_i(t) + jr_q(t)$$

in an equivalent low-pass system based on the consideration of the influence of IQ imbalance can be expressed by expressions (8), (9), (10), and (11) given below.

$$r(t) = \alpha^{(r)} \cdot y(t) + \beta^{(r)} \cdot y*(t) \quad (8)$$

where $$y(t) = y_i(t) + jy_q(t) \quad (9)$$

$$\alpha^{(r)} = \frac{1}{2}\left(G_i^{(r)} + G_q^{(r)} \cdot e^{-j\theta^{(r)}}\right) \quad (10)$$

$$\beta^{(r)} = \frac{1}{2}\left(G_i^{(r)} - G_q^{(r)} \cdot e^{j\theta^{(r)}}\right) \quad (11)$$

In this manner, as in the transmission apparatus, in the reception apparatus, an equivalent low-pass system signal in an environment in which the orthogonality deteriorates can be expressed in complex notation. Obviously, as in the wireless reception apparatus, in the wireless transmission apparatus, not only distortion represented by $\alpha^{(r)}$ occurs in a reception signal due to the influence of IQ imbalance, but also a complex conjugate signal $y*(t)$ is added as indicated by expression (8).

The influences of multipath channels between the transmission apparatus and the reception apparatus will be described next.

Letting L be the number of channels (propagation paths), $\tau_l$ be the delay time of each path, and $h_l$ be the complex amplitude of each path, a reception signal y(t) can be expressed by $$y(t) = \sum_{l=0}^{L-1} h_l \cdot m(t - \tau_l) \quad (12)$$

When the influence of distortion of the transmission apparatus represented by expression (3) is added to expression (12), the resultant signal can be expressed by $$y(t) = \sum_{l=0}^{L-1} h_l \cdot (\alpha^{(t)} u(t - \tau_l) + \beta^{(t)} u^*(t - \tau_l)) \quad (13)$$

In addition, when the influence of IQ imbalance in the reception apparatus represented by expression (8) is added, the influence of IQ imbalance in a multipath propagation environment can be expressed by expressions (14), (15), and (16).

$$r(t) = \sum_{l=0}^{L-1} [(h_l \alpha^{(t)} \alpha^{(r)} + h_l^* \beta^{(t)*} \beta^{(r)}) u(t - \tau_l) + \\ (h_l \alpha^{(r)} \beta^{(t)} + h_l^* \alpha^{(t)*} \beta^{(r)}) u^*(t - \tau_l)] + n(t) \\ = \sum_{l=0}^{L-1} [h_l' u(t - \tau_l) + h_l'' u^*(t - \tau_l)] + n(t) \quad (14)$$

Where $$h_l' = h_l \alpha^{(t)} \alpha^{(r)} + h_l^* \beta^{(t)*} \beta^{(r)} \quad (15)$$

$$h_l'' = h_l \alpha^{(r)} \beta^{(t)} + h_l^* \alpha^{(t)*} \beta^{(r)} \quad (16)$$

Obviously, as in the case wherein distortion in the transmission apparatus or the reception apparatus is expressed by expression (14), the influence of IQ imbalance can be expressed by the linear sum of the transmission signal u(t) and u*(t) even in consideration of the influence of a channel response.

The influences of IQ imbalance in OFDM transmission will be finally described.

In OFDM transmission, after the reception signal represented by expression (14) is Fourier-transformed and converted into a signal in the frequency domain, the signal is demodulated. The time-shift rule of Fourier transform and the Fourier transform of a complex conjugate signal have the relationships represented by expressions (17) and (18).

$$u(t-\tau_l) \leftrightarrow U(f) \cdot e^{-j2\pi f \tau_l} \quad (17)$$

$$u^*(t-\tau_l) \leftrightarrow U^*(-f) \cdot e^{-j2\pi f \tau_l} \quad (18)$$

Therefore, according to expressions (14), (17), and (18), a signal $x_k(m)$ of the mth symbol which is received by the kth subcarrier can be expressed by expressions (19), (20), and (21).

$$x_k(m) = h_\alpha^{(k)} \cdot s_k(m) + h_\beta^{(k)} \cdot s_{-k}^*(m) + n_k(m) \quad (19)$$

where $$h_\alpha^{(k)} = \sum_{l=0}^{L-1} h_l' \cdot e^{-j2\pi k \Delta f \tau_l} \\ = \alpha^{(t)} \alpha^{(r)} h_k + \beta^{(t)*} \beta^{(r)} (h_{-k})^* \quad (20)$$

$$h_\beta^{(k)} = \sum_{l=0}^{L-1} h_l'' \cdot e^{-j2\pi k \Delta f \tau_l} \\ = \alpha^{(r)} \beta^{(t)} h_k + \alpha^{(t)*} \beta^{(r)} (h_{-k})^* \quad (21)$$

where $h_k$ and $h_{-k}$ respectively represent the channel responses of the kth and −kth subcarriers without the influence of IQ imbalance, $\Delta f$ represents the frequency interval between adjacent subcarriers, and $s_k(m)$ and $s_{-k}(m)$ respectively represent the modulated signals of the mth symbol which are transmitted by the kth and −kth subcarriers.

As described above, in OFDM transmission, when IQ imbalance occurs in the wireless communication apparatus, a reception signal contains the signals of subcarriers located at symmetrical positions with respect to the center frequency as interference. The above phenomenon also occurs at the −kth subcarrier in the same manner, and the reception signal of the kth subcarrier contains the signal of the kth subcarrier as an interference signal.

As described above, if a reception signal contains an interference signal, the communication quality is limited, and a serious problem arises especially when communication is to be performed by using a higher-order multilevel modulation scheme.

The reception apparatus of this embodiment estimates IQ imbalance and calculates correction coefficients $w_{ii}$, $w_{iq}$, $w_{qi}$, and $w_{qq}$. The IQ imbalance correction unit 104 in FIG. 5 then performs correction. The processing operation of the reception apparatus in FIG. 1 will be described below with reference to the flowchart of FIG. 21.

When distortion due to IQ imbalance is to be estimated to obtain correction coefficients (step S100 in FIG. 21), the process advances to step S101, in which the control unit 109 sends a control signal to set the frequency of a local signal generated by the transmitter 110 to be higher than the center frequency of a received transmission signal by W/2 Hz (step S101). In this case, W represents the signal bandwidth of the transmission signal.

The quadrature demodulation unit 100 quadrature demodulates a reception signal by using the above local signal to extract an I channel signal and a Q channel signal (step S102).

Figure 12:
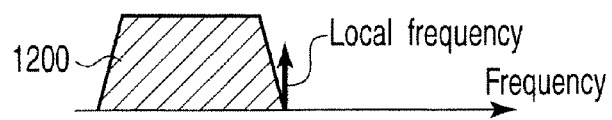
FIG. 12 is a graph showing an example of the frequency spectrum of a reception signal in a case wherein IQ imbalance correction coefficients for the reception unit are estimated.

As a result, since the reception signals contain high-frequency components and baseband signals, suppressing the high-frequency components by using the low-pass filters 101*a* and 101*b* can obtain I channel and Q channel baseband signals. At this time, as shown in FIG. 12, the frequency spectrum of the complex reception signal has a component only in the lower sideband. The control unit 109 sends a control signal to change the one-side bandwidths (passbands) of the low-pass filters 101*a* and 101*b* from W/2 to W (step S103). The influences of IQ imbalance obtained as a result of this operation will be described in detail later at the time of description of Fourier transform output operation.

The A/D conversion units 102*a* and 102*b* convert the signals passing through the analog low-pass filters 101*a* and 101*b* into digital signals. In this case, the frequency spectrum of the reception signal is represented as shown in FIG. 12, sampling in A/D conversion needs to be performed at a sampling rate twice or more a signal bandwidth W.

In addition, as shown in FIG. 1, when digital filters are to be used after A/D conversion, it is necessary to perform sampling at a sampling rate twice or more 2 W. The control unit 109 therefore transmits control signals to set the sampling rates of the A/D conversion units 102a and 102b to be equal to more than 4 W (S104).

Since the bandwidths of the digital filters need to pass signals with frequencies twice the signal bandwidth, the control unit 109 transmits control signals to switch the tap coefficients of the low-pass filters 103a and 103b to the tap coefficients of the filters which pass signals with 2 W or more (step S105).

If correction coefficients for IQ imbalance have already been estimated, and IQ imbalance is to be corrected by using the estimated correction coefficients, the IQ imbalance correction unit 104 having the arrangement shown in FIG. 5 performs IQ imbalance with respect to signals passing through the low-pass filters 103a and 103b. If, however, no correction coefficients have been estimated, and distortion due to IQ imbalance is to be estimated (in the case of an IQ imbalance estimation mode), the process skips IQ imbalance correction processing by the IQ imbalance correction unit 104.

Alternatively, the initial values of correction coefficients are set as indicated by expression (22) to output signals equivalent to those which are output when the process skips IQ imbalance correction.

$$w_{ii}=1.0, w_{iq}=0.0, w_{qi}=0.0, w_{qq}=1.0 \tag{22}$$

The serial/parallel conversion unit 105 serial/parallel-converts signals passing through the low-pass filters 103a and 103b or signals passing through the IQ imbalance correction unit 104 in which the correction coefficients are set to the initial values represented by expression (22), thereby generating parallel signals to which Fourier transform is to be applied (step S106). In this case, when IQ imbalance is to be estimated, since the signal spectrum has been frequency-converted as shown in FIG. 12, a signal with a sampling rate (2 W) twice the signal bandwidth W is converted into parallel signals. If the number of subcarriers of the transmitted OFDM signal is represented by N, including subcarriers which are not used for communication, e.g., subcarriers with a guard band and the center frequency, serial/parallel conversion is performed to obtain the number of parallel signals represented by 2N.

The Fourier transform unit 106 performs Fourier transform (discrete Fourier transform or fast Fourier transform) for the signals obtained by serial/parallel conversion (step S107). Since the total number of subcarriers of a received OFDM signal is N, discrete Fourier transform/fast Fourier transform is applied to the signals of N samples in general. When, however, a distortion component due to IQ imbalance is to be estimated, discrete Fourier transform/fast Fourier transform is applied to the signals of 2N samples.

As a result, as the frequency of the transmitter 110 is set to be higher by W/2, and the A/D conversion units and the filters operate in accordance with signals with a double bandwidth, signals after Fourier transform (discrete Fourier transform/fast Fourier transform) concentrate on negative subcarriers, as shown in FIG. 12.

Signals after Fourier transform will be described below.

As described above, a transmission signal and a reception signal can be expressed by expressions (3) and (8), respectively, under the influence of IQ imbalance. However, an OFDM signal transmitted through a multipath channel can be expressed by expression (19) when a local frequency in the transmission terminal is equal to a local frequency in the reception terminal. As described above, if the local frequency in the reception terminal is higher by W/2, the relationship represented by expression (19) does not hold.

FIG. 17 is a view for explaining the principle of how IQ imbalance occurs in the transmission terminal and the reception terminal in this embodiment. Expression (19) represents that the reception signal of the kth subcarrier interferes with the reception of the −kth subcarrier. When the local frequency of the transmitter is shifted, no signal is transmitted by the kth subcarrier. As a result, there is no interference from the kth subcarrier.

On the other hand, since IQ imbalance in the transmission apparatus causes interference, the signal transmitted by the (−N+k)th subcarrier interferes with the −kth subcarrier. In addition, since the reception signal of the −kth subcarrier interferes with the reception signal of the kth subcarrier, the signals transmitted by the −kth subcarrier and the (−N+k)th subcarrier are received by the kth subcarrier.

As a result, a reception signal $x^{(-k)}(m)$ of the −kth subcarrier and a reception signal $x(k)(m)$ of the kth subcarrier can be expressed by expressions (23) and (24) given below:

$$x_{-k}(m)=(\alpha^{(t)} \cdot s_{-k}(m)+\beta^{(t)} \cdot s_{-N+k}{}^{*}(m))h_{-k} \cdot \alpha^{(r)}+n_{-k}(m) \tag{23}$$

$$x_{-k}(m)=(\alpha^{(t)*} \cdot s_{-k}{}^{*}(m)+\beta^{(t)*} \cdot s_{-N+k}(m))h_{-k}{}^{*} \cdot \beta^{(r)}+n_{k}(m) \tag{24}$$

The process then advances to step S108, in which the IQ imbalance estimation unit 108 estimates (calculates) correction coefficients for the correction of IQ imbalance by using a signal converted into the frequency domain after Fourier transform. In the case of OFDM transmission, the demodulation unit 107 demodulates the signal in the frequency domain which is output from the Fourier transform unit 106 (step S109).

A method of estimating correction coefficients for the correction of IQ imbalance in the IQ imbalance estimation unit 108 will be described below.

In the case of the IQ imbalance correction unit 104 having the arrangement shown in FIG. 5, it suffices to obtain the correction coefficients $w_{ii}$, $w_{iq}$, $w_{qi}$, and $w_{qq}$ satisfying the following expressions.

$$w_{ii} \cdot r_i(t)+w_{qi} \cdot r_q(t)=\gamma \cdot y_i(t) \tag{25}$$

$$w_{iq} \cdot r_i(t)+w_{qq} \cdot r_q(t)=\gamma \cdot y_q(t) \tag{26}$$

where $\alpha^{(r)}$ and $\beta^{(r)}$ can be expressed by expressions (10) and (11) and hence satisfy the relationship represented by the following expression.

$$\alpha_r^{(r)}+\beta_r^{(r)}=G_i^{(r)} \tag{27}$$

$$\alpha_i^{(r)}\beta_r^{(r)}=G_q^{(r)}\sin\theta^{(r)} \tag{28}$$

$$\alpha_r^{(r)}-\beta_r^{(r)}=G_q^{(r)}\cos\theta^{(r)} \tag{29}$$

$$\alpha_i^{(r)}-\beta_i^{(r)}=0 \tag{30}$$

In this case, substitution of expressions (8) and (30) into equations (25) and (26) yields $$w_{ii} \cdot r_i(t)+w_{qi} \cdot r_q(t)=[(\alpha_r^{(r)}+\beta_r^{(r)})w_{ii}+(\alpha_i^{(r)}+\beta_i^{(r)})w_{qi}]y_i(t)+[(\alpha_r^{(r)}-\beta_r^{(r)})w_{qi}]y_q(t) \tag{31}$$

$$w_{iq} \cdot r_i(t)+w_{qq} \cdot r_q(t)=[(\alpha_r^{(r)}+\beta_r^{(r)})w_{iq}+(\alpha_i^{(r)}+\beta_i^{(r)})w_{qq}]y_q(t)+[(\alpha_r^{(r)}-\beta_r^{(r)})w_{qq}]y_q(t) \tag{32}$$

Since expressions (31) and (32) must satisfy expressions (25) and (26), IQ imbalance correction coefficients must satisfy the following expression:

$$(\alpha_r^{(r)} - \beta_r^{(r)}) w_{qi} = 0 \tag{33}$$

$$(\alpha_r^{(r)} + \beta_r^{(r)}) w_{iq} + (\alpha_i^{(r)} + \beta_i^{(r)}) w_{qq} = 0 \tag{34}$$

Consequently, IQ imbalance correction coefficients can be expressed by $$w_{ii} = (\alpha_r^{(r)} - \beta_r^{(r)}) \tag{35}$$

$$w_{iq} = -(\alpha_i^{(r)} + \beta_i^{(r)}) \tag{36}$$

$$w_{qi} = 0 \tag{37}$$

$$w_{qq} = (\alpha_r^{(r)} + \beta_r^{(r)}) \tag{38}$$

Obviously, therefore, if $\alpha^{(r)}$ and $\beta^{(r)}$ can be estimated, coefficients for correcting IQ imbalance can be estimated.

A method of estimating $\alpha^{(r)}$ and $\beta^{(r)}$ will be described next.

A reception vector expressed by the following expression is defined by using the reception signal of the –kth and kth subcarriers represented by expressions (23) and (24), with the reception signal of the –kth subcarrier being the first element and the complex conjugate signal of the reception signal of the kth subcarrier being the second element.

$$x^{(k)}(m) = \begin{bmatrix} x_{-k}(m) \\ x_k^*(m) \end{bmatrix} = a_k(m) \begin{bmatrix} \alpha^{(r)} \\ \beta^{(r)*} \end{bmatrix} + \begin{bmatrix} n_{-k}(m) \\ n_k^*(m) \end{bmatrix} \tag{39}$$

where $$a_k(m) = (\alpha^{(t)} \cdot s_{-k}(m) + \beta^{(t)} \cdot s_{-N+k}^*(m)) h_{-k} \tag{40}$$

In expression (39), although $a_k(m)$ is a variable depending on a subcarrier and a transmission signal, $\alpha^{(r)}$ and $\beta^{(r)}$ do not depend on subcarriers. Therefore, a correlation matrix is obtained by using a plurality of subcarriers and a plurality of symbols, as represented by the following expression:

$$R_{xx} = \sum_m \sum_k x^{(k)}(m) x^{(k)}(m) \simeq A \begin{bmatrix} \alpha^{(r)} \\ \beta^{(r)*} \end{bmatrix} [\alpha^{(r)*} \ \beta^{(r)}] + \sigma^2 I \tag{41}$$

where $$A = \sum_m \sum_k |a_k(m)|^2 \tag{42}$$

Note that the correlation between noise, IQ imbalance, and a transmission signal is set to "0". In this case, a correlation matrix is calculated from expression (41) by using at least one of symbols including an unknown information symbol on the receiving side, a known signal for channel estimation, and the like.

An eigenvector corresponding to the maximum eigenvalue of the correlation matrix represented by expression (41) is obtained. The eigenvector satisfies the following expression:

$$R_{xx} e = \lambda e \tag{43}$$

$$e = \xi \begin{bmatrix} \alpha^{(r)} \\ \beta^{(r)*} \end{bmatrix} = \begin{bmatrix} e_1 \\ e_2 \end{bmatrix} \tag{44}$$

Obviously from expression (44), first and second elements $e_1$ and $e_2$ of the eigenvector are proportional to $\alpha^{(r)}$ and $\beta^{(r)}$, respectively. In addition, using expressions (10) and (11) makes it possible to express $\alpha^{(r)}$ and $\beta^{(r)}$ as follows:

$$\alpha^{(r)} = \frac{1}{1 + \frac{\beta^{(r)*}}{\alpha^{(r)}}} \tag{45}$$

$$\beta^{(r)*} = \frac{\frac{\beta^{(r)*}}{\alpha^{(r)}}}{1 + \frac{\beta^{(r)*}}{\alpha^{(r)}}} \tag{46}$$

That is, $\alpha^{(r)}$ and $\beta^{(r)}$ can be expressed by using the ratio between $\alpha^{(r)}$ and $\beta^{(r)*}$.

In addition, the ratio between $\beta^{(r)*}$ and $\alpha^{(r)}$ can be obtained from the ratio between the first element $e_1$ and the second element $e_2$ of the eigenvector.

$$\frac{\beta^{(r)*}}{\alpha^{(r)}} = e_2 / e_1 \tag{47}$$

where $$e = \begin{bmatrix} e_1 \\ e_2 \end{bmatrix} \tag{48}$$

As described above, the correlation matrix of the vector having the signal received by the –kth subcarrier and the complex conjugate signal of the signal received by the kth subcarrier as elements is calculated throughout a plurality of subcarriers and a plurality of symbols, and an eigenvector corresponding to the maximum eigenvalue is obtained (calculated according to expressions (35) to (38) and (45) to (47)), thereby obtaining respective coefficients for the IQ imbalance correction unit 104 shown in FIG. 5.

When the IQ imbalance estimation mode is set (step S110), the IQ imbalance correction coefficients estimated by the IQ imbalance estimation unit 108 are set in the IQ imbalance correction unit 104 (step Sill). Subsequently, when a local frequency is set to the center frequency of a transmission signal (step S112) and the wireless communication apparatus shifts to the signal reception mode, IQ imbalance correction is performed by using the correction coefficients set in the IQ imbalance correction unit 104.

Note that as indicated by expression (37), the coefficient $w_{qi}$ of the signal by which the Q channel signal is multiplied and which is added to the I channel signal is "0". Therefore, the IQ imbalance correction unit 104 may have an arrangement like that shown in FIG. 6 which does not include the multiplication unit 501c and the addition unit 502a in FIG. 5. Furthermore, the coefficients $w_{ii}$, $w_{iq}$, and $w_{qq}$ may be normalized to satisfy expressions (49) to (51). In this case, when normalization is done so that the coefficient $w_{qq}$ becomes "1", the IQ imbalance correction unit 104 comprises only the addition unit 502b and the multiplication units 501a and 501b, as shown in FIG. 7.

$$w_{ii} = \frac{G_q^{(r)}}{G_i^{(r)}} \cdot \cos\theta^{(r)} \tag{49}$$

-continued $$w_{iq} = \frac{G_q^{(r)}}{G_i^{(r)}} \cdot \sin\theta^{(r)} \quad (50)$$

$$w_{qq} = 1 \quad (51)$$

Increasing the local frequency by W/2 in this manner makes it possible to obtain coefficients for correcting IQ imbalance in the reception apparatus.

When the above IQ imbalance estimating operation is not performed, i.e., the normal signal reception mode to be described later is set, (a1) the frequency of a local signal is set to the center frequency of a received transmission signal, (a2) the pass bandwidths of the low-pass filters 101a and 101b are set to W (the signal band of a reception signal)/2, and the cutoff frequency is the center frequency, (a3) the sampling frequencies of the A/D conversion units 102a and 102b are set to 2 W, (a4) the cutoff frequencies of the digital low-pass filters 103a and 103b are set to W/2, and (a5) the number of parallel signals obtained by the S/P conversion unit 106 is set to N (N is the number of subcarriers in the case of, for example, OFDM).

In the above IQ imbalance estimation mode, (b1) the frequency of a local signal is set to a frequency higher than the center frequency of a received transmission signal by W/2, (a2) the cutoff frequencies of the analog low-pass filters 101a and 101b are set to W, (a3) the sampling frequencies of the A/D conversion units 102a and 102b are set to 4 W, (a4) the cutoff frequencies of the digital low-pass filters 103a and 103b are set to W, and (a5) the number of parallel signals obtained by the S/P conversion unit 106 is set to 2N.

It is possible to receive signals while the above IQ imbalance estimation mode is set. In this case, since all reception signals are included in the lower sideband, it is possible to demodulate received signals while estimating distortion due to IQ imbalance by demodulating the signals by using only subcarriers in the lower sideband unlike the demodulation of a general OFDM signal. In this case, since the transmission apparatus does not transmit any signals by subcarriers in the upper sideband for the reception apparatus, it is possible to demodulate signals without receiving any inter-subcarrier interference due to IQ imbalance in the reception apparatus.

A procedure for a case wherein reception is performed while IQ imbalance in the wireless communication apparatus in FIG. 1 is corrected by using IQ imbalance correction coefficients estimated (calculated) in the above manner (when the wireless communication apparatus is set in the signal reception mode) will be described next.

When the signal reception mode is set (step S100), the process advances to step S201.

When IQ imbalance correction coefficients are to be obtained, the frequency of a local signal generated by the transmitter 110 is set to be higher than the center frequency of a received transmission signal by W/2. If, however, correction coefficients have already been set as described above, this apparatus performs reception while matching the frequency of a local signal generated by the transmitter 110 with the center frequency of a transmission signal like a conventional general apparatus.

The quadrature demodulation unit 100 quadrature demodulates a signal received through the antenna 98 and the amplifier 99 by using a local signal having the same frequency as the center frequency of the received transmission signal (step S201). In this case, the frequency spectrum exhibits that signals do not concentrate on only the lower sideband as shown in FIG. 12, and the center frequency is located in the center of the signal band. Like a general reception apparatus, therefore, this apparatus sets the cutoff frequencies of the analog filters 101a and 101b to W/2 (step S202). This suppresses high-frequency components generated by quadrature demodulation and allows to extract only the baseband signal of a desired signal.

The A/D conversion units 102a and 102b convert signals passing through the analog filters 101a and 101b into digital signals. When IQ imbalance is to be estimated, the A/D conversion units 102a and 102b set sampling rates to 2 W or more. If, however, the center frequency of a local signal is matched with the center frequency of a received transmission signal, the sampling rates are set to W or more. In order to apply digital filters to signals after A/D conversion, the sampling rates of the A/D conversion units 102a and 102b are set to 2 W, and signals output from the analog filters 101a and 101b are converted into digital signals (step S203).

It suffices if a signal bandwidth which is to pass though the digital low-pass filters 103a and 103b which are applied to signals after A/D conversion is set to W. Therefore, the cutoff frequencies of the digital low-pass filters 103a and 103b are changed from W in the IQ imbalance estimation mode to W/2 to make signals after A/D conversion pass through the filters (step S204).

Note that in this case, it is not necessary to accurately set the cutoff frequencies of the filters to W/2. That is, the bandwidth of each filter may be slightly increased or decreased as long as it allows signals with the bandwidth W to pass through and suppress signals outside the band.

The IQ imbalance correction unit 104 then corrects IQ imbalance with respect to the signals to which the digital filters 103a and 103b have been applied (step S205). The IQ imbalance correction unit 104 uses the correction coefficients calculated by the IQ imbalance estimation unit 108 to correct IQ imbalance. If the IQ imbalance correction unit 104 has an arrangement like that shown in FIG. 5, the unit performs correction by weighting/combining I channel and Q channel signals as indicated by expressions (25) and (26). If the IQ imbalance correction unit 104 has an arrangement like that shown in FIG. 6, the unit performs correction according to expression (52). If the IQ imbalance correction unit 104 has an arrangement like that shown in FIG. 7, the unit performs correction according to expression (53).

$$\begin{cases} r'_i(t) = w_{ii} \cdot r_i(t) \\ r'_q(t) = w_{iq} \cdot r_i(t) + w_{qq} \cdot r_q(t) \end{cases} \quad (52)$$

$$\begin{cases} r'_i(t) = w_{ii} \cdot r_i(t) \\ r'_q(t) = w_{iq} \cdot r_i(t) + r_q(t) \end{cases} \quad (53)$$

The serial/parallel conversion unit 105 converts the signal after IQ imbalance correction into parallel signals to apply Fourier transform to them. Since the bandwidth of signals is set to 2 W when IQ imbalance is estimated, the signal is converted into parallel signals at the sampling rate 2 W. If, however, the frequency of a local signal is matched with the center frequency of a received transmission signal, since the signal bandwidth is set to W, the sampling rate of signals to which serial/parallel conversion is applied is set to W. In addition, since the total number of subcarriers of an OFDM signal is N, serial/parallel conversion is performed to obtain N parallel signals after serial/parallel conversion (step S206).

The Fourier transform unit 106 performs Fourier transform (discrete Fourier transform/fast Fourier transform) for the converted parallel signals to convert the signals into a signal in the frequency domain (step S207). When IQ imbalance is to be estimated in this case, Fourier transform with a sample count 2N is applied. When, however, the local frequency of the transmitter 110 is matched with the center frequency of a received transmission signal, Fourier transform with a sample count N is applied.

The demodulation unit 107 demodulates the signal converted by the Fourier transform unit 106 into the frequency domain for the respective subcarriers (step S109). In this case, when IQ imbalance is estimated, only the lower sideband subcarriers contain signals. However, when the local frequency of the transmitter 110 is matched with the center frequency of a received transmission signal, signals exist in both the upper sideband and the lower sideband. Therefore, demodulation is applied to the signals of subcarriers by which the data signal is transmitted in accordance with the specification of the system to which the present invention is applied.

In general OFDM transmission, a reception terminal transmits a known signal by some subcarriers (to be referred to as pilot subcarriers) to correct a channel variation and a phase error due to a frequency offset, phase noise, or a clock offset. In general, therefore, a channel variation and a phase error are estimated by using pilot subcarriers, and are corrected before demodulation, and demodulation is applied to the resultant signals. However, such correction is irrelevant to the gist of the present invention, and hence a detailed description thereof will be omitted.

In addition, since error correction is generally applied to OFDM transmission, decoding is performed after demodulation processing. However, this processing is irrelevant to the gist of the present invention, and hence a detailed description thereof will be omitted. In addition, in wireless communication, frame detection, timing synchronization, frequency synchronization, and the like are generally performed. In OFDM transmission, the processing of removing guard intervals is performed. However, since all these processes are irrelevant to the gist of the present invention, a description thereof will be omitted.

As described above, in the signal reception mode, IQ imbalance can be corrected by using correction coefficients calculated in the IQ imbalance estimation mode.

When estimating IQ imbalance correction coefficients, it suffices to calculate correction coefficients by using the above IQ imbalance estimation technique (setting the wireless communication apparatus in the above IQ imbalance estimation mode) only at the time of manufacture of the wireless communication apparatus and store the correction coefficients in a ROM. In this case, when the wireless communication apparatus is used, IQ imbalance estimation is not performed but only IQ imbalance correction is performed. Alternatively, the above IQ imbalance is estimation may be performed when the wireless communication apparatus is turned on, and only IQ imbalance correction may be performed afterward. Alternatively, it suffices to perform IQ imbalance estimation periodically to update the correction coefficients. IQ imbalance estimation may be performed at any frequency/timing as long as IQ imbalance and correction coefficients are estimated while the local frequency of the transmitter 110 is shifted at the time of IQ imbalance estimation, and IQ imbalance correction is performed by using the obtained correction coefficients.

As described above, according to the first embodiment, it is possible to accurately and easily estimate IQ imbalance in the reception unit of the wireless communication apparatus by shifting the frequency of a local signal in the reception unit from the center frequency of a desired signal so as to prevent the desired signal and an image signal (interference signal) originating from IQ imbalance from overlapping on the same subcarrier. This makes it possible to provide a wireless communication apparatus including a high-accuracy reception unit. Furthermore, this technique need not transmit any special signals for the estimation of IQ imbalance and can perform estimation with respect to arbitrary signals, and hence can be applied to an arbitrary OFDM transmission system.

Switching the IQ imbalance estimation mode and the signal reception mode can reduce the power consumption required when signals are received while correction is performed by using correction coefficients calculated in the IQ imbalance estimation mode (signal reception mode).

The first embodiment has exemplified the wireless communication apparatus used in the transmission system using the OFDM modulation scheme. However, the present invention is not limited to this, and can be applied to wireless communication apparatuses in transmission systems using a multi-carrier modulation scheme of transmitting a signal upon dividing it into a plurality of subcarriers and a single carrier modulation scheme of performing wireless communication by using one (single) carrier, as long as quadrature modulated signals are transmitted and received.

Figure 23:
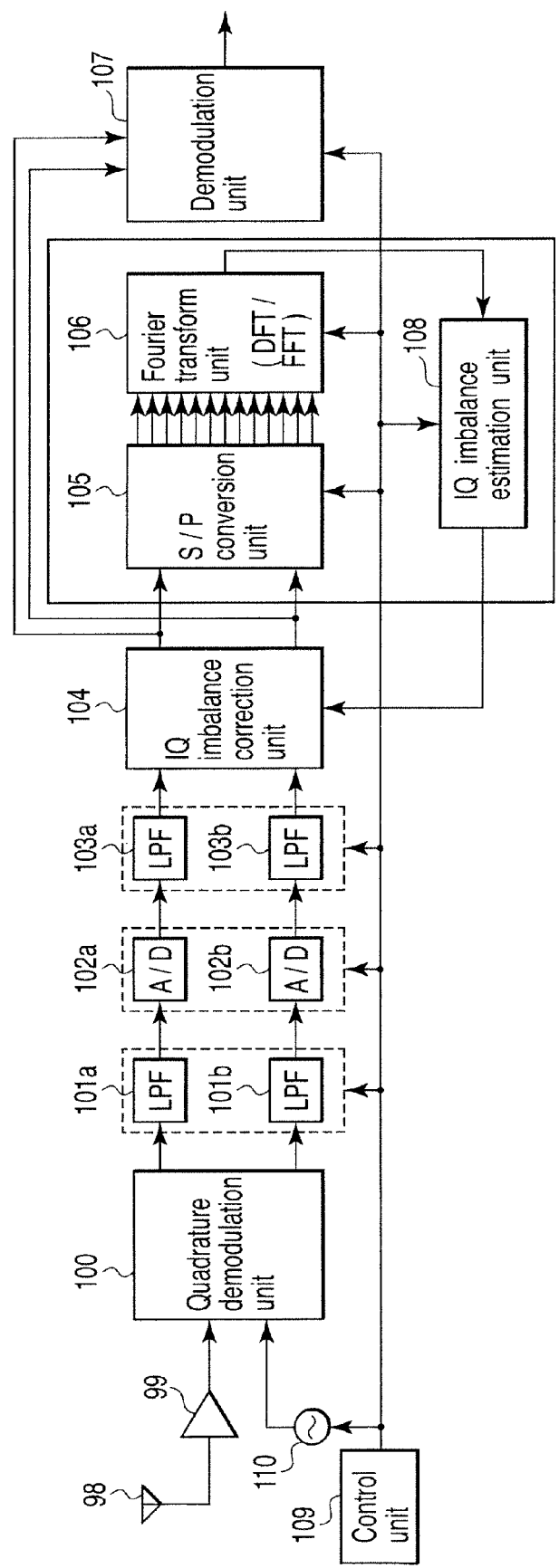
FIG. 23 is a block diagram showing an example of the arrangement of the reception unit of a wireless communication apparatus in a transmission system based on a single carrier modulation scheme.

IQ imbalance estimation and correction in a wireless communication apparatus which receive quadrature modulated signals applied to the single carrier modulation scheme will be briefly described with reference to FIG. 23. In this case, as in the above case of OFDM transmission, when the above IQ imbalance estimation is not performed, i.e., in the normal signal reception mode to be described later, (a1) the frequency of a local signal is set to the center frequency of a received transmission signal, (a2) the cutoff frequencies of the analog low-pass filters 101a and 101b are set to W (the signal band of the received transmission signal)/2, (a3) the sampling frequencies of the A/D conversion units 102a and 102b are set to 2 W, (a4) the cutoff frequencies of the digital low-pass filters 103a and 103b are set to W, and (a5) the number of parallel signals obtained by the S/P conversion unit 105 is set to N (N is an arbitrary integer equal to or more than two). In the above IQ imbalance estimation mode, (b1) the frequency of a local signal is set to a frequency higher than the center frequency of a received transmission signal by W/2, (a2) the cutoff frequencies of the analog low-pass filters 101a and 101b are set to W, (a3) the sampling frequencies of the A/D conversion units 102a and 102b are set to 4 W, (a4) the cutoff frequencies of the digital low-pass filters 103a and 103b are set to W, and (a5) the number of parallel signals obtained by the S/P conversion unit 105 is set to 2N.

When IQ imbalance is to be estimated, the quadrature demodulation unit 100 quadrature demodulates the quadrature modulated signal received through the antenna 98 and the amplifier 99 with the above settings or arrangement in the IQ imbalance estimation mode. The obtained I channel and Q channel signals pass through the low-pass filters 101a and 101b, the A/D conversion units 102a and 102b, and the digital low-pass filters 103a and 103b, and are serial/parallel-converted and Fourier-transformed to be converted into signals (frequency components) in the frequency domain. The IQ imbalance estimation unit 108 calculates correction coefficients by using the signals in the frequency domain in the same manner as described above. The calculated correction coefficients are set in the IQ imbalance correction unit 104.

When signals are received while IQ imbalance correction is performed by using calculated correction coefficients after the apparatus is switched to the above signal reception mode, the quadrature demodulation unit 100 quadrature demodulates quadrature modulated signals received through the antenna 98 and the amplifier 99. The IQ imbalance correction unit 104 then performs IQ imbalance correction by using the above correction coefficients with respect to the obtained I channel and Q channel signals passing through the low-pass filters 101a and 101b, the A/D conversion units 102a and 102b, and the digital low-pass filters 103a and 103b. Thereafter, the demodulation unit 107 obtains user data by performing predetermined demodulation processing for the I channel and Q channel signals after IQ imbalance correction.

Second Embodiment

A wireless communication apparatus according to the second embodiment will be described.

The arrangement of a wireless communication apparatus according to the second embodiment is the same as that shown in FIG. 1, and the arrangement of an IQ imbalance correction unit 104 is the same as one of those shown in FIGS. 5 to 7. In addition, this embodiment is the same as the first embodiment in that the local frequency of a transmitter 110 is set to be higher than the center frequency of a received transmission signal by W/2 to estimate IQ imbalance, and the bandwidths and sampling rates of A/D conversion units, filters, serial/parallel conversion unit, and Fourier transform unit are set to be twice those in the normal signal reception mode.

The second embodiment differs from the first embodiment in an IQ imbalance estimation method.

The first embodiment defines a reception vector represented by expression (39) by using signals received by the $-k$th and $k$th subcarriers, obtains a correlation matrix as indicated by expression (41), and estimates IQ imbalance from an eigenvector corresponding to the maximum eigenvalue of the matrix. In contrast to this, the second embodiment performs estimation by using a correlation vector $r_{xx}$ represented by expression (54).

$$r_{xx} = \sum_m \sum_k x^*_{-k}(m) x^{(k)}(m) \qquad (54)$$
$$= \sum_m \sum_k x^*_{-k}(m) \begin{bmatrix} x_{-k}(m) \\ x^*_k(m) \end{bmatrix}$$

It suffices to calculate expression (54) by using all or only some of the subcarriers. In addition, it suffices to perform estimation by using, as an OFDM symbol, one or both of a signal known to the reception apparatus, such as a preamble signal, and an information symbol by which a data signal is transmitted.

Note that since the reception signals of the $-k$th and $k$th subcarriers can be expressed by using expressions (23) and (24), the correction vector of expression (54) can be expanded like expression (55).

$$r_{xx} = \sum_m \sum_k x^*_{-k}(m) x^{(k)}(m) \qquad (55)$$
$$= \sum_m \sum_k \left\{ |a_k(m)|^2 \begin{bmatrix} |\alpha^{(r)}|^2 \\ \alpha^{(r)*}\beta^{(r)*} \end{bmatrix} + n^*_{-k}(m) a^{(k)}(m) \begin{bmatrix} \alpha^{(r)} \\ \beta^{(r)*} \end{bmatrix} + a^{(k)*}(m) \alpha^{(r)*} \begin{bmatrix} n_{-k} \\ n^*_k \end{bmatrix} + \right.$$

-continued
$$\left. \begin{bmatrix} |n_{-k}|^2 \\ n^*_{-k} n^*_k \end{bmatrix} \right\}$$

That is, according to expression (54), a first correlation value $r_{xx}(1)$ is obtained by multiplying the complex conjugate signal of the reception signal of the $-k$th subcarrier of a plurality of $-k$th subcarriers by the reception signal, and a second correlation value $r_{xx}(2)$ is obtained by multiplying the complex conjugate signal of the reception signal of the $-k$th subcarrier by the complex conjugate signal of the $k$th subcarrier located at a position symmetrical to each $-k$th subcarrier with respect to the local frequency.

As in the case wherein a correlation matrix is calculated in the first embodiment, since there is no correlation between a transmission signal, IQ imbalance, distortion, and noise, when averaging is performed by using a plurality of subcarriers and a plurality of OFDM symbols, the second and third terms of the right-hand side of expression (55) can be neglected. Therefore, expression (55) can be rewritten as expression (56).

$$r_{xx} = \sum_m \sum_k X^*_{-k}(m) x^{(k)}(m) \qquad (56)$$
$$= A \begin{bmatrix} |\alpha^{(r)}|^2 \\ \alpha^{(r)*}\beta^{(r)*} \end{bmatrix} + \begin{bmatrix} \sigma^2 \\ 0 \end{bmatrix}$$

If the ratio between $\alpha_{(r)}$ and $\beta^{(r)*}$ can be obtained from expressions (45) and (46), $\alpha^{(r)}$ and $\beta^{(r)*}$ can be obtained. In addition, IQ imbalance correction coefficients can be obtained according to expressions (35) to (38). In this embodiment, the ratio between $\alpha^{(r)}$ and $\beta^{(r)*}$ can be obtained according to expression (57) from the correlation vector obtained according to expression (54).

$$\frac{\beta^{(r)*}}{\alpha^{(r)}} = \frac{r_{xx}(2)}{r_{xx}(1) - \hat{\sigma}^2} \qquad (57)$$

where $\hat{\sigma}^2$ is the estimated value of noise power, and $r_{xx}(1)$ and $r_{xx}(2)$ are elements of $r_{xx}$ as indicated by the following equation:

$$r_{xx} = \begin{bmatrix} r_{xx}(1) \\ r_{xx}(2) \end{bmatrix} \qquad (58)$$

A method of obtaining IQ imbalance correction coefficients by using the ratio between $\alpha^{(r)}$ and $\beta^{(r)*}$ obtained by expression (57) is the same as that in the first embodiment, and hence a repetitive description will be omitted.

As described above, this embodiment need not calculate any correlation matrix or use eigendecomposition, and hence can obtain IQ imbalance correction coefficients with a small computation amount.

A method of correcting IQ imbalance by using the correction coefficients obtained in the above manner and a procedure up to the demodulation of a signal are the same as those in the first embodiment, and hence a detailed description thereof will be omitted.

As described above, according to the second embodiment, a wireless communication apparatus which can correct IQ imbalance and comprises a high-accuracy reception unit can be provided. In addition, this embodiment need not transmit any special signals for the estimation of IQ imbalance and can perform estimation with respect to arbitrary signals, and hence can be applied to an arbitrary OFDM transmission system. Furthermore, since there is no need to perform computation to obtain a correlation matrix when estimating IQ imbalance or perform eigenanalysis, coefficients for correcting IQ imbalance can be obtained with a small computation amount.

Note that the technique described in the second embodiment can be equally applied to not only a wireless communication apparatus (FIG. 1) in a transmission system using a multi-carrier modulation scheme such as the OFDM modulation scheme but also a wireless communication apparatus (FIG. 23) in a transmission system using a single carrier modulation scheme.

Third Embodiment

A wireless communication apparatus according to the third embodiment will be described.

The arrangement of a wireless communication apparatus according to the third embodiment is the same as that shown in FIG. 1, and the arrangement of an IQ imbalance correction unit 104 is the same as one of those shown in FIGS. 5 to 7. In addition, this embodiment is the same as the first and second embodiments in that the local frequency of a transmitter 110 is set to be higher than the center frequency of a received transmission signal by W/2 to estimate IQ imbalance, and the bandwidths and sampling rates of A/D conversion units, filters, serial/parallel conversion unit, and Fourier transform unit are set to be twice those in the normal signal reception mode.

The third embodiment differs from the first and second embodiments in an IQ imbalance estimation method.

The second embodiment obtains a correlation vector $r_{xx}$ according to expression (54), and calculates IQ imbalance correction coefficients by calculating the ratio between $\alpha^{(r)}$ and $\beta^{(r)}$ according to expression (57).

Consider expression (56). A value A corresponds to signal power. If the signal power is sufficiently large relative to noise power, the second term of the right-hand side of expression (56) can be neglected. For this reason, the correlation vector $r_{xx}$ can be expressed as follows:

$$r_{xx} = \sum_{m} \sum_{k} x^*_{-k}(m) x^{(k)}(m) \qquad (59)$$
$$= A \begin{bmatrix} |\alpha^{(r)}|^2 \\ \alpha^{(r)*} \beta^{(r)*} \end{bmatrix}$$

Therefore, the ratio between $\alpha^{(r)}$ and $\beta^{(r)*}$ can be obtained from expression (60).

$$\frac{\beta^{(r)*}}{\alpha^{(r)}} = \frac{r_{xx}(2)}{r_{xx}(1)} \qquad (60)$$

This obviates the necessity of estimating noise power.

A method of obtaining IQ imbalance correction coefficients from the ratio between $\alpha^{(r)}$ and $\beta^{(r)*}$ obtained in the above manner is the same as that in the first and second embodiments, and hence a repetitive description will be omitted. In addition, a method of correcting IQ imbalance by using the correction coefficients obtained in the above manner and a procedure up to the demodulation of a signal are the same as those in the first and second embodiments, and hence a detailed description thereof will be omitted.

As described above, according to the third embodiment, a wireless communication apparatus which can correct IQ imbalance in the reception unit of the wireless communication apparatus and comprises a high-accuracy reception unit can be provided. In addition, this embodiment need not transmit any special signals for the estimation of IQ imbalance and can perform estimation with respect to arbitrary signals, and hence can be applied to an arbitrary OFDM transmission system. Furthermore, since there is no need to perform computation to obtain a correlation matrix when estimating IQ imbalance or perform eigenanalysis or estimate noise power, coefficients for correcting IQ imbalance can be obtained with a small computation amount.

Note that the technique described in the third embodiment can be equally applied to not only a wireless communication apparatus (FIG. 1) in a transmission system using a multi-carrier modulation scheme such as the OFDM modulation scheme but also a wireless communication apparatus (FIG. 23) in a transmission system using a single carrier modulation scheme.

Fourth Embodiment

A wireless communication apparatus according to the fourth embodiment will be described.

The arrangement of a wireless communication apparatus according to the fourth embodiment is the same as that shown in FIG. 1, and the arrangement of an IQ imbalance correction unit 104 is the same as one of those shown in FIGS. 5 to 7. In addition, this embodiment is the same as the first to third embodiments in that the local frequency of a transmitter 110 is set to be higher than the center frequency of a received transmission signal by W/2 to estimate IQ imbalance, and the bandwidths and sampling rates of A/D conversion units, filters, serial/parallel conversion unit, and Fourier transform unit are set to be twice those in the normal signal reception mode.

The fourth embodiment differs from the first to third embodiments in an IQ imbalance estimation method.

The first to third embodiments perform estimation in accordance with the reception vector represented by expression (39).

If the reception power is sufficiently large relative to noise power and the noise can be neglected, expressions (23) and (24) can be rewritten as expressions (61) and (62).

$$x_{-k}(m) \cong a_k(m) \cdot \alpha^{(r)} \qquad (61)$$

$$x_k(m) \cong a_k^*(m) \cdot \beta^{(r)} \qquad (62)$$

Therefore, the ratio between $\alpha^{(r)}$ and $\beta^{(r)*}$ can be obtained from expression (63).

$$\frac{\beta^{(r)*}}{\alpha^{(r)}} = \frac{1}{D} \sum_{m} \sum_{k} \frac{x_k^*}{x_{-k}} \qquad (63)$$

where D represents the number of subcarriers x the number of OFDM symbols used for averaging.

The fourth embodiment can obtain the ratio between $\alpha^{(r)}$ and $\beta^{(r)*}$ from the ratio between the reception signal of a plurality of $-k$th subcarriers and a complex conjugate signal of the reception signal of the $k$th subcarrier located at a position symmetrical to each $-k$th subcarrier with respect to the local frequency.

A method of obtaining IQ imbalance correction coefficients from the ratio between $\alpha^{(r)}$ and $\beta^{(r)*}$ obtained in the above manner is the same as that in the first to third embodiments, and hence a repetitive description will be omitted. In addition, a method of performing correction by using obtained correction coefficients and a procedure up to the demodulation of a signal are the same as those in the first to third embodiments, and hence a detailed description thereof will be omitted.

As described above, according to the fourth embodiment, a wireless communication apparatus which can correct IQ imbalance in the reception unit of the wireless communication apparatus and comprises a high-accuracy reception unit can be provided. In addition, this embodiment need not transmit any special signals for the estimation of IQ imbalance and can perform estimation with respect to arbitrary signals, and hence can be applied to an arbitrary OFDM transmission system. Furthermore, since there is no need to perform computation to obtain a correlation matrix when estimating IQ imbalance or perform eigenanalysis or estimate noise power, coefficients for correcting IQ imbalance can be obtained with a small computation amount.

Fifth Embodiment

A wireless communication apparatus according to the fifth embodiment will be described.

The arrangement of a wireless communication apparatus according to the fifth embodiment is the same as that shown in FIG. 1, and the arrangement of an IQ imbalance correction unit 104 is the same as one of those shown in FIGS. 5 to 7. In addition, this embodiment is the same as the first to fourth embodiments in that the local frequency of a transmitter 110 is set to be higher than the center frequency of a received transmission signal by W/2 to estimate IQ imbalance, and the bandwidths and sampling rates of A/D conversion units, filters, serial/parallel conversion unit, and Fourier transform unit are set to be twice those in the normal signal reception mode.

The fifth embodiment differs from the first to fourth embodiments in subcarriers for IQ imbalance estimation.

The first to fourth embodiments perform estimation by using the fact that a subcarrier with a positive subcarrier number is identical to an image signal (interference signal) of a subcarrier signal with a negative subcarrier number, without imposing any specific limitation on subcarriers to be used for IQ imbalance estimation.

Figure 19:
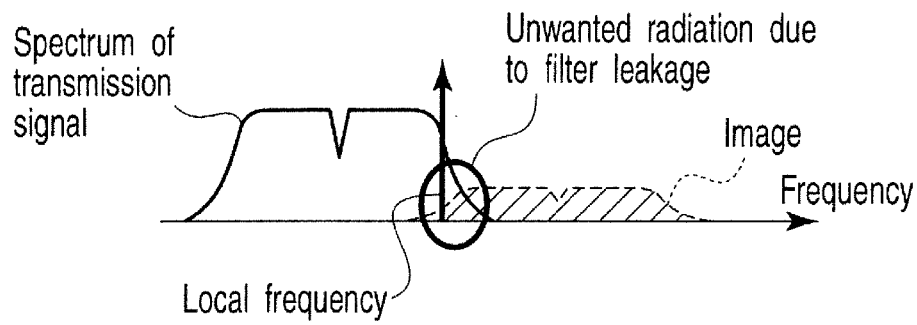
FIG. 19 is a graph showing an example of a signal spectrum in a case wherein IQ imbalance correction coefficients are estimated according to the fifth embodiment.

If, however, the filters used by the transmission apparatus have not sufficiently suppress high-frequency signals, the spectrum of the transmission signal leaks into the subcarriers with positive subcarrier numbers higher than the local frequency of the reception terminal, as shown in FIG. 19. As a result, when reception is performed while the center frequency of the transmitter 110 is shifted to estimate IQ imbalance, a signal received by subcarriers with positive subcarriers contains not only an image signal of the transmission signal but also radiation components outside the band of the transmission signal, resulting in a deterioration in the estimation accuracy of distortion due to IQ imbalance.

If another terminal uses an adjacent channel, the reception terminal affected by radiation outside the signal band of the terminal, and subcarriers near the two ends of the band of the reception terminal also receive unwanted signals.

In consideration of the above problem, in the fifth embodiment, subcarriers to be used for IQ imbalance estimation are limited to only subcarriers which are located near the center frequency of the transmission signal and at symmetrical positions with respect to the local frequency of the reception terminal. As a result of the above processing, the following 4K subcarriers are used for estimation:

$$S: \{\pm(N/2\pm1), \pm(N/2\pm2), \ldots, \pm(N/2\pm K)\} \quad (64)$$

where K is an arbitrary positive integer smaller than N/2 and is set in consideration of the influences of out-of-band radiation.

It suffices to obtain the ratio between $\alpha^{(r)}$ and $\beta^{(r)*}$ by using one of the methods according to the first to fourth embodiments and obtain correction coefficients, and hence a detailed description thereof will be omitted. In addition, a method of correcting IQ imbalance by using obtained correction coefficients and a procedure up to the demodulation of a signal are the same as those in the first to fourth embodiments, and hence a detailed description thereof will be omitted.

As described above, according to the fifth embodiment, a high-accuracy wireless communication apparatus which can correct IQ imbalance in the reception unit of the wireless communication apparatus can be provided. In addition, this embodiment need not transmit any special signals for the estimation of IQ imbalance and can perform estimation with respect to arbitrary signals, and hence can be applied to an arbitrary OFDM transmission system. Furthermore, limiting subcarriers to be used for estimation in consideration of the influences of a transmission signal or radiation outside the band of another terminal using an adjacent channel makes it possible to implement high-accuracy IQ imbalance correction even in an environment in which out-of-band radiation cannot be neglected, thereby providing a high-accuracy reception apparatus.

Note that the technique described in the fifth embodiment can be equally applied to not only a wireless communication apparatus (FIG. 1) in a transmission system using a multi-carrier modulation scheme such as the OFDM modulation scheme but also a wireless communication apparatus (FIG. 23) in a transmission system using a single carrier modulation scheme.

Sixth Embodiment

A wireless communication apparatus according to the sixth embodiment will be described.

The sixth embodiment will exemplify a wireless communication apparatus which has a function fixed to the IQ imbalance estimation mode (which does not switch between the IQ imbalance estimation mode and the signal reception mode) in the wireless communication apparatus in FIG. 1.

The sixth embodiment is the same as the first to fifth embodiments in that the local frequency of a transmitter is set to be higher than the center frequency of a received transmission signal by W/2 to estimate IQ imbalance, and correction coefficients for correcting IQ imbalance are calculated by using two subcarriers located at symmetrical positions with respect to the local frequency. In addition, this embodiment is the same as the first to fifth embodiments in that IQ imbalance is corrected by using obtained correction coefficients.

The sixth embodiment differs from the first to fifth embodiments in that analog filters, A/D conversion units, digital filters, a serial/parallel conversion unit, and a Fourier transform unit implement the same functions regardless of whether or not IQ imbalance is to be estimated.

The arrangement of the reception unit of the wireless communication apparatus according to the sixth embodiment will be described with reference to FIG. 2. Note that the same reference numerals as in FIG. 1 denote the same parts in FIG. 2.

The wireless communication apparatus in FIG. 2 comprises an quadrature demodulation unit 100, analog low-pass filters 201a and 201b, A/D converters 202a and 202b, digital low-pass filters 203a and 203b, an IQ imbalance correction unit 104, a serial/parallel conversion unit 205, a Fourier transform unit 206, a demodulation unit 107, an IQ imbalance estimation unit 108, a control unit 109, and a transmitter 110.

Since the signals quadrature demodulated by the quadrature demodulation unit 100 contain high-frequency components, the low-pass filters 201a and 201b are applied to the I channel and Q channel signals to suppress the high-frequency components. In this case, the low-pass filters 201a and 201b need to pass signals with a bandwidth 2 W twice a bandwidth W of the transmission signal, and hence need to have cutoff frequencies equal to or more than W.

The A/D converters 202a and 202b respectively convert the I channel and Q channel signals, whose high-frequency components are suppressed by the low-pass filters 201a and 201b, into digital signals. At this time, the A/D converters 202a and 202b sample the signals at a sampling rate twice or more the signal bandwidth W.

The digital low-pass filters 203a and 203b are respectively applied to the I channel and Q channel signals converted into the digital signals by the A/D converters 202a and 202b. In this case, the low-pass filters 203a and 203b need to pass signals with a bandwidth twice the bandwidth W of the transmitted signal, and hence need to have cutoff frequencies equal to or more than W. Note that as the low-pass filters 203a and 203b, any types of filters, e.g., FIR filters or IIR filters, may be used, as in the first to fifth embodiments.

The IQ imbalance correction unit 104 performs correction by using the I channel and Q channel signals to which the low-pass filters 203a and 203b are applied. The IQ imbalance correction unit 104 is the same as that in the first to fifth embodiments, and hence a detailed description thereof will be omitted.

The serial/parallel conversion unit 205 converts the IQ-imbalance-corrected signals into parallel signals. The serial/parallel conversion unit 205 has a function of serial/parallel-converting a signal with a sampling rate twice that of the transmission signal, and converts the signal into parallel signals twice the total number of subcarriers.

The Fourier transform unit 206 applies Fourier transform (discrete Fourier transform/fast Fourier transform) to the parallel signals obtained by serial/parallel conversion. In this case, the Fourier transform unit 206 applies Fourier transform (discrete Fourier transform/fast Fourier transform) to samples twice the total number of subcarriers of the transmitted OFDM signal.

The demodulation unit 107 demodulates the signal converted into the frequency domain. The operation of the demodulation unit 107 is the same as that in the first to fifth embodiments, and hence a detailed description thereof will be omitted.

Operation to be performed to estimate IQ imbalance in the reception unit of the wireless communication apparatus having the arrangement shown in FIG. 2 and operation to be performed to correct IQ imbalance by using estimated correction coefficients will be described next.

First of all, the frequency of a local signal (local frequency) generated by the transmitter 110 is set to be higher than the center frequency of a signal to be transmitted by W/2 as in the first to fifth embodiments. The quadrature demodulation unit 100 performs quadrature demodulation by using this local frequency. Quadrature demodulation is the same as that in the first to fifth embodiments, and hence a description will not be repeated.

In the first to fifth embodiments, the cutoff frequencies of the analog filters and digital filters are set to be twice in the normal signal reception mode at the time of IQ imbalance estimation. In contrast, the sixth embodiment uses filters whose cutoff frequencies are set to be twice those in advance. In the first to fifth embodiments, the A/D conversion units 102a and 102b and the serial/parallel conversion unit 105 operate at a sampling rate twice in the normal signal reception mode at the time of IQ imbalance estimation. In contrast, the sixth embodiment uses the A/D converters 202a and 202b and the serial/parallel conversion unit 205 which are designed in advance to operate at a sampling rate twice that in the normal signal reception mode. The serial/parallel conversion unit 205 converts an input signal into 2N parallel signals. The Fourier transform unit 206 further converts the signals of the 2N samples into a signal in the frequency domain.

As described above, the arrangement in FIG. 2 does not include the operation of switching the functions of the respective components unlike the arrangement in FIG. 1. However, the arrangement in FIG. 2 has the same settings as those in the reception unit of the wireless communication apparatus in FIG. 1 in the IQ imbalance estimation mode.

In the sixth embodiment, therefore, when IQ imbalance is estimated, correction coefficients for correcting IQ imbalance caused in the reception unit can be calculated by using one of the first to fifth embodiments.

Signal reception operation in which IQ imbalance is corrected by using obtained correction coefficients will be described next.

The transmitter 110 sets a local frequency to the center frequency of a transmission signal, and the quadrature demodulation unit 100 performs quadrature demodulation as in the first to fifth embodiments.

The analog low-pass filters 201a and 201b are applied to the above signals. At this time, unlike the first to fifth embodiments, the cutoff frequencies of the analog low-pass filters 201a and 201b are set to be twice the cutoff frequency in the signal reception mode, and hence noise power after passage through the filters is twice that before passage through the filters. In addition, since the pass bandwidths are broad, these signals may contain signals from another terminal which is performing communication by using an adjacent channel. However, since high-frequency components generated by quadrature demodulation can be suppressed, designed signals can be extracted.

The A/D converters 202a and 202b respectively convert the signals passing through the analog filters 201a and 201b into digital signals. At this time, in the first to fifth embodiments, the sampling rate of each A/D conversion unit is adjusted to a sampling rate half that set at the time of IQ imbalance estimation. In the sixth embodiment, A/D conversion is performed at the same sampling rate as that set at the time of IQ imbalance estimation.

The cutoff frequencies of the digital filters 203a and 203b which are applied to the signals after A/D conversion are also set to be twice those in the signal reception mode like the digital filters 103a and 103b in the first to fifth embodiments.

As a consequence, like the analog filters 201a and 201b, the digital filters reduce the effect of suppressing adjacent channels and degrading the noise figure. However, it is possible to extract desired signals.

The IQ imbalance correction unit 104 corrects IQ imbalance with respect to the signals after the application of the digital low-pass filters. The operation of the IQ imbalance correction unit 104 is the same as that in the first to fifth embodiments, and hence a detailed description thereof will be omitted.

Subsequently, the serial/parallel conversion unit 205 converts the signals into parallel signals to which Fourier transform is to be applied. In this embodiment, as in the case wherein IQ imbalance correction coefficients are estimated, the serial/parallel conversion unit serial/parallel-converts the signals with a sampling rate 2 W into 2N parallel signals.

The Fourier transform unit 206 performs Fourier transform (discrete Fourier transform/fast Fourier transform) for the parallel signals obtained by serial/parallel conversion to convert them into a signal in the frequency domain. Unlike in the signal reception mode in the first to fifth embodiments, when performing Fourier transform, the sixth embodiment applies discrete Fourier transform to the signals of 2N samples.

The demodulation unit 107 demodulates the signal converted by the Fourier transform unit 206 into the frequency domain for each subcarrier. In this case, when IQ imbalance is estimated, only the lower sideband subcarriers contain signals. However, when the local frequency of the transmitter 110 is matched with the center frequency of a reception signal, signals exist in both the upper sideband and the lower sideband. Therefore, demodulation is applied to the signals of subcarriers by which the data signal is transmitted in accordance with the specification of the system to which the present invention is applied.

In addition, noise components and signals through an adjacent channel which are received because the cutoff frequencies of the analog filters and digital filters are doubled exist in subcarriers on the two ends of the band instead of subcarriers containing desired signals. For this reason, the signals after Fourier transform are free from the influence of a deterioration due to the high cutoff frequencies of the filters. Therefore, no digital filters need be used in the sixth embodiment, even though the digital filters are used in FIG. 2.

As described above, as in the first to fifth embodiments, it is possible to calculate IQ imbalance correction coefficients and implement signal reception upon IQ imbalance correction using obtained correction coefficients without changing the settings/arrangement for the IQ imbalance estimation mode in the wireless communication apparatus in FIG. 1 (without switching the IQ imbalance estimation mode and the signal reception mode). As a consequence, the same effects as those of the first to fifth embodiments can be obtained with a simple arrangement compared with the wireless communication apparatus in FIG. 1.

In the sixth embodiment, all the functions of the analog low-pass filters 201a and 201b, A/D converters 202a and 202b, digital low-pass filters 203a and 203b, serial/parallel conversion unit 205, and Fourier transform unit 206 are fixed. It suffices however, to make this apparatus operate while the functions of some of these components are fixed, and the functions of the remaining components are switched as in the first to fifth embodiments. It suffices to make the apparatus operate while the functions of components which are difficult to control, e.g., the A/D conversion units and the analog filters, are fixed and the functions of the digital low-pass filters, serial/parallel conversion unit, and Fourier transform unit are switched depending on whether the IQ imbalance estimation mode is set. In order to reduce the power consumption, the operation may be made operate while the functions of the A/D conversion units, the Fourier transform unit, and the serial/parallel conversion unit attached to the Fourier transform unit are switched, and no switching control is performed on the remaining components. It suffices to combine components whose functions are to be switched with components which are made to operate while their functions are fixed, in accordance with an application.

As described above, according to the sixth embodiment, a wireless communication apparatus which can correct IQ imbalance in the reception unit of the wireless communication apparatus and comprises a high-accuracy reception apparatus can be provided. Note that this embodiment need not transmit any special signals for the estimation of IQ imbalance and can perform estimation with respect to arbitrary signals, and hence can be applied to an arbitrary OFDM transmission system. Furthermore, using an arrangement which combines necessary functions at the time of IQ imbalance estimation makes it possible to implement easy control at the time of IQ imbalance estimation and simplify the apparatus.

Seven Embodiment

A wireless communication apparatus according to the seventh embodiment will be described.

The seventh embodiment is the same as the first to sixth embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the seventh embodiment is the same as those embodiments in that IQ imbalance is corrected by using obtained correction coefficients.

The seventh embodiment differs from the first to sixth embodiments in that when IQ imbalance is to be estimated, the local frequency of the transmitter is set to be lower than the center frequency of the transmission signal by W/2.

The arrangement of the wireless communication apparatus according to the seventh embodiment is the same as those shown in FIGS. 1 and 2.

The operation of estimating IQ imbalance in this embodiment will be described next.

In this embodiment, when IQ imbalance is to be estimated, the frequency of a local signal generated by a transmitter 110 is set to be lower than the center frequency of a received transmission signal by W/2. Thereafter, like the first to sixth embodiments, the seventh embodiment performs quadrature demodulation, application of analog low-pass filters, A/D conversion, application of digital low-pass filters, serial/parallel conversion, and Fourier transform.

This embodiment also calculates correction coefficients for correcting IQ imbalance by using the signal in the frequency domain which is obtained by Fourier transform. Unlike in the first to sixth embodiments, however, since the local frequency of the transmitter 110 is set to be lower than the center frequency of the received transmission signal by W/2, the frequency spectrum exists in the subcarriers in the upper sideband instead of the subcarrier in the lower sideband as shown in FIG. 12. In addition, an image signal (interference signal) generated by IQ imbalance in the reception unit of the wireless communication apparatus appears in the subcarriers in the lower sideband instead of the subcarrier in the upper sideband. Therefore, the reception signals of the −kth and kth subcarriers are represented by expressions (65) and (66) instead of expressions (23) and (24).

$$x_{-k}(m) = (\alpha^{(t)*} \cdot s_k^*(m) + \beta^{(t)*} \cdot s_{N-k}(m)) h_k^* \cdot \beta^{(r)} + n_{-k}(m) \quad (65)$$

$$x_k(m) = (\alpha^{(t)} \cdot s_k(m) + \beta^{(t)} \cdot s_{N-k}^*(m)) h_k^* \cdot \beta^{(r)} + n_{-k}(m) \quad (66)$$

In addition, a reception vector having the reception signals of the −kth and kth subcarriers as elements is defined by expression (67) instead of expression (39).

$$x^{(k)}(m) = \begin{bmatrix} x_k(m) \\ x_{-k}^*(m) \end{bmatrix} \quad (67)$$

This apparatus estimates IQ imbalance by using the reception vector represented by expression (67). When using the IQ imbalance estimation method described in the first embodiment, the apparatus calculates the correlation matrix represented by expression (67) according to expression (41), and then calculates the ratio between $\alpha^{(r)}$ and $\beta^{(r)*}$ by using an eigenvector corresponding to the maximum eigenvalue of the matrix according to expression (47).

When using the IQ imbalance estimation method described in the second embodiment, the apparatus obtains a correlation vector defined by expression (68) given below by using the reception vector represented by expression (67) instead of expression (54).

$$r_{xx} = \sum_m \sum_k x_k^*(m) x^{(k)}(m) \quad (68)$$

This embodiment is the same as the second embodiment in that the apparatus calculates the ratio between $\alpha^{(r)}$ and $\beta^{(r)*}$ by using the obtained correlation vector according to expression (57).

When using the IQ imbalance estimation method described in the third embodiment, the apparatus calculates the ratio between $\alpha^{(r)}$ and $\beta^{(r)*}$ by using the correlation vector obtained by expression (68) according to expression (60). When using the IQ imbalance estimation method described in the fourth embodiment, the apparatus calculates the ratio between $\alpha^{(r)}$ and $\beta^{(r)*}$ by using expression (69) instead of expression (63).

$$\frac{\beta^{(r)*}}{\alpha^{(r)}} = \frac{1}{D} \sum_m \sum_k \frac{x_{-k}^*}{x_k} \quad (69)$$

These estimation methods are the same in that IQ imbalance correction coefficients are calculated by using the ratio between $\alpha^{(r)}$ and $\beta^{(r)*}$ according to expressions (35) to (38), (45), and (46).

In this manner, even when the local frequency of the transmitter 110 is set to be low, IQ imbalance correction coefficients can be obtained by the same technique as that in the first to sixth embodiments.

A procedure for demodulating an OFDM signal by making an IQ imbalance correction unit 104 correct IQ imbalance by using obtained correction coefficients is the same as that in the first to fifth embodiment or in the sixth embodiment, and hence a description will not be repeated.

As described above, according to the seventh embodiment, a wireless communication apparatus which can correct IQ imbalance in the reception unit of the wireless communication apparatus and comprises a high-accuracy reception apparatus can be provided. Note that this embodiment need not transmit any special signals for the estimation of IQ imbalance and can perform estimation with respect to arbitrary signals, and hence can be applied to an arbitrary OFDM transmission system.

Note that the technique described in the seventh embodiment can be equally applied to not only a wireless communication apparatus (FIG. 1) in a transmission system using a multi-carrier modulation scheme such as the OFDM modulation scheme but also a wireless communication apparatus (FIG. 23) in a transmission system using a single carrier modulation scheme.

Eighth Embodiment

A wireless communication apparatus according to the eighth embodiment will described.

The eighth embodiment is the same as the first to seventh embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the eighth embodiment is the same as those embodiments in that IQ imbalance is corrected by using obtained correction coefficients.

The eighth embodiment differs from the first to seventh embodiments in that the local frequency of a transmitter is set to be higher than the center frequency of a transmission signal by W/2 or lower than it by W/2 in accordance with a situation when IQ imbalance is to be estimated.

The first to seventh embodiments are characterized in that IQ imbalance is estimated while the local frequency of the transmitter 110 is shifted from the center frequency of a transmission signal to prevent a desired signal from interfering with an interference signal due to IQ imbalance in the reception unit. If, however, another terminal is using an adjacent channel, interference from the adjacent channel is contained subcarriers in which only an image signal (interference signal) due to IQ imbalance should exist. This may degrade the estimation accuracy of IQ imbalance.

Consider, for example, a case wherein another wireless communication apparatus is using an adjacent channel higher than the channel which this wireless communication apparatus is using. In this case, if the local frequency of the transmitter 110 is set to be higher than the center frequency of a transmission signal to be received by W/2 as in the first to sixth embodiments, this apparatus receives signals from another wireless communication apparatus, which is using the adjacent channel, by subcarrier in the upper sideband. As a result, it is difficult to correctly calculate the ratio between a desired signal and an image signal, resulting in a deterioration in the estimation accuracy of IQ imbalance.

In this case, if an adjacent channel lower than the channel which this apparatus is using is not used, setting the local frequency to be lower by W/2 makes it possible to prevent interference with a signal using an adjacent channel higher than the channel which the apparatus is using. In contrast, if another wireless communication apparatus is using a lower adjacent channel but is not using a higher adjacent channel, setting the local frequency to be higher by W/2 makes it possible to prevent interference.

In this manner, changing the local frequency of the transmitter 110 in accordance with whether an adjacent channel is being used can improve the estimation accuracy of IQ imbalance.

The system proposed in IEEE802.11TGn which is a task group intended to speed up wireless LAN (reference 2: Joint Proposal, High throughput extension to the 802.11 Standard, PHY, IEEEP802.11-05/1102r04, January 2006 and reference 3: Joint Proposal, High throughput extension to the 802.11 Standard: MAC, IEEEP802.11-05/1095r4, January 2006) transmits either a signal in a signal bandwidth of 20 MHz or a signal in a signal bandwidth of 40 MHz. In this system, a channel used to transmit a 20-MHz signal is called a control channel, and a channel used to transmit a 40-MHz signal is called an extension channel.

When the present invention is to be applied to the above system, a wireless communication apparatus is configured to receive a signal with a signal bandwidth of 40 MHz, and IQ imbalance correction coefficients are obtained while the local frequency of the transmitter 110 is shifted from the center frequency of a 20-MHz signal to be received as in the first to seventh embodiments. If analog filters, digital filters, an A/D conversion unit, and a Fourier transform unit have functions necessary for receiving 40-MHz signals, the same effects as those of the first to seventh embodiments can be obtained.

If, however, the local frequency of the transmitter 110 is set at the time of IQ imbalance estimation such that a control channel and an extension channel are contained in the upper sideband and the lower sideband, when a 40-MHz signal is transmitted, it is impossible to estimate the ratio between a desired signal and an image signal (interference signal) due to IQ imbalance in the reception apparatus. Assume also that a 20-MHz signal is transmitted by using only a control channel. In this case as well, if the transmission apparatus shifts the local frequency of the transmitter from the center frequency and transmits a signal by using only subcarriers in the upper sideband or the lower sideband like the wireless communication apparatus of the present invention, since an extension channel contains not only an image signal due to IQ imbalance in the reception unit but also an image signal due to IQ imbalance in the transmission terminal, it is impossible to estimate IQ imbalance caused in the reception unit of the wireless communication apparatus.

In consideration of the above problems, the eighth embodiment sets the local frequency of the transmitter 110 such that only a control channel exists in the upper sideband or the lower sideband and an extension channel exists outside the band. Since the positions of the control channel and extension channel are periodically notified by a signal called a beacon, it is possible to recognize the position of each channel by receiving the beacon signal.

As a result, as shown in FIG. 18, it is possible to extract only a signal in the control channel and an image signal caused by IQ imbalance in the reception unit of the wireless communication apparatus. This makes it possible to suppress a signal in the extension channel and an image signal due to IQ imbalance in the transmission terminal when a 40-MHz signal is transmitted.

Even if the frequency of a signal generated by transmitter 110 is controlled in the above manner to prevent it from interfering with an interference signal, another terminal may transmit a signal through a channel in which only an image signal should be generated. In this case, it is possible to estimate IQ imbalance correction coefficients by inhibiting another terminal transmit from transmitting any control signal for a predetermined period of time and transmitting a signal through a desired channel while another terminal is not using the channel.

Such control signals include, for example, an RTS (Request To Send) signal or CTS-Self (Clear To Send-Self) signal in the above system. Both these signals are a control signal for acquiring a signal transmission right. Any terminal which receives either of these signals cannot transmit any signal for a predetermined period of time.

Consider, for example, a case wherein the local frequency generated by the transmitter 110 is set to be higher than the center frequency of a desired signal by W/2, and a desired signal and an image signal of the desired signal are respectively received by subcarriers in the lower sideband and subcarriers in the upper sideband. In this case, the wireless communication apparatus transmits an RTS or CTS-Self signal by using only subcarriers in the upper sideband to inhibit another terminal from transmitting any signal in the upper sideband for a predetermined period of time.

The apparatus then transmits an RTS signal to a specific terminal by using subcarriers in the lower sideband. Upon receiving the RTS signal, the terminal returns a signal called a CTS signal. For this reason, the wireless communication apparatus estimates IQ imbalance in the reception unit by using the CTS signal which the terminal transmits.

In this manner, even if another terminal is using the upper sideband, using a control signal can temporarily inhibit another terminal from transmitting any signal and allows to estimate coefficients for correcting IQ imbalance by using a signal transmitted in the lower sideband.

Note that the IQ imbalance estimation method, IQ imbalance correction, and signal demodulation can be implemented by using any of the techniques in the first to sixth embodiments, and hence a detailed description thereof will be omitted.

As described above, according to the eighth embodiment, a wireless communication apparatus which can correct IQ imbalance in the reception unit of the wireless communication apparatus and comprises a high-accuracy reception unit can be provided. Note that this embodiment need not transmit any special signals for the estimation of IQ imbalance and can perform estimation with respect to arbitrary signals, and hence can be applied to an arbitrary OFDM transmission system. In addition, even if an adjacent channel is used, it is possible to avoid the channel and correct IQ imbalance with high accuracy. Furthermore, even if the transmission apparatus transmits a signal with a double bandwidth, a wireless communication apparatus which can estimate IQ imbalance, correct IQ imbalance, and demodulate an OFDM signal with high accuracy can be provided.

Ninth Embodiment

A wireless communication apparatus according to the ninth embodiment will be described.

The ninth embodiment is the same as the first to eighth embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the ninth embodiment is the same as those embodiments in that IQ imbalance is corrected by using obtained correction coefficients.

The ninth embodiment differs from the first to eighth embodiments in that the local frequency of the transmitter is shifted from the center frequency of a transmission signal by W or −W instead of W/2 when IQ imbalance is to be estimated.

As described in the fifth embodiment with reference to FIG. 19, signals leak outside the band depending on the characteristics of filters used by the transmission terminal.

This makes it difficult to estimate IQ imbalance using all subcarriers by only shifting the local frequency of a transmitter 110 from the center frequency of a transmission signal by W/2.

Figure 20:
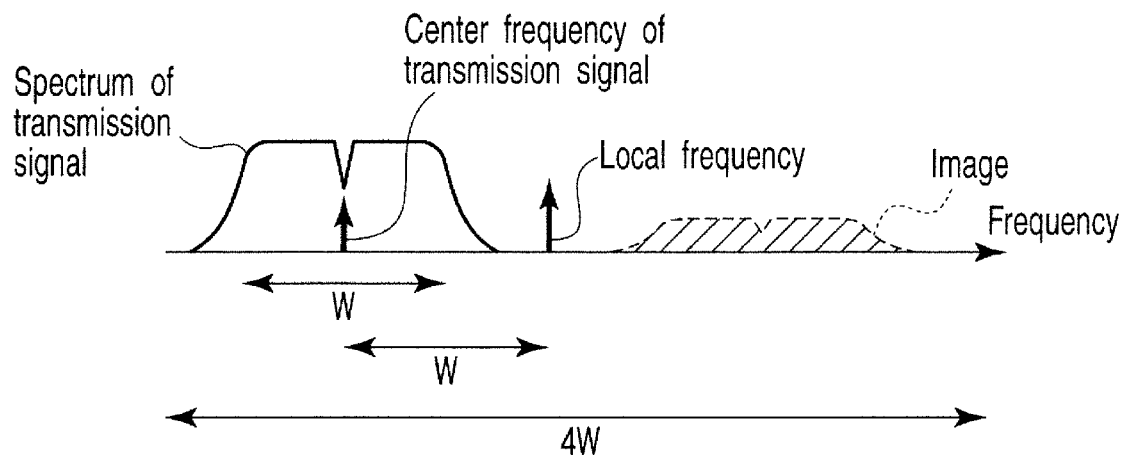
FIG. 20 is a graph showing an example of a signal spectrum in a case wherein IQ imbalance correction coefficients are estimated according to the ninth embodiment.
Figure 21:
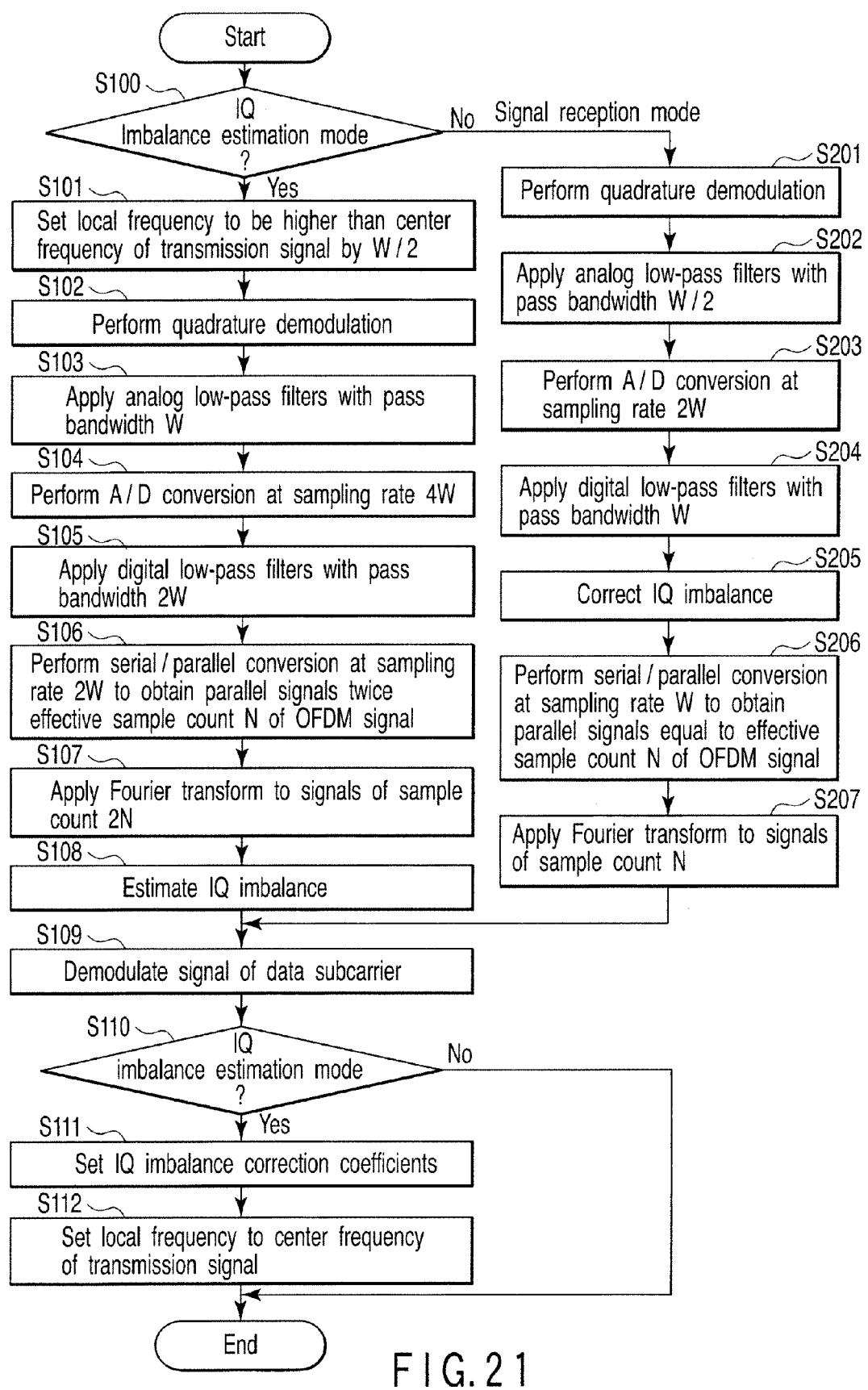
FIG. 21 is a flowchart for explaining the processing operation of the reception unit of the wireless communication apparatus.

In the ninth embodiment, therefore, the local frequency generated by the transmitter 110 is set to be higher than the center frequency of a transmission signal by W. This reduces the influence of leakage from outside the band on an image signal and allows subcarriers more in number than those in the fifth embodiment to be used for the estimation of IQ imbalance, as shown in FIG. 20.

However, signal processing in a wider band is required, and signals with a bandwidth 3W must be processed. As a result, the A/D conversion units in FIGS. 1 and 2 are required to have sampling rates 1.5 times or more those in the first to eighth embodiments. In addition, as the analog low-pass filters and the digital low-pass filters in FIGS. 1 and 2, filters having cutoff frequencies 1.5 times or more those in the first to eighth embodiments are used.

The serial/parallel conversion unit in FIGS. 1 and 2 converts a signal with a sample rate 3W into 3N parallel signals, and the Fourier transform unit in FIGS. 1 and 2 applies Fourier transform to the signals of 3N samples.

In order to allow the Fourier transform unit to apply FFT, it is necessary to set the number of samples to a power of two. For this reason, this embodiment makes the A/D conversion units operate at a sample rate twice that in the first to eighth embodiments, and makes the serial/parallel conversion unit operate at a sample rate 4 W with a parallel signal count 4N.

In this case, as described in the first embodiment, it suffices to switch the functions of the respective components depending on whether the IQ imbalance estimation mode or the signal reception mode is set. As described in the sixth embodiment, it suffices to fix the functions of all or some of the components to those in the IQ imbalance estimation mode.

Note that the method of estimating IQ imbalance by using the reception signals of the –kth an kth subcarriers differs only in subcarriers to be used, and can be implemented by using one of the techniques described in the first to fourth embodiments. A detailed description of this method will therefore be omitted.

The above description has exemplified the case wherein the local frequency generated by the transmitter is set to be higher than the center frequency of a transmission signal by W. However, as described in the seventh embodiment, the local frequency may be set to be lower than the center frequency by W. That is, the local frequency may be set to be higher or lower than the center frequency by W depending on a situation.

Although the above description has exemplified the case wherein the local frequency of the transmitter is set to be higher or lower than the center frequency by W, it suffices to set the local frequency to a frequency higher than the center frequency of a transmission signal by W or more or lower than W when IQ imbalance is to be estimated. The local frequency can be shifted by W or more or W or less if the cutoff frequencies of the low-pass filters, the sampling rate of the A/D conversion units, the sampling rate of the serial/parallel conversion unit, the number of samples to be output, and the number of samples for the Fourier transform unit can be set in accordance with the shifting operation.

As described above, according to the ninth embodiment, a wireless communication apparatus which can correct IQ imbalance in the reception unit of the wireless communication apparatus and comprises a high-accuracy reception unit can be provided. Note that this embodiment need not transmit any special signals for the estimation of IQ imbalance and can perform estimation with respect to arbitrary signals, and hence can be applied to an arbitrary OFDM transmission system. A wireless communication apparatus can be provided, which can estimate IQ imbalance with high accuracy even if filter characteristics for a transmission signal are not sufficient and out-of-band signals are not sufficiently suppressed.

10th Embodiment

A wireless communication apparatus according to the 10th embodiment will be described.

The 10th embodiment is the same as the first to ninth embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the 10th embodiment is the same as those embodiments in that IQ imbalance is corrected by using obtained correction coefficients.

The 10th embodiment differs from the first to ninth embodiments in that IQ imbalance is corrected by analog units before A/D conversion.

FIG. 3 shows an example of the arrangement of the reception unit of the wireless communication apparatus according to the 10th embodiment. Note that the same reference numerals as in FIG. 1 denote the same parts in FIG. 3. The arrangement in FIG. 3 differs from that in FIG. 1 in that an IQ imbalance correction unit 300 is provided between analog low-pass filters 101a and 101b and A/D converters 102a and 102b.

An IQ imbalance estimation unit 108 calculates correction coefficients by using one of the IQ imbalance estimation methods according to the first to ninth embodiments.

Operation to be performed when the wireless communication apparatus in FIG. 3 corrects IQ imbalance by using the correction coefficients calculated by the IQ imbalance estimation unit 108 will be described.

The arrangement of the IQ imbalance correction unit 300 is the same as one of those shown in FIGS. 5 to 7, and comprises multiplication units and addition units. If correction coefficients are determined, no complicated signal processing is required. Therefore, the IQ imbalance correction unit can be easily formed by using analog circuits.

In the 10th embodiment, the IQ imbalance correction unit 300 is provided before the A/D converters 102a and 102b to correct phase distortion and amplitude distortion (IQ imbalance) caused in the quadrature demodulation unit 100 with respect to analog signals.

Letting the analog units correct IQ imbalance in this manner can improve the accuracy of a single analog front-end. When the analog front-end is made to operate singly, the front-end is connected to a digital unit comprising an IQ imbalance estimation unit 108 described in the first to ninth embodiments at the time of manufacture to obtain IQ imbalance correction coefficients, and the coefficients are written in a ROM in the IQ imbalance correction unit 300. This makes it possible to provide an analog front-end with small IQ imbalance.

As described above, according to the 10th embodiment, a wireless communication apparatus which can correct IQ imbalance in the reception unit of the wireless communication apparatus and comprises a high-accuracy reception unit can be provided. Note that this embodiment need not transmit any special signals for the estimation of IQ imbalance and can perform estimation with respect to arbitrary signals, and hence can be applied to an arbitrary OFDM transmission system. When an analog front-end is made to operate singly by writing IQ imbalance correction coefficients in the ROM, an analog front-end with very small IQ imbalance can be provided even if the front-end is connected to a digital unit having no IQ imbalance estimation function.

11th Embodiment

A wireless communication apparatus according to the 11th embodiment will be described.

The 11th embodiment is the same as the first to 10th embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the 11th embodiment is the same as those embodiments in that IQ imbalance is corrected by using obtained correction coefficients.

The 11th embodiment differs from the first to 10th embodiments in that a reception unit has a plurality of systems, and performs diversity reception.

FIG. 4 shows an example of the arrangement of the reception unit of the wireless communication apparatus according to the 11th embodiment, which has two reception systems. The same reference numeral as in FIG. 1 denote the same parts in FIG. 4, and different portions will be described.

The arrangement of each reception system of the wireless communication apparatus in FIG. 4 is almost the same as that in FIG. 1 except that a transmitter 110, control unit 109, and demodulation unit 107 are shared by the two reception systems.

The demodulation unit 107 is the same as that shown in FIG. 1 except that diversity reception is performed. As the diversity reception scheme used by the demodulation unit 107, any general diversity scheme such as a selective diversity scheme, equal gain combining scheme, or maximum ratio combining scheme can be used. Since this is irrelevant to the gist of the present invention, a detailed description thereof will be omitted.

In the reception unit of the wireless communication apparatus in FIG. 4, two quadrature demodulation units 100a and 100b of the two reception systems receive two reception signals (first and second reception signals) which are obtained through low-noise amplifiers provided in amplifiers 99a and 99b, bandpass filters, and the like upon reception of transmission signals by using two antennas 98a and 98b.

The respective reception systems apply quadrature demodulation, analog low-pass filters, A/D conversion, digital low-pass filters, IQ imbalance correction, serial/parallel conversion, and Fourier transform to input reception signals, and then perform diversity combining. The systems then demodulate OFDM signals.

Consider the influences of IQ imbalance in the wireless communication apparatus in FIG. 4. Referring to FIG. 4, a system which converts a first reception signal into a digital signal and applies Fourier transform to it will be referred to as a first reception system, and a system which converts a second reception signal into a digital signal and applies Fourier transform to it will be referred to as a second reception system.

Referring to FIG. 4, the respective reception systems comprise different quadrature demodulation units, analog low-pass filters, and A/D conversion units. In this case, even if attempts are made to implement the respective reception systems with the same characteristics, it is very difficult to form two reception systems with completely identical characteristics. As a result, the characteristics of the respective reception systems vary, and IQ imbalance also varies for each reception system.

It is therefore necessary to estimate IQ imbalance for each reception system and perform IQ imbalance correction by using different correction coefficients for the respective reception systems. For this reason, IQ imbalance estimation units 108a and 108b estimate IQ imbalance for the respective reception systems by using signals after Fourier transform in the respective reception systems, thereby obtaining IQ imbalance correction coefficients for the respective reception systems. In this case, as an IQ imbalance estimation method, one of the same methods as those in the first to 10th embodiments can be used.

IQ imbalance correction units 104a and 104b correct IQ imbalance with respect to signals in the respective reception systems by using correction coefficients obtained by the IQ imbalance estimation units 108a and 108b for the respective reception systems. The IQ imbalance correction units 104a and 104b have the same arrangement as that shown in FIGS. 5 to 7 except that correction is performed for each reception system, and perform correction by using one of the methods in first to 10th embodiments.

As described above, when diversity reception is to be performed by using a plurality of reception systems, there can be provided a wireless communication apparatus with high reception accuracy which can be implemented by estimating IQ imbalance for each reception system and correcting IQ imbalance for each reception system. The 11th embodiment has exemplified the apparatus with the two reception systems. However, the present invention is not limited to this, and can be applied to a wireless communication apparatus comprising three or more reception systems as long as IQ imbalance is estimated for each reception system and IQ imbalance is corrected for each reception system.

As described above, according to the 11th embodiment, a wireless communication apparatus which can correct IQ imbalance in the reception unit of the wireless communication apparatus and comprises a high-accuracy reception unit can be provided. Note that this embodiment need not transmit any special signals for the estimation of IQ imbalance and can perform estimation with respect to arbitrary signals, and hence can be applied to an arbitrary OFDM transmission system. In addition, a high-accuracy wireless communication apparatus can be provided by correcting IQ imbalance for each reception system with respect to a wireless communication apparatus comprising a plurality of reception systems.

12th Embodiment

A wireless communication apparatus according to the 12th embodiment will be described.

The 12th embodiment is the same as the first to 11th embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the 12th embodiment is the same as those embodiments in that IQ imbalance is corrected by using obtained correction coefficients. Furthermore, the 12th embodiment is the same as the 11th embodiment in that reception is performed by using a plurality of reception systems.

The wireless communication apparatus according to the 12th embodiment differs from that according to the 11th embodiment in that it receives transmission signals generated by a plurality of transmission systems.

The arrangement of the wireless communication apparatus according to the 12th embodiment is the same as that shown in FIG. 4 except for the processing operation of a demodulation unit 107.

According to the 12th embodiment, the present invention can be applied to a so-called MIMO-OFDM (Multiple Input Multiple Output OFDM) transmission system which receives signals transmitted from a plurality of transmission antennas through a plurality of reception antennas. The demodulation unit 107 needs to have a function of demodulating a MIMO-OFDM signal. In this case, it suffices to use, as a MIMO-OFDM demodulation scheme, a scheme which is generally used for MIMO-OFDM transmission. Since this scheme is irrelevant to the gist of the present invention, a detailed description thereof will be omitted.

A method of estimating IQ imbalance for each reception system at the time of reception of MIMO-OFDM signals will be described by taking, as an example, the case wherein the frequency of a local signal (local frequency) output from the transmitter 110 is set to be higher than the center frequency of a transmission signal by W/2 to estimate IQ imbalance.

Each reception system applies quadrature demodulation, analog low-pass filters, A/D conversion, digital low-pass filters, IQ imbalance correction, serial/parallel conversion, and Fourier transform to a reception signal as in the first embodiment.

Consider the reception signals of the $-k$th and $k$th subcarriers obtained after Fourier transform. As described above, reception signals obtained when one transmission system generates signals can be expressed by expressions (23) and (24). When a plurality of reception systems are to receive signals, IQ imbalance and channel response vary for each reception system. In addition, signals transmitted from a plurality of transmission systems vary in IQ imbalance and channel response for the respective transmission systems. As a consequence, reception signals $x_i^{(-k)}(m)$ and $x_i^{(k)}(m)$ of the $-k$th and $k$th subcarriers of the $m$th OFDM symbol received by the $i$th reception system can be expressed by expressions (70) and (71).

$$x_i^{(-k)}(m) = \alpha_i^{(r)} \sum_j \left( \alpha_j^{(t)} \cdot s_j^{(-k)}(m) + \beta_j^{(t)} \cdot \right. \tag{70}$$

$$\left. s_j^{(-n+k)*}(m) \right) h_{i,j}^{(-k)} + n_i^{(-k)}(m)$$

$$= a_i^{(k)} \cdot \alpha_i^{(r)} + n_i^{(-k)}(m)$$

$$x_i^{(k)}(m) = \beta_i^{(r)} \sum_j \left( \alpha_j^{(t)*} \cdot s_j^{(-k)*}(m) + \beta_j^{(t)*} \cdot \right. \tag{71}$$

$$\left. s_j^{(-N+k)}(m) \right) h_{i,j}^{(-k)*} + n_i^{(k)}(m)$$

$$= a_i^{(k)*} \cdot \beta_i^{(r)} + n_i^{(k)}(m)$$

where $$a_i^{(k)} = \sum_j \left( \alpha_j^{(t)} \cdot s_j^{(-k)}(m) + \beta_j^{(t)} \cdot s_j^{(-N+k)*}(m) \right) h_{i,j}^{(-k)} \tag{72}$$

where $\alpha_j^{(t)}$ and $\beta_j^{(t)}$ represent distortion due to IQ imbalance expressed by expressions (5) and (6) in the $j$th transmission system, $\alpha_i^{(r)}$ and $\beta_i^{(r)}$ represent distortion due to IQ imbalance expressed by expressions (10) and (11) in the $i$th reception system, and $s_j^{(-k)}$ and $s_j^{(-N+k)}$ respectively represent the transmission signals of the $-k$th and $(-N+k)$th subcarriers transmitted from the $j$th transmission system.

In addition, $h_{i,j}^{(-k)}$ represents a channel response at the $-k$th subcarrier between the $j$th transmission system and the $i$th reception system, and $n_i^{(-k)}(m)$ and $n_i^{(-k)}(m)$ respectively represent the noise signals of the $-k$th and $k$th subcarriers of the $m$th OFDM symbol in the $i$th reception system.

As in the first embodiment, a reception vector in the $i$th reception system which has the reception signals of the $-k$th and $k$th subcarriers as elements is defined by expression (73).

$$x_i^{(k)} = \begin{bmatrix} x_i^{(-k)}(m) \\ x_i^{(k)*}(m) \end{bmatrix} \tag{73}$$

IQ imbalance can be estimated for each reception system by using the reception vector represented by expression (73) and applying one of the techniques in the first to fourth embodiments. When the estimation method in the first embodiment is to be used, the ratio between $\alpha_i^{(r)}$ and $\beta_i^{(r)*}$ can be calculated from the ratio between a first element $e_1$ and a second element $e_2$ by calculating a correlation matrix represented by expression (73) for each reception system according to expression (41) and obtaining an eigenvector corresponding to a maximum eigenvalue. When the estimation method in the second embodiment is to be used, a correlation vector is calculated by multiplying the reception signal represented by expression (73) by the complex signal of the $-k$th subcarrier according to expression (74), and the ratio between a first element $e_1$ and a second element $e_2$ of the correlation vector is calculated according to expression (75), thereby calculating the ratio between $\alpha_i^{(r)}$ and $\beta_i^{(r)*}$.

$$r_{x_i x_i} = \sum_m \sum_k x_i^{(-k)*}(m) x_i^{(k)}(m) \tag{74}$$

$$\frac{\beta_i^{(r)*}}{\alpha_i^{(r)}} = \frac{r_{x_i x_i}(2)}{r_{x_i x_i}(1) - \hat{\sigma}_i^2} \tag{75}$$

where $\hat{\sigma}_i^2$ is the estimated value of noise power in the $i$th reception system, and $r_{x_i x_i}(1)$ and $r_{x_i x_i}(2)$ are the respective elements of r, as represented by $$r_{x_i x_i} = \begin{bmatrix} r_{x_i x_i}(1) \\ r_{x_i x_i}(2) \end{bmatrix} \tag{76}$$

When the estimation method in the third embodiment is to be used, the ratio of between $\alpha_i^{(r)}$ and $\beta_i^{(r)*}$ can be calculated according to expression (77). When the estimation method in the fourth embodiment is to be used, the ratio can be calculated according to expression (78).

$$\frac{\beta_i^{(r)*}}{\alpha_i^{(r)}} = \frac{r_{x_i x_i}(2)}{r_{x_i x_i}(1)} \tag{77}$$

$$\frac{\beta_i^{(r)*}}{\alpha_i^{(r)}} = \frac{1}{D} \sum_m \sum_k \frac{x_i^{(k)*}}{x_i^{(-k)}} \tag{78}$$

Using the ratio between $\alpha_i^{(r)}$ and $\beta_i^{(r)*}$ obtained as a result of the above processing can obtain IQ imbalance correction coefficients for the $i$th reception system according to expressions (35) to (38), (45), and (46).

Performing the above computation for each reception system makes it possible to obtain IQ imbalance correction coefficients for each reception system even in MIMO-OFDM transmission as in the 11th embodiment.

Since operation to be performed for each reception system when IQ imbalance is corrected by using the IQ imbalance correction coefficients estimated in the above manner is the same as that in the first embodiment, a detailed description thereof will be omitted.

Although the method of extending the estimation of IQ imbalance for each reception system and IQ imbalance correction for each reception system in this embodiment to MIMO-OFDM has been described above by taking the first to fourth embodiment as examples, the IQ imbalance estimation method and the IQ imbalance correction method in the above MIMO-OFDM scheme are not limited to the schemes in the first to fourth embodiments. The methods described in the fifth to 10th embodiments can be extended to a plurality of reception systems.

Although FIG. 4 shows the case of the two reception systems, the technique in the 12th embodiment is not limited to this. This method can be applied to three or more reception systems as long as IQ imbalance is estimated and corrected for each reception system.

As described above, according to the 12th embodiment, a high-accuracy wireless communication apparatus which can correct IQ imbalance in the reception unit of the wireless communication apparatus can be provided. Note that this embodiment need not transmit any special signals for the estimation of IQ imbalance and can perform estimation with respect to arbitrary signals, and hence can be applied to an arbitrary OFDM transmission system. In addition, a high-accuracy wireless communication apparatus can be provided by correcting IQ imbalance for each reception system with respect to a wireless communication apparatus for MIMO-OFDM transmission which comprises a plurality of reception systems.

13th Embodiment

A wireless communication apparatus according to the 13th embodiment will be described.

The 13th embodiment is the same as the first to 12th embodiments in that the local frequency of a transmitter is shifted from the center frequency of a transmission signal to estimate IQ imbalance, and IQ imbalance is estimated by using two subcarriers located at symmetrical positions with respect to the local frequency. In addition, the 13th embodiment is the same as those embodiments in that IQ imbalance is corrected by using obtained correction coefficients.

The wireless communication apparatus according to the 13th embodiment differs from those according to the first to 12th embodiments in that it comprises a reception unit and a transmission unit, estimates IQ imbalance in the transmission unit by using the reception unit for which IQ imbalance correction coefficients have been calculated in the above manner, and also corrects IQ imbalance in the transmission unit.

Figure 10:
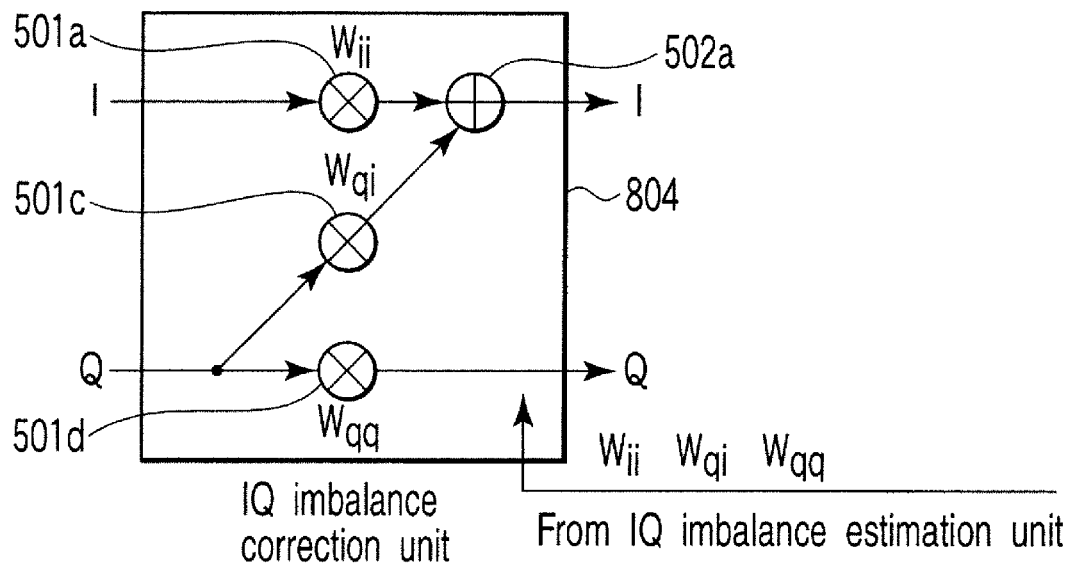
FIG. 10 is a view showing an example of the arrangement of the IQ imbalance correction unit of a transmission unit.
Figure 11:
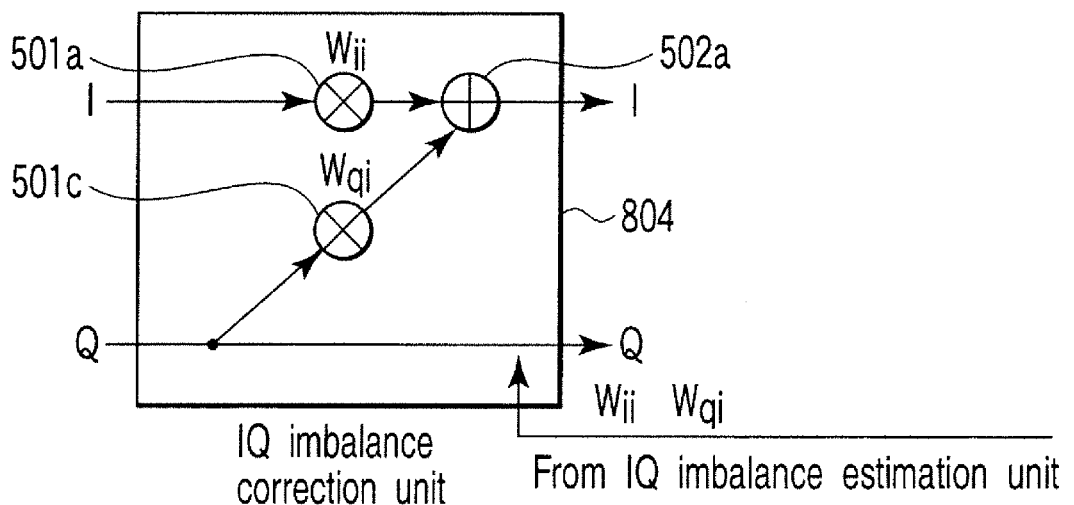
FIG. 11 is a view showing another example of the arrangement of the IQ imbalance correction unit of the transmission unit.

FIG. 8 shows an arrangement of the arrangement of a wireless communication apparatus comprising a reception unit 1 and a transmission unit 2 according to the 13th embodiment. FIGS. 5, 10, and 11 show examples of the arrangement of an IQ imbalance correction unit 804 of the transmission unit 2 in FIG. 8.

The arrangement of the reception unit 1 of the wireless communication apparatus in FIG. 8 is almost the same as that shown in FIG. 1. The same reference numerals as in FIG. 1 denote the same parts in FIG. 8, and different portions will be described. Referring to FIG. 8, the reception unit 1 and the transmission unit 2 share a transmitter 110 and a control unit 109. In addition, a switch 808a for switching an input to an quadrature demodulation unit 100 to either an output from an amplifier 99 and or output from an quadrature modulation unit 800 of the transmission unit 2 is provided between the amplifier 99 and the quadrature demodulation unit 100. In addition, an IQ imbalance estimation unit 809 is connected to a switch 808c for outputting the correction coefficients calculated by the IQ imbalance estimation unit 809 to an IQ imbalance correction unit 104 of the reception unit 1 or the IQ imbalance correction unit 804 of the transmission unit 2.

The transmission unit 2 of the wireless communication apparatus in FIG. 8 includes a modulation unit 807 which generates OFDM signals by performing modulation for each subcarrier, an inverse Fourier transform unit 806 which performs inverse Fourier transform for the signals output from the modulation unit 807, a parallel/serial conversion unit 805 which converts the parallel signals output from the inverse Fourier transform unit 806 into serial signals, the IQ imbalance correction unit 804 which corrects IQ imbalance in the transmission unit 2 by using the correction coefficients in the transmission unit 2 which are calculated by the IQ imbalance estimation unit 809, D/A (Digital to Analog) conversion units 802a and 802b which convert digital signals into analog signals, the quadrature modulation unit 800 which quadrature modulates the signals output from the D/A conversion units 802a and 802b by using the local signal generated by the transmitter 110, an amplifier 810 which amplifies the quadrature modulated signal output from the quadrature modulation unit 800, and a switch 808b which switches the output destination of the quadrature modulated signal obtained by the quadrature modulation unit 800 to the switch 808a of the reception unit 1 or the amplifier 810 of the transmission unit 2. The wireless communication apparatus in FIG. 8 also includes a directional coupling unit 811 which outputs the signal received by an antenna 98 to the reception unit 1 and outputs the transmission signal generated by the transmission unit 2 to the antenna 98.

The modulation unit 807 performs modulation for each subcarrier on the basis of an input bit string. Although various modulation schemes are conceivable as modulation schemes to be used in accordance with communication systems, a general modulation scheme is used in this case instead of a special modulation scheme. This is irrelevant to the gist of the present invention, and hence a detailed description thereof will be omitted.

The inverse Fourier transform unit 806 performs inverse Fourier transform (inverse discrete Fourier transform (IDFT)), inverse fast Fourier transform (IFFT), or the like for signals in the frequency domain which have been modulated by the modulation unit 807 for the respective subcarriers, thereby converting the signals into signal sequences in the time domain.

The parallel/serial conversion unit 805 converts the signals in the time domain, which are obtained by inverse Fourier transform, into serial signals. As a result, I channel and Q channel time-series signals are generated.

The IQ imbalance correction unit 804 corrects distortion due to IQ imbalance in the transmission unit 2 with respect to the signals obtained by serial/parallel conversion. IQ imbalance in the transmission unit 2 is corrected by adding distortion so as to cancel out the IQ imbalance caused in the D/A conversion units 802a and 802b, analog low-pass filters 801a and 801b, and the quadrature modulation unit 800 on the subsequent stage.

The arrangement of the IQ imbalance correction unit 804 is the same as that of the IQ imbalance correction unit 104 of the reception unit 1 shown in FIG. 5. In this case, the IQ imbalance estimation unit 809 calculates correction coefficients for weighting/combining. The obtained correction coefficients are multiplied by multiplication units 501a, 501b, 501c, and 501d. A method of estimating these correction coefficients will be described later.

Digital low-pass filters 803a and 803b are applied to the signals output from the IQ imbalance correction unit 804 after zero interpolation between samples. The digital low-pass filters are filters to be applied because it is difficult to apply only analog low-pass filters to aliasing signals generated by D/A conversion on the subsequent stage. As digital low-pass filters, any filters can be used as long as they can shape the spectra of signals into desired shapes in combination with the digital low-pass filters 801a and 801b.

The D/A conversion units 802a and 802b respectively convert the I channel and Q channel signals respectively output from the digital low-pass filters 803a and 803b into analog signals.

The signals converted into the analog signals contain unwanted high-frequency signals called aliasing signals. The analog low-pass filters 801a and 801b are respectively applied to the I channel and Q channel signals converted into digital signals to suppress the high-frequency components.

As the analog low-pass filters 801a and 801b, any filters can be used as long as they can shape transmission signals into signals with desired spectra in combination with the digital low-pass filters 803a and 803b.

The quadrature modulation unit 800 quadrature modulates the baseband I channel and Q channel signals output from the analog low-pass filters 801a and 801b to generate an RF signal, thereby extracting only a signal in a desired band. The quadrature modulation unit 800 performs the same quadrature modulation as in the prior art. This is irrelevant to the gist of the present invention, and hence a detailed description thereof will be omitted.

The quadrature demodulated signal is amplified by the amplifier 810 and is then transmitted to the antenna 98 through the directional coupling unit 811.

When IQ imbalance in the reception unit 1 is to be estimated or a signal is received, the control unit 109 controls the switch 808a of the reception unit 1 to input the reception signal output from the amplifier 99 to the quadrature demodulation unit 100. When IQ imbalance in the transmission unit 2 is to be estimated, the control unit 109 controls the switch 808a to input the signal output from the quadrature modulation unit 800 to the quadrature demodulation unit 100.

When a signal is to be transmitted, the control unit 109 controls the switch 808b of the transmission unit 2 to input the signal output from the quadrature modulation unit 800 to the amplifier 810. When IQ imbalance in the transmission unit 2 is to be estimated, the control unit 109 controls the switch 808b to input the signal output from the quadrature modulation unit 800 to the switch 808a connected to the quadrature demodulation unit 100 of the reception unit 1.

When IQ imbalance in the transmission unit 2 is estimated, the control unit 109 controls the switch 808c to output IQ imbalance correction coefficients calculated by the IQ imbalance estimation unit 809 to the IQ imbalance correction unit 804. When IQ imbalance in the reception unit 1 is estimated, the control unit 109 controls the switch 808c to output the IQ imbalance correction coefficients calculated by the IQ imbalance estimation unit 809 to the IQ imbalance correction unit 104.

Figure 22:
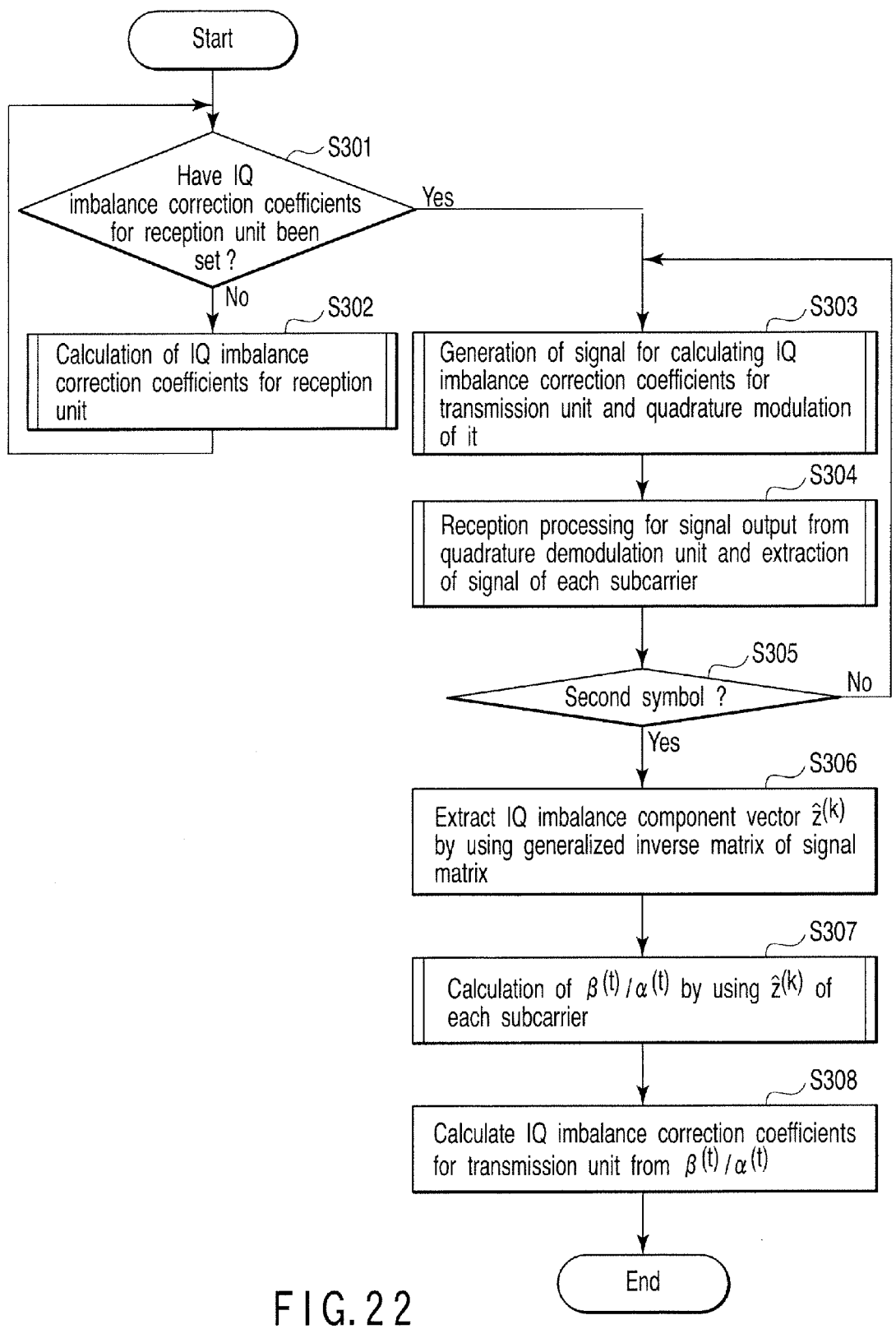
FIG. 22 is a flowchart for explaining processing operation in a case wherein the wireless communication apparatus obtains IQ imbalance correction coefficients for the transmission unit.

Operation to be performed when the wireless communication apparatus in FIG. 8 estimates IQ imbalance in the transmission unit 2 and the reception unit 1 will be described next with reference to the flowchart of FIG. 22.

First of all, the wireless communication apparatus in FIG. 8 calculates IQ imbalance correction coefficients for the reception unit 1 by using one of the methods in the first to 12th embodiments, and sets the obtained correction coefficients in the IQ imbalance correction unit 104 (steps S301 and S302). At this time, the switch 808a is controlled to input the reception signal output from the amplifier 99 to the quadrature demodulation unit 100, and the switch 808c is controlled to input outputs (correction coefficients) from the IQ imbalance estimation unit 809 to the IQ imbalance correction unit 104.

In step 302, when the IQ imbalance estimation unit 809 calculates IQ imbalance correction coefficients for the reception unit 1 in the manner as described above, and the correction coefficients are set in the IQ imbalance correction unit 104 of the reception unit 1, IQ imbalance in the reception unit 1 is corrected with high accuracy. That is, it is possible to neglect the influence of IQ imbalance in the reception unit 1 on the reception signal corrected by the IQ imbalance correction unit 104. After IQ imbalance in the reception unit 1 can be corrected, the transmission signal generated by the transmission unit 2 is input to the reception unit 1 instead of being transmitted through the amplifier 810 and the directional coupling unit 811. The reception unit 1 estimates IQ imbalance in the transmission unit 2 on the basis of the transmission signal output from the transmission unit 2.

The method of estimating distortion by inputting a transmission signal to the reception unit 1 has a problem that if IQ imbalance exists in the reception unit 1, the estimation accuracy of IQ imbalance in the transmission unit 2 deteriorates, and the accuracy of IQ imbalance correction in the transmission unit 2 is limited. In this embodiment, however, since the IQ imbalance in the reception unit 1 is corrected with high accuracy, it is possible to purely estimate IQ imbalance in the transmission unit 2.

A method of calculating correction coefficients used by the IQ imbalance correction unit 804, i.e., a method of estimating IQ imbalance in the transmission unit 2, will be described next.

When the reception unit 1 calculates IQ imbalance correction coefficients in the transmission unit 2, the frequency of the local signal generated by the transmitter 110 is equal to the frequency used by the quadrature modulation unit 800 of the transmission unit 2, i.e., the center frequency of the transmission signal input from the transmission unit 2.

If the IQ imbalance correction unit 804 of the transmission unit 2 is similar to the IQ imbalance correction unit 104 of the reception unit 1 as shown in FIG. 5, an I channel signal $u_i(t)$ and a Q channel signal $u_q(t)$ after IQ imbalance correction can be expressed by expressions (79) and (80).

$$u_i(t) = w_{ii} \cdot u_i'(t) + w_{qi} \cdot u_q'(t) \quad (79)$$

$$u_q(t) = w_{iq} \cdot u_i'(t) + w_{qq} \cdot u_q'(t) \quad (80)$$

In this case, $u_i'(t)$ and $u_q'(t)$ respectively represent an I channel transmission signal and a Q channel transmission signal after IQ imbalance correction.

Although distortion represented by expression (3) is caused in the transmission by IQ imbalance in the transmission unit 2, if distortion is added to cancel out IQ imbalance in the transmission unit 2 of the IQ imbalance correction unit

804, the signals in the equivalent low-pass system after quadrature modulation satisfy expressions (81) and (82).

$$m_i(t) = \gamma \cdot u_i'(t) \tag{81}$$

$$m_q(t) = \gamma \cdot u_q'(t) \tag{82}$$

If, therefore, correction coefficients $w_{ii}$, $w_{iq}$, $w_{qi}$, and $w_{qq}$ satisfying expressions (81) and (82) are obtained, IQ imbalance in the transmission unit 2 can be canceled out.

Consider correction coefficients satisfying the above relationship. First of all, $\alpha^{(t)}$ and $\beta^{(t)}$ can be expressed by expressions (5) and (6), and hence satisfy expressions (83) to (86).

$$\alpha_r^{(t)} + \beta_r^{(t)} = G_i^{(t)} \tag{83}$$

$$\alpha_i^{(t)} + \beta_i^{(t)} = 0 \tag{84}$$

$$\alpha_r^{(t)} - \beta_r^{(t)} = G_q^{(t)} \cos\theta^{(t)} \tag{85}$$

$$\alpha_i^{(t)} - \beta_i^{(t)} = G_q^{(t)} \sin\theta^{(t)} \tag{86}$$

In this case, expressions (79) and (80) are substituted into expression (3) to yield $$\begin{aligned}\alpha_r^{(t)} \cdot u_i(t) - \alpha_i^{(t)} \cdot u_q(t) + \beta_r^{(t)} \cdot u_i(t) + \\ \beta_i^{(t)} \cdot u_q(t) = [(\alpha_r^{(t)} + \beta_r^{(t)})w_{ii} + (-\alpha_i^{(t)} + \beta_i^{(t)})w_{iq}] \\ u_i'(t) + [(\alpha_r^{(t)} + \beta_r^{(t)})w_{qi} + (-\alpha_i^{(t)} + \beta_i^{(t)})w_{qq}]u_q'(t)\end{aligned} \tag{87}$$

$$\begin{aligned}\alpha_r^{(t)} \cdot u_q(t) + \alpha_i^{(t)} \cdot u_i(t) - \beta_r^{(t)} \cdot u_q(t) + \\ \beta_i^{(t)} \cdot u_i(t) = [(\alpha_i^{(t)} + \beta_i^{(t)})w_{ii} + (\alpha_r^{(t)} - \beta_r^{(t)})w_{iq}] \\ u_i'(t) + [(\alpha_i^{(t)} + \beta_i^{(t)})w_{qi} + (\alpha_r^{(t)} - \beta_r^{(t)})w_{qq}]u_q'(t)\end{aligned} \tag{88}$$

Since expressions (87) and (88) must satisfy expressions (81) and (82), IQ imbalance correction coefficients must satisfy the following expression:

$$w_{ii} = \alpha_r^{(t)} - \beta_r^{(t)} \tag{89}$$

$$w_{iq} = \alpha_i^{(t)} + \beta_i^{(t)} = 0 \tag{90}$$

$$w_{qi} = \alpha_i^{(t)} - \beta_i^{(t)} \tag{91}$$

$$w_{qq} = \alpha_r^{(t)} + \beta_r^{(t)} \tag{92}$$

It is obvious from this that if $\alpha^{(t)}$ and $\beta^{(t)}$ can be estimated, coefficients for correcting IQ imbalance in the transmission unit 2 can be estimated.

A method of estimating $\alpha^{(t)}$ and $\beta^{(t)}$ will be described next.

If IQ imbalance occurs in the transmission unit 2, a complex conjugate signal of a transmission signal becomes an interference signal as indicated by expression (3), and the signals of symmetrical subcarriers with respect to the center frequency interfere with each other according to the characteristics of Fourier transform represented by expressions (17) and (18). Therefore, after a transmission signal is input to the reception unit 1 and the reception unit 1 performs reception processing for the transmission signal, a reception signal $x^{(k)}(1)$ of the first symbol of the kth subcarrier obtained by Fourier transform can be expressed by expression (93).

$$\begin{aligned}x_k(1) &= s_k(1) \cdot h_k \alpha^{(t)} + s_{-k}^*(1) \cdot h_k \beta^{(t)} + n_k(1) \\ &= [s_k(1) \ s_{-k}^*(1)] \begin{bmatrix} h_k \alpha^{(t)} \\ h_k \beta^{(t)} \end{bmatrix} + n_k(1)\end{aligned} \tag{93}$$

In addition, a signal of the second symbol is transmitted, and a reception vector $x^{(k)}$ having a reception signal $x_k(1)$ of the first symbol and a reception signal $x_k(2)$ of the second symbol as elements is defined like expression (94) given below:

$$x^{(k)} = S^{(k)} z^{(k)} + n^{(k)} \tag{94}$$

Where $$x^{(k)} = \begin{bmatrix} x_k(1) \\ x_k(2) \end{bmatrix} \tag{95}$$

$$S^{(k)} = \begin{bmatrix} s_k(1) & s_{-k}^*(1) \\ s_k(2) & s_{-k}^*(2) \end{bmatrix} \tag{96}$$

$$z^{(k)} = \begin{bmatrix} h_k \alpha^{(t)} \\ h_k \beta^{(t)} \end{bmatrix} \tag{97}$$

$$n^{(k)} = \begin{bmatrix} n_k(1) \\ n_k(2) \end{bmatrix} \tag{98}$$

In this case, the two-symbol signal transmitted by the kth and –kth subcarriers is set to make a transmission signal matrix $S^{(k)}$ become full rank. As a result, a vector $\hat{z}^{(k)}$ of an IQ imbalance component represented by expression (99) is obtained by multiplying the two sides of expression (94) by the inverse matrix of $S^{(k)}$.

$$\begin{aligned}\hat{z}^{(k)} &= S^{(k)-1} x^{(k)} \\ &= h_k \begin{bmatrix} \alpha^{(t)} \\ \beta^{(t)} \end{bmatrix} + S^{(k)-1} n^{(k)}\end{aligned} \tag{99}$$

Where $$S^{(k)-1} = \frac{1}{s_k(1)s_{-k}^*(2) - s_k(2)s_{-k}^*(1)} \begin{bmatrix} s_{-k}^*(2) & -s_{-k}^*(1) \\ -s_k(2) & s_k(1) \end{bmatrix} \tag{100}$$

Figure 13:
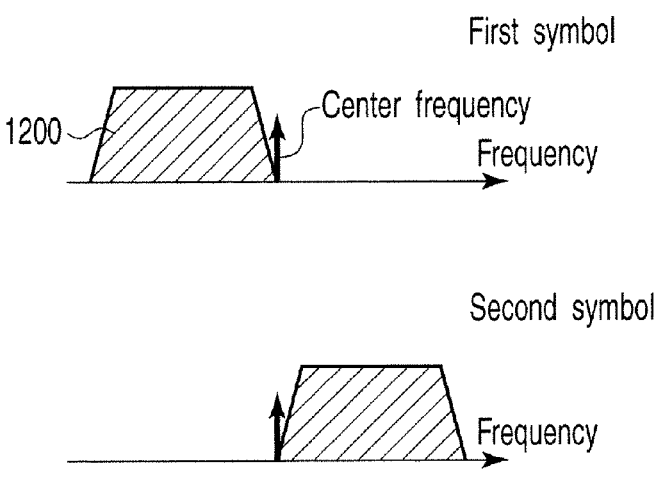
FIG. 13 is a graph showing an example of the frequency spectrum of a transmission signal in a case wherein IQ imbalance correction coefficients for the transmission unit are estimated.
Figure 14:
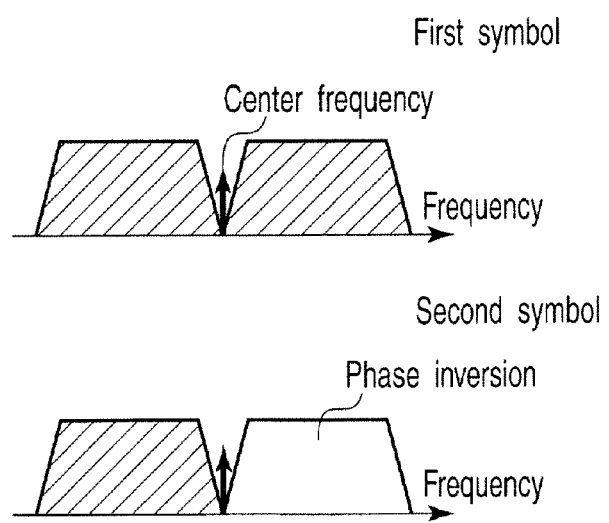
FIG. 14 is a graph showing another example of the frequency spectrum of a transmission signal in a case wherein IQ imbalance correction coefficients for the transmission unit are estimated.

Obviously, expression (99) is a vector similar to the reception vector represented by expression (39) when IQ imbalance in the reception unit 1 is estimated. Therefore, applying a technique similar to that used for the estimation of IQ imbalance in the reception unit 1 can estimate IQ imbalance in the transmission unit 2. Note that if the condition number (the ratio between the maximum eigenvalue and the minimum eigenvalue) of the matrix $S^{(k)}$ represented by expression (96) is large, noise enhancement may occur at the time of multiplication of the inverse matrix. Therefore, the condition number is preferably small. It is particularly preferable that the first and second columns of expression become orthogonal. An example of such an orthogonal ("0" correlation) sequence is a method of transmitting a signal by using only subcarriers in the lower sideband at the first symbol and transmitting a signal by using only subcarriers in the upper sideband at the second symbol as shown in FIG. 13, or a method of inverting the phase of only a signal in the upper sideband at the second symbol as shown in FIG. 14. However, the transmission signals to be used in this embodiment are not limited to those shown in FIGS. 13 and 14. Any sequence can be used as long as the matrix $S^{(k)}$ represented by expression (96) becomes full rank.

Estimation processing operation for IQ imbalance in the transmission unit 2 which is performed in the wireless communication apparatus in FIG. 8 after the correction coefficients for the reception unit 1 which are calculated in step S302 are set in the IQ imbalance correction unit 104 will be described next with reference to FIG. 22.

After the inverse Fourier transform unit 806 converts signals for estimating IQ imbalance in the transmission unit 2 into signals in the time domain, the parallel/serial conversion unit 805 generates I channel and Q channel time-series signals. The I channel and Q channel signals output from the parallel/serial conversion unit 805 are input to the IQ imbalance correction unit 804 at the time of normal transmission. However, since correction coefficients have not been determined, correction processing in the IQ imbalance correction unit 804 is skipped, or processing equivalent to not performing correction processing is performed by using the correction coefficients represented by expression (22).

The quadrature modulation unit 800 quadrature modulates the transmission signals passing through the digital low-pass filters 803a and 803b, the D/A conversion units 802a and 802b, and the analog low-pass filters 801a and 801b (step S303).

The control unit 109 controls the switches 808b and 808a to input the quadrature modulated signal output from the quadrature modulation unit 800 to the reception unit 1.

The quadrature demodulation unit 100 receives the quadrature modulated signal (transmission signal) output from the quadrature modulation unit 800 through the switches 808b and 808a and quadrature demodulates the signal. The IQ imbalance correction unit 104 receives the quadrature demodulated signals through the analog low-pass filters 101a and 101b, the A/D converters 102a and 102b, and the digital low-pass filters 103a and 103b. The IQ imbalance correction unit 104 corrects IQ imbalance in the reception unit 1 with respect to the input signals by using already set correction coefficients.

The reception processing of the reception unit 1 described above is the same as that in the first to 12th embodiments.

The signals whose IQ imbalance has been corrected by the IQ imbalance correction unit 104 are converted into a reception signal in the frequency domain as indicated by expression (93) through the serial/parallel conversion unit 105 and the Fourier transform unit 106 (step S304).

Upon receiving a reception signal $x^{(k)}(1)$ of the first symbol in this manner (step S305), the IQ imbalance estimation unit 809 temporarily stores this. The process returns to step S303 to obtain a reception signal $x^{(k)}(2)$ of the second symbol in the above manner (steps S303 to S305).

The process then advances to step S306, in which the IQ imbalance estimation unit 809 generates a reception vector represented by expression (95) from the reception signal $x^{(k)}(1)$ of the first symbol and the reception signal $x^{(k)}(2)$ of the second symbol obtained in the above manner. The IQ imbalance estimation unit 809 further obtains a vector $z^{(k)}$ with respect to each of the reception signals of the first and second symbols by multiplying the obtained reception vector by the inverse matrix of the transmission signal matrix represented by expression (100) (step S306). In this case, a signal to be transmitted to estimate IQ imbalance in the transmission unit 2 is a known signal. Assume therefore that the transmission signals $s^{(k)}(1)$ and $s^{(k)}(2)$ of the first and second symbols of the kth subcarriers, the transmission signal matrix $S^{(k)}$ having complex conjugate signals of the transmission signals as elements, and an inverse matrix (expression (100)) $S^{(k)-1}$ are calculated and stored in the ROM or the like of the IQ imbalance estimation unit 809 in advance.

When an eigenvector of a correlation matrix is to be obtained by using the obtained two-dimensional vector $\hat{z}^{(k)}$ as in the first embodiment, the correlation matrix can be expressed by expression (101).

$$R_{zz} = \sum_k \hat{z}^{(k)} \hat{z}^{(k)H} \simeq A \begin{bmatrix} \alpha^{(t)} \\ \beta^{(t)} \end{bmatrix} [\alpha^{(t)*} \ \beta^{(t)*}] + \sigma^2 I \quad (101)$$

Where $$A = \sum_k |h_k|^2 \quad (102)$$

Since an eigenvector corresponding the maximum eigenvalue of expression (101) satisfies the relationship represented by expression (103), the ratio between $\alpha^{(t)}$ and $\beta^{(t)}$ can be obtained by expression (104) (step S307).

$$e = \begin{bmatrix} e(1) \\ e(2) \end{bmatrix} = \xi \begin{bmatrix} \alpha^{(t)} \\ \beta^{(t)} \end{bmatrix} \quad (103)$$

$$\frac{\beta^{(t)}}{\alpha^{(t)}} = \frac{e(2)}{e(1)} \quad (104)$$

Using expressions (5) and (6) can express $\alpha^{(t)}$ and $\beta^{(t)}$ as expressions (105) and (106).

$$\alpha^{(t)} = \frac{1}{1 + \frac{\beta^{(t)}}{\alpha^{(t)}}} \quad (105)$$

$$\beta^{(t)} = \frac{\frac{\beta^{(t)}}{\alpha^{(t)}}}{1 + \frac{\beta^{(t)}}{\alpha^{(t)}}} \quad (106)$$

As described above, a linearly independent combination of signals throughout two symbols between symmetrical subcarriers with respect to the center frequency of a transmission signal (=local frequency) are input to the reception unit 1 through the transmission unit 2, a correlation matrix of a vector having the reception signals of the first and second symbols of the respective subcarriers as elements is calculated throughout a plurality of subcarriers, and an eigenvector corresponding to the maximum eigenvalue is obtained, thereby obtaining $\alpha^{(t)}$ and $\beta^{(t)}$ by performing calculation according to expressions (105) and (106).

Correction coefficients $w_{ii}$, $w_{iq}$, $w_{qi}$, and $w_{qq}$ for the IQ imbalance correction unit 804 shown in FIG. 5 are obtained from obtained $\alpha^{(t)}$ and $\beta^{(t)}$ and expressions (89) to (92) (step S308).

IQ imbalance correction coefficients can also be obtained by the same technique as that in the second embodiment. That is, in step S307, first of all, as represented by expression (99), the two-dimensional vector $\hat{z}^{(k)}$ is calculated by multiplying the reception vector $x^{(k)}$ by the inverse matrix of $S^{(k)}$ with respect to each value k, and the correlation vector represented by expression (107) is then obtained by multiplying the vector $\hat{z}^{(k)}$ by a complex conjugate of the first element $\hat{z}^{(k)}(1)$ of the vector.

$$r_{zz} = \sum_k \hat{z}^{(k)*}(1)\hat{z}^{(k)} \quad (107)$$

where $$\hat{z}^{(k)} = \begin{bmatrix} \hat{z}^{(k)}(1) \\ \hat{z}^{(k)}(2) \end{bmatrix} \quad (108)$$

Since noise and a signal have no correlation, expression (107) can be expressed as expression (109) by using A of expression (102).

$$r_{zz} = A\begin{bmatrix} |\alpha^{(t)}|^2 \\ \alpha^{(t)*}\beta^{(t)*} \end{bmatrix} + \begin{bmatrix} \sigma^2 \\ 0 \end{bmatrix} \quad (109)$$

The ratio between $\alpha^{(t)}$ and $\beta^{(t)}$ can therefore be obtained by calculating the ratio between the result obtained by subtracting estimated from a first element $r_{zz}(1)$ of a correlation vector $r_{zz}$ obtained by expression (107) from expression (110) and a second element $r_{zz}(2)$ of the correlation vector $r_{zz}$ (step S307).

$$\frac{\beta^{(t)}}{\alpha^{(t)}} = \frac{r_{zz}(2)}{r_{zz}(1) - \hat{\sigma}^2} \quad (110)$$

where $\hat{\sigma}^2$ is the estimated value of noise power, and $r_{zz}(1)$ and $r_{zz}(2)$ are elements of $r_{zz}$ as indicated by the following equation:

$$r_{zz} = \begin{bmatrix} r_{zz}(1) \\ r_{zz}(2) \end{bmatrix} \quad (111)$$

Then, $\alpha^{(t)}$ and $\beta^{(t)}$ are obtained by performing calculation using the ratio between $\alpha^{(t)}$ and $\beta^{(t)}$ obtained from expression (110) according to expressions (105) and (106). Using obtained $\alpha^{(t)}$ and $\beta^{(t)}$ and expressions (89) to (92) makes it possible to obtain the correction coefficients $w_{ii}$, $w_{iq}$, $w_{qi}$, and $w_{qq}$ for the IQ imbalance correction unit 804 (step S308).

Since the signals generated by the transmission unit 2 are directly input to the reception unit 1, the reception power is sufficiently large. In step S307, therefore, as in the third embodiment, the ratio between $\alpha^{(t)}$ and $\beta^{(t)}$ can also be obtained by calculation according to expression (112) while neglecting noise power in expression (110).

$$\frac{\beta^{(t)}}{\alpha^{(t)}} = \frac{r_{zz}(2)}{r_{zz}(1)} \quad (112)$$

Furthermore, in step S307, the ratio between $\alpha^{(t)}$ and $\beta^{(t)}$ can be obtained by dividing the second element of the two-dimensional vector $z^{\wedge(k)}$ (i.e., $z^{\wedge(k)}(2)$ of the second symbol) by the first element of the two-dimensional vector $z^{\wedge(k)}$ (i.e., $z^{\wedge(k)}(1)$ of the first symbol) according to expression (113) while the noise component of the second term of the right-hand side of expression (99) is neglected.

$$\frac{\beta^{(t)}}{\alpha^{(t)}} = \frac{1}{D}\sum_k \frac{\hat{z}^{(k)}(2)}{\hat{z}^{(k)}(1)} \quad (113)$$

Note that D in expression (113) represents the number of subcarriers used for averaging processing.

The four methods of calculating IQ imbalance correction coefficients have been described above. However, this embodiment is not limited to them. Any method can be used as long as IQ imbalance in the transmission unit 2 can be obtained while correction coefficients for IQ imbalance in the reception unit 1 are obtained, the signal generated by the transmission unit 2 is input to the reception unit 1, and IQ imbalance in the reception unit 1 is corrected.

The IQ imbalance correction coefficients estimated in the above manner are set in the IQ imbalance correction unit 804.

At this time, as indicated by expression (90), since the correction coefficient $w_{iq}$ to multiply an I channel signal and be added to a Q channel signal is "0", the IQ imbalance correction unit 804 may have the arrangement shown in FIG. 10. Alternatively, if normalization is done such that the correction coefficient $w_{qq}$ becomes "1", the IQ imbalance correction unit 804 may comprise only the multiplication units 501a and 501c and the addition unit 502a, as shown in FIG. 11.

Subsequently, when the transmission unit 2 transmits a signal, the IQ imbalance correction unit 804 performs correction processing represented by expressions (79) and (80) for the input I channel and Q channel signals by using the above set correction coefficients, and transmits the resultant signal. At this time, the output from the quadrature modulation unit 800 is input to the amplifier 810 through the switch 808b.

Although this embodiment has exemplified the method of estimating IQ imbalance in the transmission unit 2 by transmitting a two-symbol signal, the present invention is not limited to this. Since resilience to noise increases as the number of symbols to be transmitted increases, it suffices to use a signal of two or more symbols. In this case, as the matrix represented by expression (96), any signal can be used as long as the number of rows is equal to the number of symbols to be transmitted, the number of columns is "2", and the rank is "2". In addition, the subsequent processing is applied by using a generalized inverse matrix instead of the inverse matrix of $S^{(k)}$ in expression (99).

Referring to FIG. 8, IQ imbalance in the transmission unit 2 is corrected by using digital signals. However, IQ imbalance in the transmission unit 2 may be corrected by the analog units as in the case wherein IQ imbalance in the reception unit 1 is corrected by the analog units in the 10th embodiment.

As described above, according to the 13th embodiment, correction coefficients for correcting IQ imbalance in the transmission unit 2 are calculated after correction coefficients for correcting IQ imbalance in the reception unit 1 are obtained, the signal generated by the transmission unit 2 is input to the reception unit 1, and IQ imbalance caused in the reception unit 1 is corrected by using the correction coefficients in the reception unit. This makes it possible to correct not only IQ imbalance in the reception unit 1 and IQ imbalance in the transmission unit 2 of the wireless communication apparatus, thereby providing a high-accuracy wireless communication apparatus.

14th Embodiment

A wireless communication apparatus according to the 14th embodiment will be described.

In the 13th embodiment, the signal generated/quadrature modulated by the transmission unit 2 is input to the reception unit 1, and IQ imbalance in the transmission unit 2 is estimated. The 14th embodiment differs from the 13th embodiment in that IQ imbalance in a transmission unit 2 is estimated by using a signal in the time domain which is stored in advance.

Figure 9:
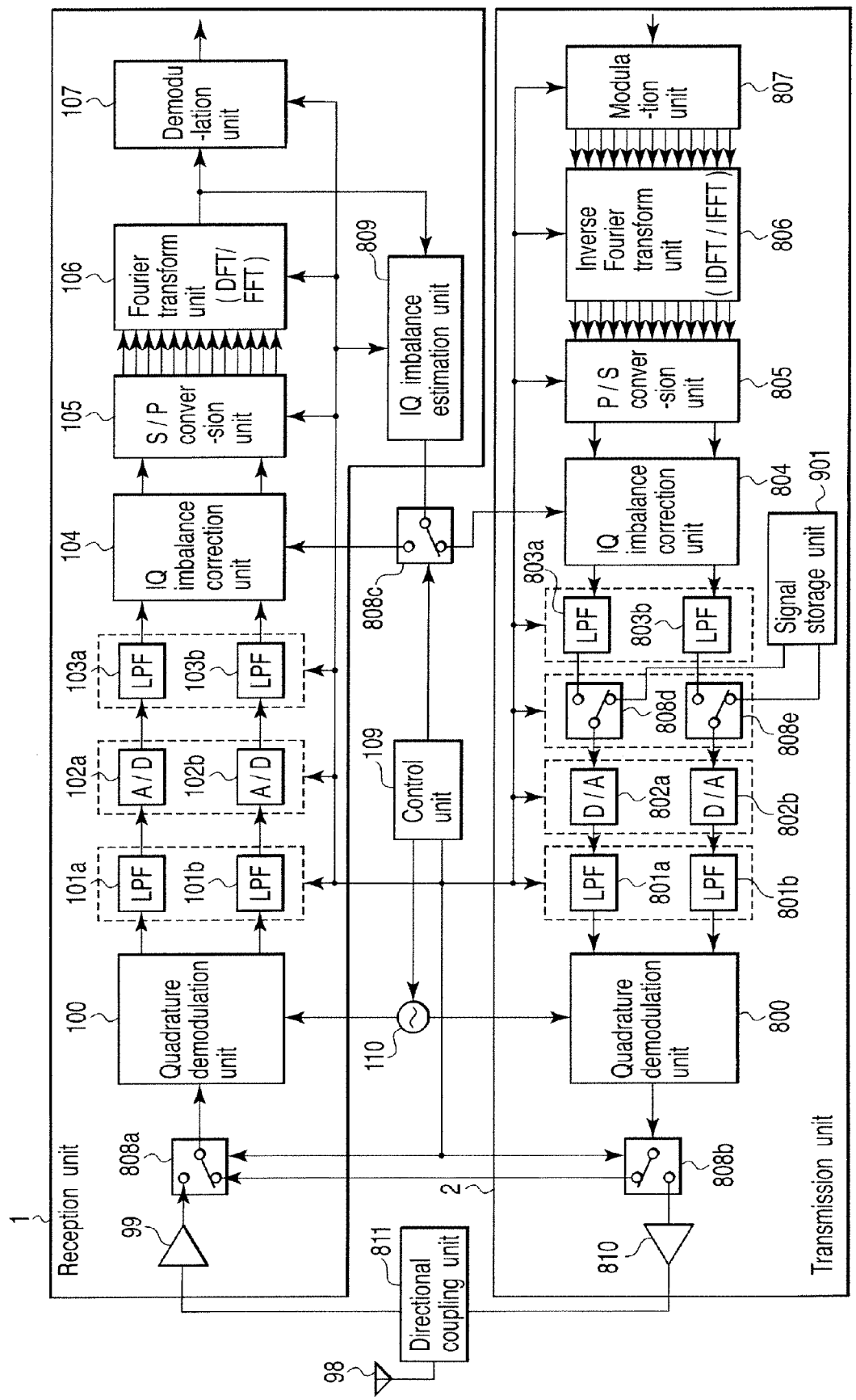
FIG. 9 is a block diagram showing an example of the arrangement of a wireless communication apparatus according to the 14th embodiment.

FIG. 9 shows an example of the arrangement of the wireless communication apparatus according to the 14th embodiment. The same reference numerals as in FIG. 8 denote the same parts in FIG. 9, and different portions will be described. The arrangement in FIG. 9 additionally includes a switch 808*d* for inputting one of signals output from a signal storage unit 901 and a digital low-pass filter 803*a* and a signal stored in the signal storage unit 901 to a D/A conversion unit 802*a*, and a switch 808*e* for inputting one of a signal output from a digital low-pass filter 803*b* and a signal stored in the signal storage unit 901 to a D/A conversion unit 802*b*.

In the wireless communication apparatus which transmits/receives OFDM signals, a reception unit 1 and the transmission unit 2 sometimes share some components. If the bandwidths of signals to be transmitted and received are equal, the transmission unit 2 and the reception unit 1 require the same function of the analog low-pass filters, the functions of low-pass filters 101*a* and 801*a* are sometimes implemented by one low-pass filter, and the functions of low-pass filters 101*b* and 801*b* are sometimes implemented by one low-pass filter. A Fourier transform unit 106 and an inverse Fourier transform unit 806 perform the same computation, although they have slightly different coefficients to multiply. For this reason, one component sometimes executes inverse Fourier transform at the time of transmission and Fourier transform at the time of reception.

Letting the reception unit 1 and transmission unit 2 share one component can prevent an excessive increase in circuit size.

With this arrangement of the wireless communication apparatus, the reception unit 1 cannot receive the signal generated by the transmission unit 2 and perform reception processing. In consideration of the above problems, this embodiment stops transmission processing by the digital units at the time of estimation of IQ imbalance in the transmission unit 2. The signals in the time domain after passage through the digital low-pass filters, which are stored in the signal storage unit 901 in advance, are input to D/A conversion units 802*d* and 802*e* to generate signals for correction coefficient estimation.

The operation of the wireless communication apparatus in FIG. 9 at the time of estimation of IQ imbalance correction coefficients and correction of IQ imbalance will be described next.

As in the 13th embodiment, first of all, IQ imbalance in the reception unit 1 is estimated, and correction coefficients for the IQ imbalance correction unit 104 are set. The IQ imbalance estimating operation of the reception unit 1 is the same as that in the 13th embodiment.

When IQ imbalance in the transmission unit 2 is to be estimated, as also described in the 13th embodiment, since IQ imbalance in the reception unit 1 can be corrected, inputting the signal generated by the transmission unit 2 to the reception unit 1 and performing reception processing can estimate IQ imbalance in the transmission unit 2.

In this case, the 13th embodiment generates a plurality of OFDM symbols for estimating IQ imbalance in the transmission unit 2 by using the modulation unit 807, inverse Fourier transform unit 806, parallel/serial conversion unit 805, and digital low-pass filters 803*a* and 803*b*. In contrast, the 14th embodiment stores the signals in the time domain which have undergone these processes in the signal storage unit 901 in advance. Inputting the signals in the time domain which are stored in the signal storage unit 901 to the D/A conversion units 802*a* and 802*b* through the switches 808*d* and 808*e* makes it possible to stop the operation of modulation unit 807, inverse Fourier transform unit 806, parallel/serial conversion unit 805, and digital low-pass filters 803*a* and 803*b*.

The D/A conversion units 802*a* and 802*b* D/A-convert the signals output from the signal storage unit 901 into analog signals. In general, after this operation, the analog low-pass filters 801*a* and 801*b* are respectively applied to the I channel and Q channel signals to remove aliasing signals. If, however, the analog low-pass filters 801*a* and 801*b* are also used as the analog low-pass filters of the reception unit 1, the above signals are made to pass through the filters without application of the processing.

The quadrature modulation unit 800 quadrature modulates the signals output from the analog low-pass filters 801*a* and 801*b* and input the obtained quadrature modulated signals to the quadrature demodulation unit 100 of the reception unit 1 through switches 808*b* and 808*a*.

The subsequent processing is the same as that in the 13th embodiment.

According to the 14th embodiment, at the time of transmission, since the digital units (the inverse Fourier transform unit and the digital low-pass filters) of the transmission unit 2 do not operate, even if the digital units are shared by the transmission and reception units, the reception unit 1 can calculate correction coefficients for correcting IQ imbalance in the transmission unit 2 by using signals output from the transmission unit 2.

15th Embodiment

A wireless communication apparatus according to the 15th embodiment will be described.

This embodiment is also the same as the 13th and 14th embodiments in that coefficients for correcting IQ imbalance in the reception unit are estimated, and coefficients for correcting IQ imbalance in the transmission unit are obtained while IQ imbalance in the reception unit is corrected.

The 15th embodiment differs from the 13th and 14th embodiments in that when the wireless communication apparatus includes a plurality of reception systems and a plurality of transmission systems, IQ imbalance correction coefficients for each reception system and IQ imbalance correction coefficients for each transmission system are calculated, and IQ imbalance is corrected in each reception system and each transmission system in the same manner as described in the 13th and 14th embodiments.

Even if a wireless communication apparatus includes a plurality of transmission system and a plurality of reception systems, the apparatus performs the same operation as that in the 13th and 14th embodiments. That is, first of all, correction coefficients for correcting IQ imbalance are obtained for each reception system of the reception unit. At this time, a method of obtaining correction coefficients for a plurality of reception systems is the same as that described in the 11th and 12th embodiments, and hence a detailed description thereof will be omitted.

This apparatus estimates IQ imbalance in the transmission unit while correcting IQ imbalance for each reception system by using IQ imbalance correction coefficients for each reception system. Since the respective transmission systems of the wireless communication apparatus respectively and independently comprise A/D conversion units, analog low-pass filters, and quadrature modulation units, IQ imbalance values generally differ for the respective transmission systems. For this reason, if there are a plurality of transmission systems, IQ imbalance must be corrected by using correction coefficients which differ for the respective transmission systems.

The method of estimating IQ imbalance correction coefficients for the transmission unit, which has been described in the 13th and 14th embodiments, is applied to each transmission system to obtain IQ imbalance correction coefficients for each transmission system.

Correcting IQ imbalance for each transmission system by using IQ imbalance correction coefficients obtained for each transmission system makes it possible to provide a wireless communication apparatus comprising a high-accuracy transmission unit as in the 13th and 14th embodiments.

As also described in the 14th embodiment, in the wireless communication apparatus which transmits/receives OFDM signals, the transmission unit and the reception unit sometimes share some components.

Consider, for example, a case wherein a wireless communication apparatus includes two transmission systems and two reception systems. In this case, first of all, correction coefficients are obtained from the first transmission system. At this time, only the first transmission system is made to operate, and the function of the second transmission system is stopped. The signal generated by the first transmission system is then input to the second reception system instead of the first reception system. Even if the second transmission system and the second reception system share some components, since the second transmission system does not operate, no problem arises when the second reception system receives the signal generated by the first transmission system.

Only the second transmission system generates a signal and inputs the generated signal to the first reception system. As a result, as in the case wherein correction coefficients for the first transmission system are obtained, the first reception system can calculate IQ imbalance correction coefficients for the second transmission system by using the signal generated by the second transmission system.

The signal generated by each transmission system is received by a reception system different from a reception system which pairs up with the transmission system, thereby allowing to calculate IQ imbalance correction coefficients for the transmission system in the same manner as in the 13th embodiment.

Assume that a wireless communication apparatus includes four transmission systems and four reception systems. In this case, the third reception system receives the signal generated by the first transmission system, and the fourth reception system receives the signal generated by the second transmission system, thereby allowing to simultaneously calculate IQ imbalance correction coefficients for the two transmission systems, respectively.

As described above, according to the 15th embodiment, even a wireless communication apparatus including a plurality of transmission systems and a plurality of reception systems can calculate IQ imbalance correction coefficients for each reception system and IQ imbalance correction coefficients for each transmission system. In addition, a wireless communication apparatus comprising a high-accuracy reception unit and a high-accuracy transmission unit can be provided by correcting IQ imbalance for each reception system by using obtained IQ imbalance correction coefficients at the time of signal reception and correcting IQ imbalance for each transmission system at the time of signal transmission.

Note that as in the 14th embodiment, providing the signal storage unit 901 for each transmission system can obtain IQ imbalance correction coefficients for each transmission system by inputting the signal generated by each transmission system to each reception system which pairs up with it.

What is claimed is:

1. A wireless communication apparatus comprising:
a receiver to receive an quadrature modulated signal;
a generation unit configured to generate a first local signal having a frequency different from a center frequency of the quadrature modulated signal;
a quadrature demodulation unit configured to perform quadrature demodulation on the quadrature modulated signal by using the first local signal, to obtain an I channel signal and a Q channel signal;
a Fourier transform unit configured to perform Fourier transform on the I channel signal and the Q channel signal, to obtain signals in a frequency domain; and
a first calculation unit configured to calculate a first correction coefficient for correcting phase distortion and amplitude distortion caused by the quadrature demodulation by using pairs of signals among the signals, each of the pairs are located at symmetrical frequency positions with respect to the frequency of the first local signal;
wherein if a frequency band higher than the quadrature modulated signal is not used, the generation unit generates the first local signal having the frequency higher than the center frequency, and the first calculation unit calculates the correction coefficient based on lower side band signal of the quadrature modulated signal.

2. The apparatus according to claim 1, further comprising:
a first correction unit configured to correct the I channel signal and the Q channel signal by using the first correction coefficient.

3. The apparatus according to claim 2, further comprising:
a quadrature modulation unit configured to perform quadrature modulation on an I channel transmission signal and a Q channel transmission signal;
a input unit configured to input, to the quadrature demodulation unit, a known signal which is quadrature modulated by the quadrature modulation unit; and
a second calculation unit configured to calculates a second correction coefficient for correcting phase distortion and amplitude distortion caused by performing the quadrature modulation on the I channel transmission signal and the Q channel transmission signal; and wherein
the quadrature demodulation unit performs the quadrature demodulation on the known signal by using the first local signal, to obtain the I channel signal and the Q channel signal of the known signal;
the first correction unit corrects the I channel signal and the Q channel signal of the known signal by using the first correction coefficient,
the Fourier transform unit performs the Fourier transform on the I channel signal and the Q channel signal of the known signal which are corrected by the first correction unit, to obtain the signals in the frequency domain, and
the second calculation unit calculates the second correction coefficient by using the signals in the frequency domain.

4. The apparatus according to claim 3, further comprising: a second correction unit configured to correct the I channel transmission signal and the Q channel transmission signal by using the second correction coefficient.

5. The apparatus according to claim 3, wherein local signals used by the quadrature modulation unit and the quadrature demodulation unit have the same frequency.

6. The apparatus according to claim 3, wherein the known signal includes a sequence of symbols whose correlation is not "1" at symmetrical frequency positions with respect to a center frequency of the known signal.

7. The apparatus according to claim 3, wherein the known signal includes a sequence of symbols whose correlation is "0" at symmetrical frequency positions with respect to a center frequency of the known signal.

8. The apparatus according to claim 3, wherein the second calculation unit (a) obtains a matrix, a first sequence of symbol signals of the known signal being set as a first column of the matrix, the first sequence of symbol signals each being located at one of symmetrical frequency positions with respect to a center frequency of the known signal, and complex conjugates of a second sequence of symbol signals of the known signal being set as a second column of the matrix, the second sequence of symbol signals each being located at the other of the symmetrical frequency positions, (b) multiplies the first sequence of symbol signals by an inverse matrix of the matrix, to obtain a two-dimensional vector, (c) calculates a ratio between a first element and a second element of the two-dimensional vector, and (d) calculates the second correction coefficient by using the ratio.

9. An apparatus according to claim 3, wherein the second calculation unit (a) obtains a matrix, a first sequence of symbol signals of the known signal being set as a first column of the matrix, the first sequence of symbol signals each being located at one of symmetrical frequency positions with respect to a center frequency of the known signal, and complex conjugates of a second sequence of symbol signals of the known signal being set as a second column of the matrix, the second sequence of symbol signals each being located at the other of the symmetrical frequency positions, (b) obtains a correlation matrix of two-dimensional vector obtained by multiplying the first sequence of symbol signals by an inverse matrix of the matrix, (c) calculates a ratio between a first element and a second element of an eigenvector corresponding to a maximum eigenvalue of the correlation matrix, and (d) calculates the second correction coefficient by using the ratio.

10. Then apparatus according to claim 3, wherein the second calculation unit (a) obtains a matrix, a first sequence of symbol signals of the known signal being set as a first column of the matrix, the first sequence of symbol signals each being located at one of symmetrical frequency positions with respect to a center frequency of the known signal, and complex conjugates of a second sequence of symbol signals of the known signal being set as a second column of the matrix, the second sequence of symbol signals each being located at the other of the symmetrical frequency positions, (b) multiplies the first sequence of symbol signals by an inverse matrix of the matrix, to obtain a two-dimensional vector, (c) multiplies the two-dimensional vector by a complex conjugate of a first element of the two-dimensional vector, to obtain a correlation vector, (d) calculates a ratio between a result obtained by subtracting estimated noise power from the first element of the correlation vector and the second element of the correlation vector, and (e) calculates the second correction coefficient by using the ratio.

11. The apparatus according to claim 3, wherein the second calculation unit (a) obtains a matrix, a first sequence of symbol signals of the known signal being set as a first column of the matrix, the first sequence of symbol signals each being located at one of symmetrical frequency positions with respect to a center frequency of the known signal, and complex conjugates of a second sequence of symbol signals of the known signal being set as a second column of the matrix, the second sequence of symbol signals each being located at the other of the symmetrical frequency positions, (b) multiplies the first sequence of symbol signals by an inverse matrix of the matrix, to obtain a two-dimensional vector, (c) multiplies the two-dimensional vector by a complex conjugate of a first element of the two-dimensional vector, to obtain a correlation vector, (d) calculates a ratio between a first element of the correlation vector and a second element of the correlation vector, and (e) calculates the second correction coefficient by using the ratio.

12. The apparatus according to claim 1, wherein the generation unit generates the first local signal having the frequency lower or higher than the center frequency by an integral multiple of ½ a frequency bandwidth of the quadrature modulated signal.

13. The apparatus according to claim 1, wherein if a frequency band lower than the quadrature modulated signal is not used, the generation unit generates the first local signal having the frequency lower than the center frequency, and the first calculation unit calculates the correction coefficient based on upper side band signal of the quadrature modulated signal.

14. The apparatus according to claim 1, wherein the first calculation unit calculates the correction coefficient by using the pairs of signals which are located near the center frequency.

15. The apparatus according to claim 1, wherein the first calculation unit calculates a ratio between a first signal which is one of each pair and a complex conjugate signal of a second signal which is another of the pair, and calculates the first correction coefficient by using the ratio.

16. The apparatus according to claim 15, wherein the second signal is an image signal of the first signal.

17. The apparatus according to claim 16, wherein the first calculation unit (a) obtains a correlation matrix of vectors each having the first signal of each pair as a first element of the vector and the complex conjugate signal of the second signal of the pair as a second element of the vector, (b) calculates a ratio between a first element and a second element of an eigenvector corresponding to a maximum eigenvalue of the correlation matrix, and (c) calculates the first correction coefficient by using the ratio.

18. The apparatus according to claim 16, wherein the first calculation unit (a) calculates a first correlation value by multiplying a complex conjugate signal of the first signal of each pair and the first signal, (b) calculates a second correlation value by multiplying the complex conjugate signal of the first signal and the complex conjugate signal of the second signal of the pair, (c) calculates a ratio between a result obtained by subtracting estimated noise power from the first correlation value and the second correlation value, and (d) calculates the first correction coefficient by using the ratio.

19. The apparatus according to claim 16, wherein the first calculation unit (a) calculates a first correlation value by multiplying a complex conjugate signal of the first signal of each pair and the first signal, (b) calculates a second correlation value by multiplying the complex conjugate signal of the first signal and the complex conjugate signal of the second signal of the pair, (c) calculates a ratio between the first correlation value and the second correlation value, and (d) calculates the first correction coefficient by using the ratio.

20. The apparatus according to claim 1, further comprising:
a first conversion unit configured to convert a frequency component, of the I channel signal obtained by the quadrature demodulation unit, which is not higher than a frequency of the first local signal into a first digital signal by using a second sampling frequency not less than twice higher than a first sampling frequency higher than a signal bandwidth of the quadrature modulated signal; and
a second conversion unit configured to convert a frequency component, of the Q channel signal obtained by the quadrature demodulation unit, which is not higher than the frequency of the first local signal into a second digital signal by using the second sampling frequency; and wherein
the Fourier transform unit performs Fourier transform on the first digital signal and the second digital signal.

21. The apparatus according to claim 1, wherein the generation unit has a first mode of generating the first local signal, and a second mode of generating a second local signal having a frequency equal to the center frequency of the quadrature modulated signal, and further comprising:
a control unit configured to switch to the first mode of the first mode and the second mode when the first calculation unit calculates the first correction coefficient.

22. The apparatus according to claim 21, further comprising:
a first conversion unit configured to (a) convert a frequency component, of the I channel signal obtained by the quadrature demodulation unit, which is not higher than a frequency of the first local signal into a digital signal by using a second sampling frequency not less than twice higher than a first sampling frequency higher than a signal bandwidth of the quadrature modulated signal in the first mode, and (b) convert a frequency component, of the I channel signal obtained by the quadrature demodulation unit, which is not higher than a frequency of the second local signal into a digital signal by using the first sampling frequency in the second mode, and
a second conversion unit configured to (a) convert a frequency component, of the Q channel signal obtained by the quadrature demodulation unit, which is not higher than the frequency of the first local signal into a digital signal by using the second sampling frequency in the first mode, and (b) convert a frequency component, of the Q channel signal obtained by the quadrature demodulation unit, which is not higher than the frequency of the second local signal into a digital signal by using the first sampling frequency in the second mode, and wherein
the Fourier transform unit performs Fourier transform on the digital signals obtained by the first conversion unit and the second conversion unit.

23. A receiving method comprising:
receiving an quadrature modulated signal;
generating a local signal having a frequency different from a center frequency of the quadrature modulated signal;
performing quadrature demodulation on the quadrature modulated signal by using the local signal, to obtain a first I channel signal and a first Q channel signal;
performing Fourier transform on the first I channel signal and the first Q channel signal, to obtain first signals in a frequency domain;
calculating a first correction coefficient for correcting phase distortion and amplitude distortion caused by the quadrature demodulation by using pairs of signals among the first signals, each of the pairs are located at symmetrical frequency positions with respect to the frequency of the local signal;
wherein if a frequency band higher than the quadrature modulated signal is not used, the generation unit generates the first local signal having the frequency higher than the center frequency, and the first calculation unit calculates the correction coefficient based on lower side band signal of the quadrature modulated signal.

24. The method according to claim 23, further comprising:
performing quadrature modulation on an I channel transmission signal and a Q channel transmission signal of a known signal, to obtain an quadrature modulated known signal;
performing the quadrature demodulation on the quadrature modulated known signal, to obtain a second I channel signal and a second Q channel signal;
correcting the second I channel signal and the second Q channel signal by using the first correction coefficient;
performing Fourier transform on the second I channel signal and the second Q channel signal which are corrected by using the first correction coefficient, to obtain second signals in a frequency domain;
calculating a second correction coefficient by using the second signals, the second correction coefficient being used for correcting phase distortion and amplitude distortion caused by the quadrature modulation.

* * * * *